(12) United States Patent
Hejtmann et al.

(10) Patent No.: US 9,914,863 B2
(45) Date of Patent: Mar. 13, 2018

(54) ABRASIVE PARTICLE WITH AT MOST THREE SURFACES AND ONE CORNER

(71) Applicant: Robert Bosch GmbH, Stuttgart (DE)

(72) Inventors: Georg Hejtmann, Mundelsheim (DE); Petra Stedile, Esslingen (DE); Stefan Fuenfschilling, Öhningen (DE); Moritz Oldenkotte, Constance (DE); Thomas Rohner, Kefikon (CH); Donat Frei, Appenzell (CH); Adrian Jenni, St. Gallen (CH); Tony Pleschinger, Moscow (RU); Gert Lindemann, Lichtenstein (DE); Andreas Harzer, Schwieberdingen (DE)

(73) Assignee: Robert Bosch GmbH, Stuttgart, DE (US)

(*) Notice: Subject to any disclaimer, the term of this patent is extended or adjusted under 35 U.S.C. 154(b) by 93 days.

(21) Appl. No.: 14/417,848

(22) PCT Filed: Jul. 31, 2013

(86) PCT No.: PCT/EP2013/066095
§ 371 (c)(1),
(2) Date: Jan. 28, 2015

(87) PCT Pub. No.: WO2014/020068
PCT Pub. Date: Feb. 6, 2014

(65) Prior Publication Data
US 2015/0210910 A1      Jul. 30, 2015

(30) Foreign Application Priority Data

Aug. 2, 2012 (DE) .................. 10 2012 213 627
Aug. 2, 2012 (DE) .................. 10 2012 213 630

(Continued)

(51) Int. Cl.
*B24D 3/00* (2006.01)
*B24D 11/00* (2006.01)
(Continued)

(52) U.S. Cl.
CPC ............ *C09K 3/1409* (2013.01); *B28B 1/004* (2013.01); *B28B 3/20* (2013.01); *B28B 7/24* (2013.01);
(Continued)

(58) Field of Classification Search
USPC .......................................... 51/293, 307, 309
See application file for complete search history.

(56) References Cited

U.S. PATENT DOCUMENTS

| 5,201,916 A * | 4/1993 | Berg ................. B24D 3/14 264/6 |
| 2010/0146867 A1 * | 6/2010 | Boden ................. B24D 3/00 51/309 |

(Continued)

FOREIGN PATENT DOCUMENTS

| CN | 87 1 05224 A | 2/1988 |
| CN | 1081948 A | 2/1994 |

(Continued)

OTHER PUBLICATIONS

International Search Report corresponding to PCT Application No. PCT/EP2013/066095, dated Dec. 9, 2013 (German and English language document) (10 pages).

*Primary Examiner* — James McDonough
(74) *Attorney, Agent, or Firm* — Maginot, Moore & Beck LLP

(57) ABSTRACT

An abrasive particle includes at most three surfaces and at least one edge which has a corner at least one end. The abrasive particle may contain a ceramic material, particularly polycrystalline $\alpha\text{-}Al_2O_3$. Abrasive particles as a whole, (Continued)

methods for producing abrasive particles, moulds, abrasive articles, methods for producing abrasive articles, and methods for abrading a surface are also disclosed.

10 Claims, 25 Drawing Sheets

(30) Foreign Application Priority Data

Aug. 2, 2012 (DE) .......................... 10 2012 213 633
Aug. 2, 2012 (EP) ..................................... 12178932

(51) Int. Cl.

| | | |
|---|---|---|
| *B24D 18/00* | (2006.01) | |
| *B24D 3/02* | (2006.01) | |
| *C09K 3/14* | (2006.01) | |
| *C04B 35/111* | (2006.01) | |
| *B28B 1/00* | (2006.01) | |
| *B28B 3/20* | (2006.01) | |
| *B28B 7/24* | (2006.01) | |

(52) U.S. Cl.
CPC ........ *C04B 35/1115* (2013.01); *C09K 3/1418* (2013.01); *C04B 2235/3206* (2013.01); *C04B 2235/5436* (2013.01); *C04B 2235/94* (2013.01); *C04B 2235/945* (2013.01)

(56) References Cited

U.S. PATENT DOCUMENTS

| | | | |
|---|---|---|---|
| 2010/0151195 A1* | 6/2010 | Culler | B24D 11/00 |
| | | | 428/142 |
| 2011/0146509 A1* | 6/2011 | Welygan | B41M 1/12 |
| | | | 101/129 |
| 2012/0167481 A1* | 7/2012 | Yener | B24D 3/20 |
| | | | 51/308 |

FOREIGN PATENT DOCUMENTS

| | | |
|---|---|---|
| CN | 102282230 A | 12/2011 |
| EP | 0 318 168 A2 | 5/1989 |
| EP | 0 615 816 A1 | 9/1994 |
| WO | 96/12776 A1 | 5/1996 |
| WO | 01/79135 A1 | 10/2001 |
| WO | 2009/085841 A2 | 7/2009 |
| WO | 2010/077491 A2 | 7/2010 |
| WO | 2010/077495 A2 | 7/2010 |
| WO | 2010/077509 A1 | 7/2010 |
| WO | 2010/077518 A1 | 7/2010 |
| WO | 2010/077519 A2 | 7/2010 |
| WO | 2011/068714 A2 | 6/2011 |
| WO | 2011068724 A2 | 6/2011 |
| WO | 2011/087649 A2 | 7/2011 |
| WO | 2011/109188 A2 | 9/2011 |
| WO | 2011/139562 A2 | 11/2011 |
| WO | 2012/018903 A2 | 2/2012 |
| WO | 2012/061016 A1 | 5/2012 |
| WO | 2012/061033 A2 | 5/2012 |
| WO | 2012/092605 A2 | 7/2012 |

\* cited by examiner

ABRASIVE PARTICLE WITH AT MOST THREE SURFACES AND ONE CORNER

This application is a 35 U.S.C. § 371 National Stage Application of PCT/EP2013/066095, filed on Jul. 31, 2013, which claims the benefit of priority to (i) patent application no. DE 10 2012 213 633.9, filed on Aug. 2, 2012 in Germany, (ii) patent application no. DE 10 2012 213 627.4, filed on Aug. 2, 2012 in Germany, (iii) patent application no. DE 10 2012 213 630.4, filed on Aug. 2, 2012 in Germany, and (iv) patent application no. EP 12178932.5 filed on Aug. 2, 2012 in Europe. The disclosures of the above-identified patent applications are incorporated herein by reference in their entirety.

TECHNICAL FIELD

The present invention relates to abrasive grains having a defined shape, to collectives of abrasive grains, to processes for producing abrasive grains, to dies, to abrasive articles comprising abrasive grains, to processes for producing abrasive articles and to processes for grinding a surface with an abrasive article.

BACKGROUND

Abrasive grains, especially ceramic abrasive grains, having a defined shape and size have been known for some time.

U.S. Pat No. 5,201,916 discloses, inter alia, flat abrasive grains having, for example, a triangular, rectangular or circular shape. These abrasive grains are produced from a dispersion comprising particles convertible to $\alpha$-alumina and a liquid comprising a volatile component. The dispersion is poured into a die having a flat base surface and depressions having shapes complementary to the desired shapes of the abrasive grains. Subsequently, a portion of the volatile component is removed, so as to form a precursor having the desired shape. The precursor is then removed from the die, calcined and finally sintered, so as to form the finished abrasive grain.

The abrasive grains produced by this process have two opposite base faces having essentially the same geometric shape. A longer lifetime is ascribed to the abrasive grains since small pieces are constantly breaking off from the abrasive grains during the grinding, giving rise to new cutting faces. As a result, the abrasive grains sharpen themselves. It is believed that about one to two thirds of abrasive grains having a base face in the shape of a triangle, especially of an equilateral triangle, on electrostatic scattering, are oriented such that one tip points away from the underlayer, while other abrasive grains are oriented such that the tip points toward the underlayer.

In an alternative process described in EP 615 816, elongated bar-shaped precursors are first produced by means of extrusion, and these are then divided into individual abrasive grains. The bar-shaped abrasive grains may thus have, for example, a cylindrical or prism shape.

WO 2009/085841 describes a further production process in which the precursor is dried in the die under conditions which lead to fracturing of the precursor. The fragments have, at least to some degree, surfaces and edges which are complementary to the corresponding surfaces and edges of the die and therefore have the angles defined by the die. These surfaces and edges have elevated cutting capacity. The other surfaces and edges formed by the fracturing, in contrast, are irregular.

WO 2010/077495 discloses abrasive grains having a through-opening or a non-through-opening or having a dish shape. Also described therein are production processes for such abrasive grains. Further abrasive grains having undefined openings are disclosed in WO 2010/077518. WO 2010/077491 is likewise concerned with abrasive grains having a dish shape.

WO 2010/077519 discloses abrasive grains having two opposite main faces and lateral faces that are inclined with respect to the main faces and run between them. The different lateral faces of an abrasive grain may be inclined at different angles relative to the main faces.

The document WO 2011/068724 likewise discloses abrasive grains having a base side and a tip, and also inclined lateral faces that run between them. Similar abrasive grain forms are also described in WO 2011/109188.

The document WO 2010/077509 is concerned with abrasive grains having a surface having a multitude of grooves. These grooves are produced with the aid of complementary ridges on the underside of the die.

WO 2011/068714 discloses pyramidal abrasive grains having a parallelogram-shaped, especially rhombic, base face, a kite-shaped base face and a superelliptical base face.

WO 2011/139562 discloses abrasive grains in the form of tetrahedra and modifications thereof. For example, the lateral faces may be concave or convex, the corners of the tetrahedra may be truncated, or the edges may be curved.

The abrasive grains described in WO 2012/018903 contain two or more sections in the form of plates arranged at an angle to one another.

In the process described in WO 2012/061016, an abrasive structure is first produced, containing abrasive grain precursors joined to one another via frangible connecting elements. After the sintering, the abrasive grains are separated from one another by breaking the connecting elements.

Alternatively, abrasive grains of a defined shape can also be produced by a screen printing process. This is described, for example, by WO 96/12776. This involves passing a dimensionally stable dispersion through orifices having a defined shape onto a conveyor belt and then curing said dispersion. The orifices may be present, for example, in a movable continuous belt.

A development of the screen printing process is disclosed in WO 2011/087649. In this process, the dispersion is forced through the orifices in the continuous belt by means of a pressure differential. Given suitable choice of the viscosity of the dispersion, this process can produce abrasive grains having a cross section which narrows from a first main side to a second, opposite the main side.

WO 2012/061033 describes processes for producing abrasive grains of a defined shape with the aid of laser radiation. Additionally disclosed are specific shapes of abrasive grains. For example, the abrasive grains may contain a main element and at least three bar-shaped elements that extend therefrom. More particularly, the abrasive grain may have the shape of a cross, of an uppercase letter "T", of a star or of a Greek lowercase letter "λ".

In general, it is assumed that abrasive grains having a defined shape have improved properties in several aspects: if the abrasive grains already have a defined shape and size on commencement of production thereof, there is no need for a subsequent sorting step by which the abrasive grains subsequently have to be divided into different size fractions. In addition, the shapes and sizes also remain unchanged between different production batches, which means that the abrasive properties have very good reproducibility. Furthermore, the abrasive grains may, for example, achieve increased total material removal, have a longer lifetime, produce an increased surface quality of the processed surface and give an abrasion outcome of better reproducibility.

Nevertheless, the abrasive grains known from the prior art have a number of disadvantages. For example, a large number of abrasive grains have to be aligned with the aid of costly and inconvenient electrostatic scattering and applied to an underlayer, in order that, for example, corners and/or edges of the abrasive grain point away from the underlayer and hence toward a surface to be processed. Without such an alignment, the material removal and/or the service life of an abrasive article would only be very low.

SUMMARY

It is therefore an object of the present invention to at least partly remedy the disadvantages of the prior art. More particularly, the intention is thus to provide an abrasive grain which, especially with the aid of mechanical scattering, can be applied to an underlayer in a desired orientation with maximum probability. For example, at least one corner of the abrasive grain should point away from the underlayer in a desired orientation.

The object is also achieved by an abrasive grain having a defined shape, the abrasive grain having not more than three surfaces and containing at least one edge. At at least one end of the edge, the abrasive grain has a corner.

An abrasive grain having such a shape assures that the abrasive grain, especially on mechanical scattering, will always be aligned on an underlayer in such a way that a corner and/or an edge protrudes from the underlayer. More particularly, no costly and inconvenient methods for alignment of the abrasive grains are needed (for example electrostatic scattering) in order to achieve optimal abrasion results. The abrasive grain or a multitude of abrasive grains can be applied as a bulk material.

Here and hereinafter, a face is understood to mean a continuous two-dimensional part of the surface of the abrasive grain, which consists of points with which a well-defined theoretical tangential plane can be placed on the abrasive grain in each case. Such a face may be flat or curved; it may also have at least one flat section and at least one curved section which merge into one another without an intermediate edge.

An edge is a coherent one-dimensional portion of the surface of the abrasive grain, which consists of points at which two areas or two portions of one and the same area are in contact with one another, with a non-continuous profile of the tangential planes of the two areas or area portions at these points. At the edge, there is preferably an internal angle of less than 150°, preferably less than 120°, more preferably less than 90°, or greater than 210°, preferably greater than 240°, more preferably greater than 270°. The internal angle is the angle between the two tangential planes of the two areas or area portions mentioned, i.e. the angle between the normal vectors to these tangential planes.

A point on the surface of the abrasive grain is understood to be a corner when an imaginary cone can theoretically be placed over a portion of the abrasive grain such that this portion of the abrasive grain is within the cone and the point forms the tip of the cone. Preferably, the opening angle of the cone is less than 150°, further preferably less than 120° and more preferably less than 90°.

The abrasive grain may have at least four corners, especially exactly four corners. Through a suitable spatial distribution of the four corners, it is possible to ensure that at least one corner stands apart from an abrasive underlayer on which the abrasive grain lies. For this purpose, for example, the four corners should not be in a common plane. It is thus always assured that an optimal grinding outcome can be achieved.

The abrasive grain may have at least two edges which are not in contact with one another and which are each bounded by two corners. A first straight connecting line between the corners that bound a first edge may be skewed with respect to a second straight connecting line between the corners that bound a second edge. The straight connecting lines are merely theoretical lines which need not in fact correspond to actual edges of the abrasive grain. The angle between these straight connecting lines formed may be 90°±50°, preferably 90°±30°, more preferably 90°±10°. The angle between skewed straight lines is measured by drawing the two skewed straight lines in such a way that the common perpendicular, i.e. the straight line which is at right angles to the two skewed straight lines, is represented as a point. It will be appreciated that the common perpendicular must intersect the straight lines between the corners that bound the edge. By virtue of the abrasive grain having two edges each bounded by two corners, with straight connecting lines skewed relative to one another, it is possible to assure that one corner of the abrasive grain will always stand apart from an underlayer. Such an orientation of the abrasive grains can especially also be achieved by a mechanical scattering operation.

In the case of an abrasive grain having at least four corners, there may be an angle between two planes formed by three corners each of between 70° and 140°, preferably between 80° and 130°, more preferably between 90° and 120°. According to the configuration of the angle between these planes, the abrasion characteristics of the abrasive grain may be influenced. If the abrasive grain always has the same alignment, the protruding corner of the abrasive grain, for example, is at an acute angle, a right angle or an oblique angle from an underlayer. The angle between the planes is understood to mean the angle between the normal vectors of the two planes. It will be appreciated that the planes each formed from three corners of the abrasive grain may not be identical to the faces of the abrasive grain.

The abrasive grain may have at least one feature of symmetry. For example, it may have at least one plane of symmetry, in which case the abrasive grain is transformed into itself by a theoretical reflection at this plane of symmetry. The plane of symmetry may, for example, run at right angles to a straight line which is formed by two corners of the abrasive grain. Alternatively or additionally, the abrasive grain may have at least one axis of symmetry, in which case the abrasive grain is transformed into itself by a rotation by 180° about an axis of symmetry. On the basis of such features of symmetry, the abrasive grain maybe arranged in two or more different orientations on the underlayer, although they cause the same abrasive effect. In addition, a feature of symmetry, especially in the presence of a plane of symmetry, can facilitate the production of an abrasive grain since it is thus possible to use, for example, two similar or even identical dies.

In some working examples in which the abrasive grain has exactly two faces, these faces may both be curved. In other working examples in which the abrasive grain has exactly three faces, at least two or all three of these faces may be curved. For example, the faces may be concave or convex. It is likewise conceivable that an abrasive grain has only one single closed face. For example, an abrasive grain having only two edges and one face may be configured like a tetrahedron, in which case, however, there are effectively only two opposite or skewed edges of the tetrahedron as edges of the abrasive grain. The remaining four edges of the tetrahedra may, for example, be rounded off so as to form a circumferential, continuously curved, closed surface.

The edges of the abrasive grain may take the form of a curved line, in which case the curvature may be concave or convex.

The shape and size of the abrasive grain can be determined, for instance, with the aid of a microscope. The inventive abrasive grain may have a size over the entire size range which is also customary for conventional abrasive grains. Typically, abrasive grains having greater sizes lead to higher material removal from a processed surface than small abrasive grains. For example, the abrasive grain may have a size in the range from 100 µm to 2000 µm. This size can be determined experimentally with the aid of a microscope. It is understood to mean the diameter of a circle enveloping the microscope image of the abrasive grain, i.e. the smallest diameter of a circle that encloses the image.

The above-described shape of the abrasive grain is an idealized shape. However, the invention also encompasses abrasive grains which differ from this idealized shape within the scope of manufacturing tolerances. Possible deviations from the idealized shape may have one or more of the following causes:
- cavities or bubbles caused by enclosed air and/or other gases in a dispersion from which the abrasive grains are produced;
- absent corners and/or edges which arise through incomplete filling of a die and/or during the removal of a precursor of the abrasive grain from a die;
- collapsed side faces and/or edges which arise through shrinkage during the removal of a portion of the volatile components of the dispersion; especially collapsed faces which arise from the upper free surface of the dispersion which is not in contact with the die;
- material that has flaked away, caused by a drying and/or sintering process;
- broken corners and/or edges which arise through transport and/or during further processing of the abrasive grains as bulk material.

The deviations from the ideal case need not necessarily lead to disadvantageous properties of the abrasive grain. For example, broken corners and/or edges may also have the effect that further cutting edges arise compared to the ideal case, which can even have a positive effect on the abrasive action.

More particularly, the invention also encompasses abrasive grains whose shape corresponds only essentially to the idealized shape. For example, a portion of the surface of the abrasive grain is also regarded as a (single) face when this proportion actually contains two or more area portions, each of them coherent, which are in contact with one another at an edge at which an internal angle within the range from 160° to 200°, preferably from 170° to 190°, more preferably from 175° to 185°, is formed. In addition, a point on the surface is regarded as a corner when there is actually curvature at that point, but with radii of curvature of not more than 10%, preferably not more than 5, more preferably not more than 2%, of the above-defined size of the abrasive grain.

Preferably, however, the abrasive grain has an idealized shape as described above.

The abrasive grain may, for example, comprise or consist of a ceramic material, especially a polycrystalline ceramic material. Preferably, the abrasive grain comprises alumina, more preferably $\alpha$-$Al_2O_3$.

Alternatively or additionally, the abrasive grain may also comprise at least one further metal oxide, for instance sodium oxide, magnesium oxide, iron oxide, silicon oxide, calcium oxide, zirconium oxide, yttrium oxide, zinc oxide, cobalt oxide, nickel oxide, hafnium oxide, chromium oxide, praseodymium oxide, samarium oxide, ytterbium oxide, neodymium oxide, lanthanum oxide, gadolinium oxide, cerium oxide, dysprosium oxide, erbium oxide, lutetium oxide, titanium oxide, manganese oxide or any desired combinations thereof.

Many of these metal oxides originate from impurities in the starting materials, for example in alumina. Given sufficiently low proportions in the abrasive grain, however, such impurities have no adverse effect on the production and use of the abrasive grain. Some of these impurities may even have a positive effect on the abrasive grain.

Fractions of zirconium oxide or yttrium oxide may originate, for example, from grinding balls which can be used in a grinding step in the production of the abrasive grains. Fractions of iron oxide may originate from a grinding vessel which is used in such a grinding step.

Likewise alternatively or additionally, the abrasive grain may comprise further hard substances, for example silicon carbide.

In addition, the abrasive grain may comprise at least one breakdown product of a dispersant described in detail hereinafter, which was used in the production of the abrasive grains. In addition, the abrasive grain may comprise at least one nucleating agent or breakdown product thereof which was used in the production of the abrasive grains. The nucleating agent may, for example, be magnesium oxide which has already been mentioned above.

Moreover, the abrasive grain may also comprise at least one of the further substances described in EP 615 816 A1.

The ingredients mentioned can be determined with the aid of chemical analysis methods known per se.

The abrasive grain may comprise or consist of a structure having one or more different phases. A first phase may consist of alumina, more preferably of $\alpha$-$Al_2O_3$. A second phase may consist of one or more of the abovementioned further metal oxides and/or further hard substances.

The proportion of alumina, especially of $\alpha$-$Al_2O_3$, in the abrasive grain may, for example, be at least 25% by weight, preferably at least 50% by weight, further preferably at least 70% by weight, more preferably at least 95% by weight.

The abrasive grain may have a coating which covers only part of the surface, especially only one or more edges and/or only one of several flat areas of the surface. The coating may, for instance, be a ferromagnetic or paramagnetic coating. Such a partial coating of the surface with a ferromagnetic or paramagnetic material enables alignment of the abrasive grain in a given direction in a magnetic field applied during the scattering operation. Alternatively, it may also be a coating of a material having elevated thermal conductivity or a coating which enables increased adhesion of the abrasive grain on the abrasive underlayer.

A further aspect of the invention relates to a collective of abrasive grains. A collective of abrasive grains is understood here and hereinafter to mean a coherent collection of abrasive grains. For example, this may be a collection of abrasive grains which are present in a container and are stored and/or transported as such, for example in a sack.

Such a collection of abrasive grains can also be used to produce an abrasive article. A collective of abrasive grains is also regarded as the entirety of all the abrasive grains present in an abrasive article.

Preferably, the collective of abrasive grains contains at least 20% by weight, preferably at least 50% by weight and more preferably at least 90% by weight of inventive abrasive grains as described above. The other abrasive grains present in the collective may likewise have a defined shape, but one which differs from the inventive shape, or they may not have a defined form since they are, for example, broken abrasive grains. These other abrasive grains present in the collective are also referred to as "support grains".

It is conceivable and likewise within the scope of the invention that the inventive abrasive grains present in the collective are different from one another. For example, the collective of abrasive grains may contain a first fraction of abrasive grains of a first embodiment of the invention, and a second fraction of abrasive grains of a second embodiment of the invention that are different from the first embodiment of the invention. More particularly, the abrasive grains of the first embodiment of the invention may differ in terms of size and/or shape from the abrasive grains of the second embodiment of the invention.

The collective of abrasive grains may consist exclusively of identical inventive abrasive grains; more particularly, the collective in that case has a size distribution in the form of points.

The collective of abrasive grains may essentially have a size distribution which corresponds to a size standard customary in the abrasives industry, for example the American National Standards Institute (ANSI), the Standards of the Federation of European Producers of Abrasives (FEPA) or the Japanese Industrial Standard (JIS). For example, the collective of abrasive grains may essentially have a grain size of P12, P16, P20, P24, P30, P36, P40, P50, P60, P80, P100, P120, P150, P180, P220, P240, P280, P320, P360, P400, P500, P600, P800, P1000, P1200, P1500, P2000, P2500, P3000 or P5000 according to the FEPA standard. In this context, a size distribution "essentially" means that at least 90% by weight, preferably at least 95% by weight, further preferably at least 99% by weight and more preferably all of the abrasive grains in the collective of abrasive grains meet this standard.

As already described above, it is also conceivable that the collective contains at least two different fractions of inventive abrasive grains and/or at least one fraction of noninventive abrasive grains. Each of these fractions may itself have a size distribution corresponding in each case to one of the abovementioned size standards customary in the abrasives industry.

An inventive abrasive grain or an inventive collective of abrasive grains can be produced, for example, by the following process known from U.S. Pat. No. 5,201,916:

a. producing or providing a dispersion comprising α-alumina particles and/or particles that can be converted to α-alumina, and at least one volatile dispersion medium, preferably water;
b. introducing the dispersion into at least one depression of a die;
c. optionally squeegeeing an upper face of the die in order to remove at least a portion of the dispersion which stands above the upper face of the die;
d. removing a portion of the volatile components of the dispersion, so as to form at least one abrasive grain precursor;
e. removing the abrasive grain precursor from the die;
f. optionally calcining the abrasive grain precursor;
g. sintering the abrasive grain precursor in order to obtain at least one abrasive grain.

Before and/or during the production of the dispersion in step a), the raw materials, especially α-alumina particles and/or particles that can be converted to α-alumina, are ground. This can be effected, for example, with the aid of a ball mill, especially with the aid of a planetary ball mill or an attritor.

The dispersion may comprise at least one dispersant. Such a dispersant facilitates the formation of the dispersion and increases the stability thereof by, for example, forming layers around the individual grains which prevent lump formation. The dispersant may, for example, be a polymer. In general, the dispersant breaks down during the sintering in step g) if not earlier.

For production of the inventive abrasive grains, it is possible to use a casting mold, said casting mold comprising at least one die having at least one depression having a particular surface, the surface being complementary to the shape of at least a portion of the surface of the abrasive grain.

The die may comprise or consist of silicone, for example. The depressions may have an open top face through which the dispersion can be introduced. The depressions in the die each have a surface whose shape is complementary to the shape of at least one portion of the surface of the desired abrasive grain.

The precursor formed in step d) should preferably have sufficient mechanical stability to be further processible as bulk material in the subsequent steps. The optional calcining in step f) is advantageous or even required especially when the dispersion comprises a plurality of different raw materials and a phase transformation is required.

In a development of the process known from U.S. Pat. No. 5,201,916, the abovementioned die is advantageously just one part of a multipart casting mold which additionally comprises at least one shaping element, especially a further die or a ram element with which, in addition to the surface shaped in the first die, at least a portion of the remaining surface of the abrasive grain can be shaped.

Preferably, the ram elements do not completely close off the depressions of the die, such that the volatile component of the dispersion can escape.

More complicated shapes of abrasive grain bodies can be shaped in dies that can be assembled, in a similar manner to injection molding processes. For this purpose, at least one die has at least one introduction opening through which the dispersion can get into the depressions.

Another aspect of the invention relates to an abrasive article containing a collective of abrasive grains as described above. More particularly, it is thus possible for at least 20% by weight, preferably at least 50% by weight, more preferably at least 90% by weight, of all the abrasive grains of the abrasive article to take the form of inventive abrasive grains as described above. The other abrasive grains may likewise have a defined shape, but one which differs from the inventive shape, or they may not have a defined shape.

The abrasive article may, for example, be a coated abrasive article, an abrasive article web, a bonded abrasive article or an abrasive brush.

A coated abrasive article comprises an underlayer, especially a flexible underlayer, for example paper, vulcanized fiber, a film, a textile material, a foam or multilayer combinations thereof. The abrasive grains can be secured to the underlayer with the aid of a base binder ("make coat"). The make coat and the abrasive grains may be covered with a top binder ("size coat"). Optionally, above the size coat mentioned, it is also possible for a second top binder ("supersize coat") to be present.

The make coat, size coat and supersize coat used may be any binders known per se, for example composed of synthetic resin, for instance a phenolic resin, an epoxide, a urea resin, a melamine resin or an unsaturated polyester resin. The size coat and/or supersize coat may additionally comprise further customary active ingredients and/or fillers.

The abrasive article may be in different product forms, for example as an abrasive disk or as an abrasive belt.

The invention also encompasses a process for producing an inventive abrasive article as described above. The process comprises a step in which a collective of abrasive grains is fixed on and/or in a substrate, especially by means of a binder. The substrate may, for instance, be an underlayer, especially a flexible underlayer, of a coated abrasive article, a web material for an abrasive web, a matrix for a bonded abrasive or bristle for an abrasive brush. In the case of a coated abrasive article, the make coat and/or the abrasive grains and/or the size coat and/or supersize coat can be applied by a method known per se. For example, the abrasive grains can be applied by electrostatic or mechanical means (i.e. by gravimetric means). Because of the inventive shape of the abrasive grains, even in the case of mechanical scattering, a high proportion of the abrasive grains will be oriented on an abrasive underlayer such that at least one corner of the abrasive grain points away from the underlayer. It is thus possible to dispense with more complex electrostatic scattering.

In addition, the invention is also directed to a process for grinding a surface with an abrasive article as described above. The surface may especially be a painted surface. In the case of a painted surface, abrasive grains having sizes of 500 µm or less are particularly suitable.

The object is also achieved by an abrasive grain with a defined shape which comprises or consists of at least one component having essentially the shape of a twisted geometric elementary body. Preferably, the components are theoretical components from which the overall abrasive grain is composed only in a theoretical sense. The fact that the abrasive grain comprises or consists of at least two or more components should thus not necessarily be understood to the effect that the abrasive grain has been or is joined together from two or more components produced separately at first. Instead, the inventive abrasive grains are preferably formed and produced in one piece. The term "component" is also used here in the sense that an abrasive grain may consist only of a single component.

A body in the form of a twisted geometric elementary body is understood here and hereinafter to be a component having the following properties: the component contains a theoretical twist axis which cuts through the component and runs through a reference point on the surface of the component. The cross sections of the component that run at right angles to the twist axis are rotated about the twist axis relative to the elementary body by an angle, this angle depending on the distance of the cross section from the reference point. There is thus at least one first sectional plane at right angles to the twist axis in which the cross section of the component is rotated by a first angle relative to the elementary body, and a second sectional plane at right angles to the twist axis in which the cross section of the component is rotated by a second angle relative to the elementary body, the second angle being different from the first. The two angles mentioned may differ from one another by an angle differential in the range from 15° to 180°, preferably in the range from 20° to 180°, further preferably in the range from 30° to 150°, even further preferably in the range from 45° to 135°, more preferably in the range from 60° to 120° and most preferably 90°.

The above-described angle differentials may especially exist between two sectional planes in opposite surface regions of the component, especially between two opposite surfaces of the abrasive grain. The angle differential between two opposite surfaces is referred to here and hereinafter as overall twist angle. If the abrasive grain takes the form of a twisted cuboid having rectangular, especially square, base and top faces, the overall twist angle between the base and top face is advantageously in the range from 60° to 120°, preferably from 70° to 110° and further preferably from 80° to 100°, and is more preferably 90°. If, in contrast, the abrasive grain takes the form of a twisted prism having base and top faces in the form of equilateral triangles, the overall twist angle between the base and top face is advantageously in the range from 5° to 30°, preferably from 5° to 20°, more preferably from 5° to 15°. In some other working examples, however, angle differentials, especially overall twist angles, of about 45° are advantageous, as will be explained hereinafter.

In some embodiments, the angle mentioned has a linear dependence on the distance of the sectional plane from the reference point.

In many embodiments, the abrasive grain, because of the twisting of the component, can be anchored more securely in a make coat applied to an abrasive underlayer. Alternatively or additionally, in many embodiments, swarf which arises in the processing of a surface can be moved better from the surface because of the twisting, such that this swarf does not hinder the abrasive action and evolution of heat is reduced. More particularly, the swarf which arises in the course of grinding can be moved past the abrasive grain in a better way and therefore does not block the material removal space in front of the abrasive grain. Alternatively or additionally, in many embodiments, the cross-sectional area in contact with a surface being processed can change if the component is being removed gradually. Thus, even if abrasive grain is only ever being moved in a single direction relative to the surface being processed, the orientation of the cross-sectional area and of the edges and corners that bound it will change with time, which can be advantageous in some cases. In addition, the abrasive grains, because of the twisting, can themselves be oriented on an underlayer in the course of mechanical application with high probability in such a way that at least one tip and/or at least one edge of the abrasive grains points away from the underlayer.

At least one geometric elementary body may, for example, be a polyhedron, especially a prism, an antiprism, a pyramid or a frustopyramid. In other embodiments, at least one of the geometric elementary bodies may be a cone, a frustocone or a cylinder.

A cone is generally understood to mean a solid which is bounded by an essentially flat base face and a multitude of essentially straight shell segments, each point on the outline of the base face being connected to a common point in the cone (the cone tip) by one of the shell segments in each case, and the cone tip being outside the plane defined by the base face. More particularly, the cone may be a pyramid if the base face is a polygon. From each corner of the base face of such a pyramid, a straight lateral edge of the elementary body extends to the tip of the pyramid and can ensure cutting action. A component in the form of a twisted pyramid has correspondingly twisted lateral edges when the twist axis runs transverse, especially at right angles, to the base face. As an alternative to a polygonal base face, however, it is also conceivable that the base face of the cone has at least one curved section or even exclusively curved sections.

Analogously to the general definition above, a frustocone is understood to mean a part of a cone in which the cone tip has been removed by an essentially flat section. More particularly, the frustocone may be a frustopyramid having a polygonal base face. From each corner of the base face of such a frustopyramid, a lateral edge of the elementary body extends to the corresponding corner of the top face and can ensure cutting action. A component in the form of a twisted frustopyramid has correspondingly twisted lateral edges if the twist axis runs transverse, especially at right angles, to the base face. In addition, the top face of the frustopyramid has the same number of edges as the base face, which leads to a further increase in cutting action.

A cylinder is understood here and hereinafter in general terms to mean a solid which is bounded by a base face and a top face, and also by an outer face. The base face and the top face are preferably essentially flat and likewise preferably essentially parallel to one another. The shell face is formed by an array of essentially mutually parallel segments. If these segments run essentially at right angles to the base face and the top face, the result is a straight cylinder. However, skewed cylinders are likewise conceivable and are within the scope of the invention. The base face of the cylinder may, for example, be a polygon; in this case, the elementary body takes the form of a prism with straight lateral edges which join corners of the base face and the top face to one another. A component in the form of a twisted prism has correspondingly twisted lateral edges if the twist axis runs transverse, especially at right angles, to the base face. Alternatively, the base face and a top face of the cylinder may also have a shape selected from the group consisting of ellipses, rectangles with rounded corners and lenses (sections of two circles, especially with identical radii).

An antiprism is bounded by exactly two congruent n-edged polygons and 2n triangles, especially equilateral triangles. At a corner, there is always a junction of one n-edged polygon and three triangles. The total number of edges in an antiprism is 4n, namely n edges in the base face, n edges in the opposite top face and 2n lateral edges that run between the base face and the top face. A component in the form of a twisted antiprism has correspondingly twisted lateral edges when the twist axis runs transverse, especially at right angles, to the base face.

The abovementioned cones, frustocones, cylinders and antiprisms each have an essentially flat base face. Polyhedra, which do not form part of this category, likewise contain flat base faces. The reference point through which the twist axis runs may be within this base face, especially in the center of this base face or at the base point of a cone or frustocone. The twist axis may extend transverse, especially at right angles, to the base face. If the base face is circular, it is preferable that the base point does not run through the center of the base face and/or the twist axis does not extend at right angles to the base face.

In advantageous embodiments, the abrasive grain contains a base element having a bottom side and an opposite top side which is especially parallel to the bottom side, and also at least one top element having a bottom side disposed on the top side of the base element. The base element and the top element should also preferably be regarded only as theoretical components of the abrasive grain.

The base element and/or at least one top element may form one of the components, i.e. essentially have the shape of a twisted geometric elementary body having one or more of the abovementioned features. The bottom side of the base element may form the base face of a twisted elementary body, for example the base face of a twisted frustocone. Alternatively or additionally, the bottom side of the top element may form the base face of a twisted elementary body, for example the base face of a twisted cone. If both the base element and the top element form a twisted geometric elementary body, the two twist axes may be parallel to one another and may even coincide.

The shapes of the base element and the top element may be chosen independently of one another. For example, the base element may take the form of an untwisted frustocone and the top element the form of a twisted prism. Alternatively, the base element may have the shape of a twisted frustopyramid and the top element the shape of an untwisted circular cylinder.

Alternatively, both the base element and the top element may take the form of twisted cuboids. It is likewise conceivable that the base element or the top element is neither an elementary body nor a twisted elementary body, provided that at least one other component of these types has this property.

The bottom side of the base element may form a bottom side of the abrasive grain. If the base element takes the form of a twisted geometric base element, the base element and hence the entire abrasive grain can be anchored in a particularly stable manner in a make coat applied to an abrasive underlayer. For a base element, angle differentials between the bottom side and top side of about 45° are advantageous, because this can result in corners of the bottom side of the base element projecting beyond the top side of the base element.

A top side of the top element may form a top side of the abrasive grain. In that case, the cross-sectional area in contact with a surface being processed can change if the top element is gradually removed in the course of grinding. Thus, even if the abrasive grain is only ever moved in a single direction relative to the surface being processed, there will nevertheless be a change in the orientation of the cross-sectional area with time, which can be advantageous in some cases. Appropriately, the top side of the top element runs parallel to and opposite the bottom side of the base element. This is because, in that case, the top side of the top element already runs parallel to a surface being processed at the start of the grinding process if the bottom side of the base element lies atop the abrasive underlayer.

In many embodiments, it may be advantageous if the transition region between the base element and top element does not form a sharp edge, since this would result in a disadvantageous force flow. This force flow could, especially in the case of the preferred ceramic abrasive grains, lead to comparatively easy fracture in this transition region. Instead, the transition region may contain, for example, a rounded and/or chamfered area between the base element and top element; these variants too are encompassed by the invention. The extent of the rounded or chamfered area, especially the extent in a plane parallel to the bottom side of the base element and/or at right angles to the bottom side of the base element, may be up to ⅕ of the size of the abrasive grain defined below. In some embodiments, the extent of the rounded or chamfered area should be at least ¹⁄₁₅ of the size of the abrasive grain. In addition, a chamfered or rounded area allows easier removal of an abrasive grain precursor from a die, for example in a process as described in detail below.

The shape and size of the abrasive grain can be determined, for instance, with the aid of a microscope. The inventive abrasive grain may have a size over the entire size range which is also customary for conventional abrasive grains. Typically, abrasive grains with greater sizes lead to higher material removal from a surface being processed than smaller abrasive grains. For example, the abrasive grain may have a size in the range from 100 µm to 2000 µm. This size can be determined experimentally with the aid of a microscope. It is understood to mean the diameter of a circle enveloping the microscope image of the abrasive grain, i.e. the smallest diameter of a circle surrounding the image.

The ratio between the base face diameter and height of the abrasive grain is preferably in the range from 1:3 to 12:1. In some variants, this ratio is in the range from 1:1 to 10:1 and more preferably in the range from 4:1 to 9:1. The base face diameter is understood here and hereinafter to mean the diameter of a circle enveloping the base face of the abrasive grain. This base face may, for example, be the abovementioned base face of a twisted cone, a twisted frustocone or a twisted cylinder. The height of the abrasive grain is understood to mean the extent of the abrasive grain measured along the twist axis.

If, in one example, the base face is an equilateral triangle with side length a, the base face diameter is $$\frac{2\sqrt{3}}{3}a.$$

In this case, the ratio between side length of the triangle and height of the abrasive grain may be in the range from 1:3 to 8:1, preferably from 1:1 to 7:1 and more preferably from 4:1 to 6:1. If, in a second example, the base face is a square having side length a, the base face diameter is $\sqrt{2}a$. In this case too, the ratio between the side length of the square and the height of the abrasive grain may be in the range from 1:3 to 8:1, preferably from 1:1 to 7:1 and more preferably from 4:1 to 6:1.

In other variants, the ratio between the base face diameter and height of the abrasive grain may be in the range from 1:2 to 2:1, further preferably from 1:1.5 to 1.5:1, even further preferably from 1:1.2 to 1.2:1. In these variants, in the case of electrostatic application, the maximum possible differences with regard to the maximum extent at right angles to the underlayer between "upright" and "recumbent" abrasive grains are much smaller. The advantage of a monomodal abrasive grain size distribution can be enhanced even further as a result.

The ratio of the length of the base face to the width of the base face of the abrasive grain is preferably less than 10:1. The length of the base face is regarded here and hereinafter as the greatest linear extent of the base face. The width of the base face is understood here and hereinafter to mean the extent of the base face measured at right angles thereto. If the base face is, for example, a rectangle having a longer side and a shorter side, the abovementioned ratio is the same as the ratio of these two side lengths. For an elliptical base face, the ratio is equal to the ratio of the two semi-major axes. In some working examples, it is preferable when said ratio of length and width is in the range from 10:1 to 10:6, especially from 10:2 to 10:3.

The above-described shape of the abrasive grain is an idealized shape. However, the invention also encompasses abrasive grains which differ from this idealized shape within the scope of manufacturing tolerances. Possible deviations from the idealized shape may have one or more of the following causes:

cavities or bubbles caused by enclosed air and/or other gases in a dispersion from which the abrasive grains are produced;

absent corners and/or edges which arise through incomplete filling of a die and/or during the removal of a precursor of the abrasive grain from a die;

collapsed side faces and/or edges which arise through shrinkage during the removal of a portion of the volatile components of the dispersion; especially collapsed faces which arise from the upper free surface of the dispersion which is not in contact with the die;

material that has flaked away, caused by a drying and/or sintering process;

broken corners and/or edges which arise through transport and/or during further processing of the abrasive grains as bulk material.

The deviations from the ideal case need not necessarily lead to disadvantageous properties of the abrasive grain. For example, broken corners and/or edges may also have the effect that further cutting edges arise compared to the ideal case, which can even have a positive effect on the abrasive action.

More particularly, the invention also encompasses abrasive grains whose shape corresponds only essentially to the idealized shape. For example, a point on the surface is regarded as a corner or tip (especially as the tip of a cone) when there is actually curvature at that point, but with radii of curvature of not more than 10%, preferably not more than 5%, more preferably not more than 2%, of the above-defined size of the abrasive grain. In addition, a face, especially a base face, of an elementary body is regarded as essentially flat even if it is dished and has radii of curvature of at least twice, preferably at least five times, more preferably at least ten times, the size of the abrasive grain. In addition, untwisted edges of a geometric elementary body in the shape of a polyhedron, cone, frustocone or cylinder are also regarded as linear even when they are at least partly or even entirely curved but have a radius of curvature of at least twice, preferably at least five times, more preferably at least ten times, the size of the abrasive grain.

Preferably, however, the abrasive grain has an idealized shape as described above.

The abrasive grain may, for example, comprise or consist of a ceramic material, especially a polycrystalline ceramic material. Preferably, the abrasive grain comprises alumina, more preferably $\alpha$-$Al_2O_3$.

Alternatively or additionally, the abrasive grain may also comprise at least one further metal oxide, for instance sodium oxide, magnesium oxide, iron oxide, silicon oxide, calcium oxide, zirconium oxide, yttrium oxide, zinc oxide, cobalt oxide, nickel oxide, hafnium oxide, chromium oxide, praseodymium oxide, samarium oxide, ytterbium oxide, neodymium oxide, lanthanum oxide, gadolinium oxide, cerium oxide, dysprosium oxide, erbium oxide, lutetium oxide, titanium oxide, manganese oxide or any desired combinations thereof.

Many of these metal oxides originate from impurities in the starting materials, for example in alumina. Given sufficiently low proportions in the abrasive grain, however, such impurities have no adverse effect on the production and use of the abrasive grain. Some of these impurities may even have a positive effect on the abrasive grain.

Fractions of zirconium oxide or yttrium oxide may originate, for example, from grinding balls which can be used in a grinding step in the production of the abrasive grains. Fractions of iron oxide may originate from a grinding vessel which is used in such a grinding step.

Likewise alternatively or additionally, the abrasive grain may comprise further hard substances, for example silicon carbide.

In addition, the abrasive grain may comprise at least one breakdown product of a dispersant described in detail hereinafter, which was used in the production of the abrasive grains. In addition, the abrasive grain may comprise at least one nucleating agent or breakdown product thereof and/or at least one sintering aid and/or breakdown product thereof which was used in the production of the abrasive grains. The sintering aid may, for example, be magnesium oxide which has already been mentioned above.

Moreover, the abrasive grain may also comprise at least one of the further substances described in EP 615 816 A1.

The ingredients mentioned can be determined with the aid of chemical analysis methods known per se.

The abrasive grain may comprise or consist of a structure having one or more different phases. A first phase may consist of alumina, more preferably of $\alpha$-$Al_2O_3$. A second phase may consist of one or more of the abovementioned further metal oxides and/or further hard substances.

The proportion of alumina, especially of $\alpha$-$Al_2O_3$, in the abrasive grain may, for example, be at least 25% by weight, preferably at least 50% by weight, further preferably at least 70% by weight, more preferably at least 95% by weight.

The abrasive grain may have a coating which covers only part of the surface, especially only one or more edges and/or only one of several flat areas of the surface. The coating may, for instance, be a ferromagnetic or paramagnetic coating. Such a partial coating of the surface with a ferromagnetic or paramagnetic material enables alignment of the abrasive grain in a given direction in a magnetic field applied during the scattering operation. Alternatively, it may also be a coating of a material having elevated thermal conductivity or a coating which enables increased adhesion of the abrasive grain on the abrasive under layer.

A further aspect of the invention relates to a collective of abrasive grains. A collective of abrasive grains is understood here and hereinafter to mean a coherent collection of abrasive grains. For example, this may be a collection of abrasive grains which are present in a container and are stored and transported as such, for example in a sack.

Such a collection of abrasive grains can also be used to produce an abrasive article. A collective of abrasive grains is also regarded as the entirety of all the abrasive grains present in an abrasive article.

Preferably, the collective of abrasive grains contains at least 20% by weight, preferably at least 50% by weight and more preferably at least 90% by weight of inventive abrasive grains as described above. The other abrasive grains present in the collective may likewise have a defined shape, but one which differs from the inventive shape, or they may not have a defined shape since they are, for example, broken abrasive grains. These other abrasive grains present in the collective are also referred to as "support grains".

It is conceivable and likewise within the scope of the invention that the inventive abrasive grains present in the collective are different from one another. For example, the collective of abrasive grains may contain a first fraction of abrasive grains of a first embodiment of the invention, and a second fraction of abrasive grains of a second embodiment of the invention that are different from the first embodiment of the invention. More particularly, the abrasive grains of the first embodiment of the invention may differ in terms of size and/or shape from the abrasive grains of the second embodiment of the invention.

The collective of abrasive grains may consist exclusively of identical inventive abrasive grains; more particularly, the collective in that case has a size distribution in the form of points.

The collective of abrasive grains may essentially have a size distribution which corresponds to a size standard customary in the abrasives industry, for example the American National Standards Institute (ANSI), the Standards of the Federation of European Producers of Abrasives (FEPA) or the Japanese Industrial Standard (JIS). For example, the collective of abrasive grains may essentially have a grain size of P12, P16, P20, P24, P30, P36, P40, P50, P60, P80, P100, P120, P150, P180, P220, P240, P280, P320, P360, P400, P500, P600, P800, P1000, P1200, P1500, P2000, P2500, P3000 or P5000 according to the FEPA standard. In this context, a size distribution "essentially" means that at least 90% by weight, preferably at least 95% by weight, further preferably at least 99% by weight and more preferably all of the abrasive grains in the collective of abrasive grains meet this standard.

As already described above, it is also conceivable that the collective contains at least two different fractions of inventive abrasive grains and/or at least one fraction of noninventive abrasive grains. Each of these fractions may itself have a size distribution corresponding in each case to one of the abovementioned size standards customary in the abrasives industry.

An inventive abrasive grain or an inventive collective of abrasive grains can be produced, for example, by the following process known from U.S. Pat. No. 5,201,916:

a. producing or providing a dispersion comprising $\alpha$-alumina particles and/or particles that can be converted to $\alpha$-alumina, and at least one volatile dispersion medium, preferably water;
b. introducing the dispersion into at least one depression of a die;
c. optionally squeegeeing an upper face of the die in order to remove at least a portion of the dispersion which stands above the upper face of the die;
d. removing a portion of the volatile components of the dispersion, so as to form at least one abrasive grain precursor;
e. removing the abrasive grain precursor from the die;
f. optionally calcining the abrasive grain precursor;
g. sintering the abrasive grain precursor in order to obtain at least one abrasive grain.

Before and/or during the production of the dispersion in step a), the raw materials, especially $\alpha$-alumina particles and/or particles that can be converted to $\alpha$-alumina, are ground. This can be effected, for example, with the aid of a ball mill, especially with the aid of a planetary ball mill.

The dispersion may comprise at least one dispersant. Such a dispersant facilitates the formation of the dispersion and increases the stability thereof by, for example, forming layers around the individual grains which prevent lump formation. The dispersant may, for example, be a polymer. In general, the dispersant breaks down during the sintering in step g) if not earlier.

For production of the inventive abrasive grains, it is possible to use a casting mold, said casting mold comprising at least one die having at least one depression having a particular surface, the surface being complementary to the shape of at least a portion of the surface of the abrasive grain.

The die may comprise or consist of silicone, for example. The depressions may have an open top face through which the dispersion can be introduced. The depressions in the die each have a surface whose shape is complementary to the shape of at least one portion of the surface of the desired abrasive grain. For example, it may be complementary to the part of the surface of the abrasive grain that does not form the bottom side of a base element. As a result of the production, this bottom side may then be dished to a certain degree.

The at least one depression may be coated, for example with Teflon. This can facilitate the introduction of the dispersion in step b) and the removal of the abrasive grain precursor in step e).

The precursor formed in step d) should preferably have sufficient mechanical stability to be further processable as bulk material in the subsequent steps. The optional calcining in step f) is advantageous or even required especially when the dispersion comprises a plurality of different raw materials and a phase transformation is required.

In a development of the process known from U.S. Pat. No. 5,201,916, for some abrasive grains, the abovementioned die can advantageously only be one part of a multipart casting mold which additionally comprises at least one shaping element, especially a further die or a ram element with which, in addition to the surface shaped in the first die, at least a portion of the remaining surface of the abrasive grain can be shaped.

Preferably, the ram elements do not completely close off the depressions of the die, such that the volatile component of the dispersion can escape.

More complicated shapes of abrasive grains can be shaped in dies that can be assembled, in a similar manner to injection molding processes. For this purpose, at least one die has at least one introduction opening through which the dispersion can get into the depressions.

Alternatively, many of the inventive abrasive grains can be produced with the aid of an extrusion process. This is especially true of abrasive grains which consist of a single element which at least essentially has the shape of a twisted cylinder, especially of a twisted prism (for example a twisted cuboid with rectangular base face and top face) or of a twisted cylinder with elliptical base face and top face. The production of abrasive grains in the form of untwisted prisms with the aid of an extrusion process is known from WO 2012/092605 A2.

The extrusion process comprises the following steps:
a. producing or providing a dispersion comprising α-alumina particles and/or particles that can be converted to α-alumina, and at least one volatile dispersion medium, preferably water;
b. extruding the dispersion through an exit orifice of a nozzle, the exit orifice having at least essentially the shape of a twisted cylinder, such that an extrudate is obtained;
c. severing the extrudate to obtain abrasive grain precursors;
d. optionally calcining the abrasive grain precursors;
e. sintering the abrasive grain precursors in order to obtain at least one abrasive grain.

The extrusion of plastic ceramic compositions per se is known to those skilled in the art and is described, for example, in section 7.3.2.2.2 of Salmang, Scholze, Telle: Keramik [Ceramics], Springer, 7th edition.

The configuration of the exit orifice of the nozzle allows the production of abrasive grains in the form of twisted cylinders complementary to the shape of the exit orifice. Analogously to the above definition, there is thus a theoretical twist axis which runs through the exit orifice. The cross sections of the exit orifice that run at right angles to the twist axis are twisted about the twist axis by an angle relative to a theoretical cylinder, this angle being dependent on the distance of the cross section from a reference point on the twist axis, and this dependence preferably being linear.

The cross-sectional area of the exit orifice of the nozzle determines the base face of the twisted cylinder. If the cross-sectional area, for example, is polygonal, the twisted cylinder will be a twisted prism. With an elliptical cross-sectional area, abrasive grains can be produced in the form of a twisted cylinder with an elliptical base face. Analogously to the above-described size figures for the base face of the abrasive grains, the cross-sectional area of the exit orifice may also be assigned a base face diameter, a length and a width. The ratio of length and width of the cross-sectional area of the exit orifice determines the ratio of length and width of the base face of the abrasive grains.

The severing in step c can be effected, for example, with the aid of a blade, especially a rotating blade. The distances at which the extrudate is severed determines the above-defined height of the abrasive grains.

The dispersion produced or provided in step a) of the extrusion process may further comprise at least one organic additive. The organic additive may, for instance, be a plasticizing agent with which the dispersion can be made extrudable, especially by imparting a viscosity suitable for extrusion thereto. The organic additive may also be a binder with which the strength of the abrasive grain precursor can be increased.

Between step c) and the optional step d), the organic additive mentioned can be burnt out. For this purpose, it can be brought to a suitable temperature for a suitable period. Suitable periods of time and temperatures are known to those skilled in the art or can at least be ascertained by routine tests. For example, the organic additive can be burnt out for 2 h to 4 h at 350° C. to 450° C.

In a further alternative, at least some of the inventive abrasive grains can also be produced by a process comprising the following steps:
a. producing or providing a dispersion comprising α-alumina particles and/or particles that can be converted to α-alumina, and at least one volatile dispersion medium, preferably water;
b. producing a film from the dispersion;
c. severing the film produced in step b) to form film sections;
d. shaping the film sections produced in step c) to obtain abrasive grain precursors;
e. optionally calcining the abrasive grain precursors;
f. sintering the abrasive grain precursors in order to obtain at least one abrasive grain.

The film can be produced in step b), for example, by a film drawing or film casting method known per se. Film casting is known to those skilled in the art and is described, for example, in section 7.3.2.1.3 of Salmang, Scholze, Telle: Keramik, Springer, 7th edition. The shaping in step d) can be achieved, for instance, by embossing.

The dispersion produced or provided in step a) of the process described last may further comprise at least one organic additive as well. The organic additive may, for instance, be a plasticizing agent with which a suitable viscosity can be imparted to the dispersion. The organic additive may also be a binder with which the strength of the abrasive grain precursor can be increased.

Between step d) and the optional step e) of the process described last, the organic additive mentioned can be burnt out. For this purpose, it can be brought to a suitable temperature for a suitable period. Suitable periods of time and temperatures are known to those skilled in the art or can at least be ascertained by routine tests. For example, the organic additive can be burnt out for 2 h to 4 h at 350° C. to 450° C.

Another aspect of the invention relates to an abrasive article containing a collective of abrasive grains as described above. More particularly, it is thus possible for at least 20% by weight, preferably at least 50% by weight, more preferably at least 90% by weight, of all the abrasive grains of the abrasive article to take the form of inventive abrasive grains as described above. The other abrasive grains may likewise have a defined shape, but one which differs from the inventive shape, or they may not have a defined shape.

The abrasive article may, for example, be a coated abrasive article, an abrasive article web, a bonded abrasive article or an abrasive brush.

A coated abrasive article comprises an underlayer, especially a flexible underlayer, for example paper, vulcanized fiber, a film, a textile material, a foam or multilayer combinations thereof. The abrasive grains can be secured to the underlayer with the aid of a base binder ("make coat"). The make coat and the abrasive grains may be covered with a top binder ("size coat"). Optionally, above the size coat mentioned, it is also possible for a second top binder ("supersize coat") to be present.

The make coat, size coat and supersize coat used may be any binders known per se, for example composed of synthetic resin, for instance a phenolic resin, an epoxide, a urea resin, a melamine resin or an unsaturated polyester resin. The size coat and/or supersize coat may additionally comprise further customary active ingredients and/or fillers.

The abrasive article may be in different product forms, for example as an abrasive disk or as an abrasive belt.

The invention also encompasses a process for producing an inventive abrasive article as described above. The process comprises a step in which a collective of abrasive grains is fixed on and/or in a substrate, especially by means of a binder. The substrate may, for instance, be an underlayer, especially a flexible underlayer, of a coated abrasive article, a web material for an abrasive web, a matrix for a bonded abrasive or bristle for an abrasive brush. In the case of a coated abrasive article, the make coat and/or the abrasive grains and/or the size coat and/or supersize coat can be applied by a method known per se. For example, the abrasive grains can be applied by electrostatic or mechanical means (i.e. by gravimetric means).

In addition, the invention is also directed to a process for grinding a surface with a grinding article as described above. The surface may especially be a painted surface. In the case of a painted surface, abrasive grains having sizes of 500 μm or less are particularly suitable.

The object is additionally achieved by an abrasive grain having at least six faces, wherein at least one of the faces has concave curvature. Concave curvature is curvature in the inward direction, i.e. into the body. In the case of an abrasive grain having a face with such concave curvature, it is necessarily the case that a corner and/or edge with an acute angle between converging faces must occur elsewhere, for example at the edge of the curved face, and/or that a convex curvature with smaller radii of curvature than would be the case without the inventive concave curvature must be present elsewhere.

Preferably, the at least one concave face has two curvatures in different three-dimensional directions. The two curvatures are preferably both concave, such that the face has at least one point which projects particularly far into the body.

The acute corners and/or edges which are implicitly present as a result of the concave curvature generally point in several three-dimensional directions. Especially in the case of mechanical scattering of the abrasive grains on an underlayer, the result is therefore a random distribution of the orientations of the abrasive grains, in which a sufficient number of acute corners and/or edges point away from the underlayer.

Solids having concave faces are comparatively easy to produce. It is possible, for example, to provide a correspondingly convex depression in a die, into which a dispersion as described in detail further down is introduced.

It is also possible to provide a starting composition, especially a dispersion as described further down, in such a way that a casting having flat faces or faces curved only in one direction contracts in the course of drying, or in the course of escape of the volatile component, in such a way that the faces curve inward.

The object is also achieved by an abrasive grain, especially as described above, wherein the abrasive grain has a structure with at least one reentrant corner.

The corner may be a point on the surface of the body at which edges meet, or a tip at which a dished face comes to a point, for example the point of a cone or droplet.

A reentrant corner is understood to mean a corner for which there is a tangential area which can be used to define a circle having the corner as its center, the circumference of which is completely within the solid.

A solid having a reentrant corner is, just like the solid having a concave face, not a convex solid. Both kinds of solids have "dents".

For the solid having a reentrant corner too, it is necessarily the case that corners and/or edges with an acute angle between converging faces must occur elsewhere, for example at the edge of the "dent", and/or that a convex curvature with smaller radii of curvature than would be the case without the inventive reentrant corner must be present elsewhere. These implicitly present acute corners and/or edges point in several three-dimensional directions. Especially in the case of mechanical scattering of the abrasive grains on an underlayer, the result is therefore a random distribution of the orientations of the abrasive grains, in which a sufficient number of acute corners and/or edges point away from the underlayer.

In an advantageous execution of the invention, an abrasive grain having a shape as described above additionally has at least one curved edge, especially a concave edge.

The corners that arise at converging concave edges are more acute than the corners that are formed by corresponding straight edges.

These acute corners that implicitly exist also contribute to improved cutting capacity of the abrasive grain.

In a further advantageous execution, the abrasive grain takes the form of a solid having corners, wherein at least some of the corners, especially all the convex corners, correspond to the corners of a convex polyhedron, especially a Platonic solid, an Archimedean solid, a Catalan solid, a prism, an antiprism, or a Platonic solid, Archimedean solid, Catalan solid, prism or antiprism with linear distortion.

A convex corner is understood here to mean a corner on the surface of the solid which does not lie on a connecting line between two points on the solid.

The solid shape of the abrasive grain then arises on the basis of simple geometric solids, namely complex polyhedra, having "dents" or recesses, either in the form of inward curvature or of a reentrant corner. Solids of this kind usually have a multitude of features of symmetry, such that a number of equivalent alignments on an underlayer arise for the individual solids.

In the case of scattering of abrasive grains on an underlayer, a sufficiently large number of acute edges and/or corners point in the grinding direction.

Platonic solids are those convex polyhedra whose lateral faces are all mutually congruent regular polygons, any number of which converge at every corner. The Platonic solids include the tetrahedron, octahedron and icosahedron, each of which have equilateral triangles as lateral faces, the hexagon or cube, which have squares as lateral faces, and the dodecahedron with equilateral pentagons as lateral faces.

The Archimedean solids are convex polyhedra having lateral faces that are regular polygons. The characteristic property of the Archimedean solids is that all the corners of the solid are entirely identical with respect to one another.

Prisms, antiprisms and the five Platonic solids are not counted among the Archimedean solids.

The Archimedean solids especially include the Platonic solids having capped corners (frusto-tetrahedron, -hexahedron, -octahedron, -dodecahedron and -icosahedron).

A prism is bounded by exactly two congruent n-edged polygons and n parallelograms. The n-edged polygons may especially be regular n-edged polygons. Said parallelograms are rectangles, especially squares, in the case of a straight prism. Such a prism exists for every natural number n greater or equal to three. At any corner, one n-edged polygon and two parallelograms always meet.

An antiprism is bounded by exactly two congruent n-edged polygons and 2n triangles, especially equilateral triangles. Such an antiprism exists for every natural number n greater than or equal to three. At any corner, one n-edged polygon and three triangles always meet.

The Catalan solids have only one kind of face, namely identical irregular polygons, but have at least two different kinds of corners.

In a Platonic solid, Archimedean solid, Catalan solid, prism or antiprism with linear distortion, i.e. with compression or extension along at least one axis, especially an axis of symmetry, not all symmetries are maintained compared to the undistorted form. Since these forms, however, have a multitude of features of symmetry, the linear-distorted corresponding solid will always have a number of features of symmetry. A cuboid, for example, is a linear-distorted cube which has fewer features of symmetry that a cube but still has a large number of regular features.

More particularly, the "dents" or recesses are on all the faces of the convex polyhedron, or preferably on all the faces except for a contact face. On the side of the solid facing the contact face, the lack of a recess there causes more material to be accumulated, such that an abrasive grain, when scattered on an underlayer, falls preferentially onto this face. The more acute corners and/or edges then point away from the underlayer.

Simple geometric solids having a recess can be produced reproducibly in a comparatively undemanding manner.

The shape and size of the abrasive grain can be determined, for instance, with the aid of a microscope. The inventive abrasive grain may have a size over the entire size range which is also customary for conventional abrasive grains. Typically, abrasive grains with greater sizes lead to higher material removal from a surface being processed than smaller abrasive grains. For example, the abrasive grain may have a size in the range from 100 µm to 2000 µm. This size can be determined experimentally with the aid of a microscope. It is understood to mean the diameter of a circle enveloping the microscope image of the abrasive grain, i.e. the smallest diameter of a circle surrounding the image.

The above-described shape of the abrasive grain is an idealized shape. However, the invention also encompasses abrasive grains which differ from this idealized shape within the scope of manufacturing tolerances. Possible deviations from the idealized shape may have one or more of the following causes:

- cavities or bubbles caused by enclosed air and/or other gases in a dispersion from which the abrasive grains are produced;
- absent corners and/or edges which arise through incomplete filling of a die and/or during the removal of a precursor of the abrasive grain from a die;
- collapsed side faces and/or edges which arise through shrinkage during the removal of a portion of the volatile components of the dispersion; especially collapsed faces which arise from the upper free surface of the dispersion which is not in contact with the die;
- material that has flaked away, caused by a drying and/or sintering process;
- broken corners and/or edges which arise through transport and/or during further processing of the abrasive grains as bulk material.

The deviations from the ideal case need not necessarily lead to disadvantageous properties of the abrasive grain. For example, broken corners and/or edges may also have the effect that further cutting edges arise compared to the ideal case, which can even have a positive effect on the abrasive action.

More particularly, the invention also encompasses abrasive grains whose shape corresponds only essentially to the idealized shape. A point on the outline is essentially regarded as a corner when the radius of curvature at that point is not more than 15%, preferably not more than 10%, more preferably not more than 5%, particularly preferably not more than 2%, of the diameter of the abrasive grain.

Preferably, however, the abrasive grain has an idealized shape as described above.

The abrasive grain may, for example, comprise or consist of a ceramic material, especially a polycrystalline ceramic material. Preferably, the abrasive grain comprises alumina, more preferably α-$Al_2O_3$.

Alternatively or additionally, the abrasive grain may also comprise at least one further metal oxide, for instance sodium oxide, magnesium oxide, iron oxide, silicon oxide, calcium oxide, zirconium oxide, yttrium oxide, zinc oxide, cobalt oxide, nickel oxide, hafnium oxide, chromium oxide, praseodymium oxide, samarium oxide, ytterbium oxide, neodymium oxide, lanthanum oxide, gadolinium oxide, cerium oxide, dysprosium oxide, erbium oxide, lutetium oxide, titanium oxide, manganese oxide or any desired combinations thereof.

Many of these metal oxides originate from impurities in the starting materials, for example in alumina. Given sufficiently low proportions in the abrasive grain, however, such impurities have no adverse effect on the production and use of the abrasive grain. Some of these impurities may even have a positive effect on the abrasive grain.

Fractions of zirconium oxide or yttrium oxide may originate, for example, from grinding balls which can be used in a grinding step in the production of the abrasive grains. Fractions of iron oxide may originate from a grinding vessel which is used in such a grinding step.

Likewise alternatively or additionally, the abrasive grain may comprise further hard substances, for example silicon carbide.

In addition, the abrasive grain may comprise at least one breakdown product of a dispersant described in detail hereinafter, which was used in the production of the abrasive grains. In addition, the abrasive grain may comprise at least one nucleating agent or breakdown product thereof which was used in the production of the abrasive grains. The nucleating agent may, for example, be magnesium oxide which has already been mentioned above.

Moreover, the abrasive grain may also comprise at least one of the further substances described in EP 615 816 A1.

The ingredients mentioned can be determined with the aid of chemical analysis methods known per se.

The abrasive grain may comprise or consist of a structure having one or more different phases. A first phase may consist of alumina, more preferably of $\alpha\text{-}Al_2O_3$. A second phase may consist of one or more of the abovementioned further metal oxides and/or further hard substances.

The proportion of alumina, especially of $\alpha\text{-}Al_2O_3$, in the abrasive grain may, for example, be at least 25% by weight, preferably at least 50% by weight, further preferably at least 70% by weight, more preferably at least 95% by weight.

The abrasive grain may have a coating which covers only part of the surface, especially only one or more edges and/or only one of several flat areas of the surface.

The coating may, for instance, be a ferromagnetic or paramagnetic coating. Such a partial coating of the surface with a ferromagnetic or paramagnetic material enables alignment of the abrasive grain in a given direction in a magnetic field applied during the scattering operation. Alternatively, it may also be a coating of a material having elevated thermal conductivity or a coating which enables increased adhesion of the abrasive grain on the abrasive underlayer.

A further aspect of the invention relates to a collective of abrasive grains. A collective of abrasive grains is understood here and hereinafter to mean a coherent collection of abrasive grains. For example, this may be a collection of abrasive grains which are present in a container and are stored and transported as such, for example in a sack.

Such a collection of abrasive grains can also be used to produce an abrasive article. A collective of abrasive grains is also regarded as the entirety of all the abrasive grains present in an abrasive article.

Preferably, the collective of abrasive grains contains at least 20% by weight, preferably at least 50% by weight and more preferably at least 90% by weight of inventive abrasive grains as described above. The other abrasive grains present in the collective may likewise have a defined shape, but one which differs from the inventive shape, or they may not have a defined shape since they are, for example, broken abrasive grains. These other abrasive grains present in the collective are also referred to as "support grains".

It is conceivable and likewise within the scope of the invention that the inventive abrasive grains present in the collective are different from one another. For example, the collective of abrasive grains may contain a first fraction of abrasive grains of a first embodiment of the invention, and a second fraction of abrasive grains of a second embodiment of the invention that are different from the first embodiment of the invention. More particularly, the abrasive grains of the first embodiment of the invention may differ in terms of size and shape from the abrasive grains of the second embodiment of the invention.

The collective of abrasive grains may consist exclusively of identical inventive abrasive grains; more particularly, the collective in that case has a size distribution in the form of points.

The collective of abrasive grains may essentially have a size distribution which corresponds to a size standard customary in the abrasives industry, for example the American National Standards Institute (ANSI), the Standards of the Federation of European Producers of Abrasives (FEPA) or the Japanese Industrial Standard (JIS). For example, the collective of the abrasive grains may essentially have a grain size of P12, P16, P20, P24, P30, P36, P40, P50, P60, P80, P100, P120, P150, P180, P220, P240, P280, P320, P360, P400, P500, P600, P800, P1000, P1200, P1500, P2000, P2500, P3000 or P5000 according to the FEPA standard. In this context, a size distribution "essentially" means that at least 90% by weight, preferably at least 95% by weight, further preferably at least 99% by weight and more preferably all of the abrasive grains in the collective of abrasive grains meet this standard.

As already described above, it is also conceivable that the collective contains at least two different fractions of inventive abrasive grains and/or at least one fraction of noninventive abrasive grains. Each of these fractions may itself have a size distribution corresponding in each case to one of the abovementioned size standards customary in the abrasives industry.

An inventive abrasive grain or an inventive collective of abrasive grains can be produced, for example, by the following process known from U.S. Pat. No. 5,201,916:

a. producing or providing a dispersion comprising $\alpha$-alumina particles and/or particles that can be converted to $\alpha$-alumina, and at least one volatile dispersion medium, preferably water;

b. introducing the dispersion into at least one depression of a die;

c. optionally squeegeeing an upper face of the die in order to remove at least a portion of the dispersion which stands above the upper face of the die;

d. removing a portion of the volatile components of the dispersion, so as to form at least one abrasive grain precursor;

e. removing the abrasive grain precursor from the die;

f. optionally calcining the abrasive grain precursor;

g. sintering the abrasive grain precursor in order to obtain at least one abrasive grain.

Before and/or during the production of the dispersion in step a), the raw materials, especially $\alpha$-alumina particles and/or particles that can be converted to $\alpha$-alumina, are ground. This can be effected, for example, with the aid of a ball mill, especially with the aid of a planetary ball mill.

The dispersion may comprise at least one dispersant. Such a dispersant facilitates the formation of the dispersion and increases the stability thereof by, for example, forming layers around the individual grains which prevent lump formation. The dispersant may, for example, be a polymer. In general, the dispersant breaks down during the sintering in step g) if not earlier.

For production of the inventive abrasive grains, it is possible, as described above, to use a casting mold, said casting mold comprising at least one die having at least one depression having a particular surface, the surface being complementary to the shape of at least part of the surface of the abrasive grain.

Preferably, there is a multitude of depressions in the die, and so it is possible with one casting operation to cast a multitude of abrasive grain bodies.

In a development of the process known from U.S. Pat. No. 5,201,916, the abovementioned die is advantageously just one part of a multipart casting mold which additionally comprises at least one shaping element, especially a further die or a ram element with which, in addition to the surface shaped in the first die, at least a portion of the remaining surface of the abrasive grain can be shaped.

For example, ram elements may be provided, which are guided into the filled depressions of the first die, which results, for example, in accordance with the invention, in "dents", namely concave curvatures and/or reentrant corners, in the bodies of the abrasive grains.

Preferably, the ram elements do not completely close off the depressions of the die, such that the volatile component of the dispersion can escape.

More complicated shapes of abrasive grain bodies can be shaped in dies that can be assembled, in a similar manner to injection molding processes. For this purpose, at least one die has at least one introduction opening through which the dispersion can get into the depressions.

The die and/or the ram element may comprise or consist of silicone, for example. The depressions may have an open top face through which the dispersion can be introduced.

The depressions in the die each have a surface whose shape is complementary to the shape of at least one portion of the surface of the desired abrasive grain.

Preferably, the die has depressions complementary to at least a portion of a convex polyhedron, especially of a Platonic solid, an Archimedean solid, a Catalan solid, a prism, an antiprism, or a Platonic solid, Archimedean solid, Catalan solid, prism or antiprism with linear distortion.

Preferably, the casting mold also has at least one ram element having at least one convex surface and/or at least one convex corner. Such a ram element can be used to shape correspondingly concave faces or reentrant corners of the abrasive grain body.

Preferably, a dispersion is poured into a die having a multitude of depressions and then shaping is undertaken with a ram plate having ram elements, the dispersion present in each depression being shaped by one ram element in the ram plate.

Additionally or alternatively, the depressions of the die may have convex faces, convex corners and/or convex edges with which correspondingly concave faces, reentrant corners and/or concave edges of the abrasive grain body can be shaped.

The casting mold may also comprise dies having only depressions with planar faces. Concave surfaces then arise, for example, in step d) when the volatile component of the dispersion is removed in such a way that shrinkage of the precursor takes place.

The precursor that forms in step d) should preferably be of sufficient mechanical stability to be further processible as bulk material in the subsequent steps. The optional calcining in step f) is advantageous or even required especially when the dispersion comprises a plurality of different raw materials and a phase transformation is required.

Another aspect of the invention relates to an abrasive article containing a collective of abrasive grains as described above. More particularly, it is thus possible for at least 20% by weight, preferably at least 50% by weight, more preferably at least 90% by weight, of all the abrasive grains of the abrasive article to take the form of inventive abrasive grains as described above. The other abrasive grains may likewise have a defined shape, but one which differs from the inventive shape, or they may not have a defined shape.

The abrasive article may, for example, be a coated abrasive article, an abrasive article web, a bonded abrasive article or an abrasive brush.

A coated abrasive article comprises an underlayer, especially a flexible underlayer, for example paper, vulcanized fiber, a film, a textile material, a foam or multilayer combinations thereof. The abrasive grains can be secured to the underlayer with the aid of a base binder ("make coat"). The make coat and the abrasive grains may be covered with a top binder ("size coat"). Optionally, above the size coat mentioned, it is also possible for a second top binder ("supersize coat") to be present.

The make coat, size coat and supersize coat used may be any binders known per se, for example composed of synthetic resin, for instance a phenolic resin, an epoxide, a urea resin, a melamine resin or an unsaturated polyester resin. The size coat and/or supersize coat may additionally comprise further customary active ingredients and/or fillers.

The abrasive article may be in different product forms, for example as an abrasive disk or as an abrasive belt.

The invention also encompasses a process for producing an inventive abrasive article as described above. The process comprises a step in which a collective of abrasive grains is fixed on and/or in a substrate, especially by means of a binder. The substrate may, for instance, be an underlayer, especially a flexible underlayer, of a coated abrasive article, a web material for an abrasive web, a matrix for a bonded abrasive or bristle for an abrasive brush. In the case of a coated abrasive article, the make coat and/or the abrasive grains and/or the size coat and/or supersize coat can be applied by a method known per se. For example, the abrasive grains can be applied by electrostatic or mechanical means (i.e. by gravimetric means). Because of the inventive shape of the abrasive grains, even in the case of mechanical scattering, a high proportion of the abrasive grains will be oriented such that the above-described advantage accrues. It is thus possible to dispense with more complex electrostatic scattering.

In addition, the invention is also directed to processes for grinding a surface with a grinding article as described above. The surface may especially be a painted surface. In the case of a painted surface, abrasive grains having sizes of 500 µm or less are particularly suitable.

The object is also achieved by an abrasive grain in the form of a cylinder having two opposite base faces, the base faces in accordance with the invention having an outline containing at least one concave section.

A cylinder is understood here and hereinafter to mean a solid which is bounded by two base faces and by a shell face. These base faces are preferably essentially flat and likewise preferably essentially parallel to one another. The shell face is formed by an array of essentially parallel segments which are referred to hereinafter by the term "shell segment". The outline of the base face may comprise at least one linear and/or at least one curved section; the shape of the base faces is thus, more particularly, not restricted to polygons or circles. Moreover, it is also conceivable and within the scope of the invention that the base face has at least one orifice. In this case, the base face also has an inner outline which may have one or more coherent sections. The corresponding shell segments then enclose one or more channels which fully penetrate the abrasive grain. If the base face is a polygon, the abrasive grain has the shape of a prism. In some variants, it is also conceivable that the abrasive grain contains at least one blind hole which will only partly penetrates the abrasive grain. Such a blind hole may open into one of the base faces or the shell face.

Preferably, the cylinder is a straight cylinder; this means that the shell segments run essentially at right angles to the base faces. However, the invention also equally covers skewed cylinders in which the shell segments do not run at right angles to the base faces.

A section of the outline is understood to be concave in the context of the present invention when the linear line connecting the end points of this section runs entirely outside the base face. A concave section is especially regarded as a section having strictly concave curvature. Moreover, a section that consists of two adjacent linear component sections which meet at a reflex corner is also regarded as concave in the context of the invention. By definition, a reflex angle is greater than 180°.

The effect of the presence of a concave section is that the angle of engagement is reduced compared to the angle of engagement of a conventional abrasive grain without concave section when the abrasive grain is used for processing of a surface. As a result, the cutting action of the abrasive grain can be increased. This is true particularly when the shell segments run parallel to the underlayer—thus, in the case of a straight cylinder, when the base faces are aligned essentially at right angles to the underlayer. Such an alignment can especially be effected with the aid of electrostatic scattering of the abrasive grains, which is known per se.

The outline may also have a plurality of concave sections, especially at least two or even at least three concave sections. These concave sections may be identical or else different. More particularly, they may have identical or different curvatures.

The outline of the base face may have at least one corner. A corner can be regarded as a point in the outline at which the directions of the tangents to the outline run discontinuously. The shell segment which ends at a corner forms an edge of the abrasive grain which leads to increased cutting action of the abrasive grain when it comes into contact with a surface being processed.

The outline defines an internal angle of the base face at a corner. This internal angle is preferably in the range from 65° to 120°, preferably from 65° to 115°, further preferably from 75° to 105°, more preferably from 85° to 95° and is most preferably 90°. Such internal angles lead to particularly high cutting action.

In many embodiments, the outline contains at least one linear section. The part of the array of shell segments that runs through this linear section of the outline forms a flat face. In some possible executions, an abrasive grain can be fixed stably on an underlayer when this flat face rests on the underlayer. In other working examples, the flat face may run essentially parallel to and be in contact with a surface being processed. Such a flat contact of the abrasive grain with the surface being processed can prevent the abrasive grain from tipping.

It is conceivable and within the scope of the invention that a concave section and a linear section have a common end point without the presence of a corner here; the directions of the tangents thus run continuously here. However, it is preferable in many working examples when at least one end point of a linear section forms a corner in the outline. If, for example, the linear section is aligned parallel to and is in contact with a surface being processed in the course of processing, the part of the array of shell segments that runs through the adjacent section forms a cutting face which runs at an angle to the underlayer. A cutting face in such an arrangement leads to increased cutting action, while the flat contact of the abrasive grain with the surface being processed already mentioned above prevents the abrasive grain from tipping.

The effect just described can be enhanced when the abrasive grain is formed such that it will be oriented on the underlayer with high probability in the course of scattering in such a way that at least one linear section of the outline runs parallel to the underlayer and hence also to the surface being processed. This can be achieved by virtue of at least one linear section running at an angle to a support plane of the abrasive grain of not more than 20°, preferably not more than 10°, more preferably not more than 5°. More preferably, this angle should be 0°, such that the linear section and the support plane run parallel to one another. This support plane is an imaginary plane of the abrasive grain having the following property: if the support grain is placed onto a horizontal contact plane in such a way that the support plane corresponds to the contact plane, the abrasive grain is stable against tipping over. This is the case when the perpendicular projection of the center of the abrasive grain onto the contact points lies within the convex shell of the points at which the abrasive grain rests on the contact plane. Thus, if the support plane of the abrasive grain lies on a flat abrasive underlayer, the abovementioned angle between the support plane and linear section is equal to the angle that the linear section forms with the underlayer. This is consequently also equal to the angle between the linear section and a surface being processed.

Particularly advantageously, a tangent to at least one point on the outline runs at an angle to a perpendicular that runs at right angles to the above-described support plane of the abrasive grain. This angle may be in the range from −30° to +30°, preferably from −25° to +25°, further preferably from −15° to +15°, more preferably from −5° to +5°, and most preferably 0°. As above, this angle is also regarded as positive when the perpendicular runs within the abrasive grain; it is regarded as negative where it runs outside the abrasive grain. If the support plane of the abrasive grain rests on an abrasive underlayer, the magnitude of this angle corresponds to the angle of engagement of a cutting face in the region of this point. The smaller the magnitude of the angle of engagement, the less change there is in the size of the surface of the abrasive grain that gets into contact with the surface being processed as the abrasive grain is worn away, and the more constant is the abrasive action during the wear.

At least one end point of the concave section may form a corner of the outline. More particularly, this corner may also simultaneously be an end point of a straight section of the outline.

In preferred working examples, the outline has at least three and more preferably exactly three concave sections whose respective ends are corners of the outline. In addition, the outline preferably has a linear section between any two concave sections. The concave sections may, for example, have concave curvature. The linear sections may have equal lengths. The three concave sections may also have the same lengths as one another. More particularly, the base face may thus have three-fold symmetry. Three-fold symmetry means that the shape and hence the action of the abrasive grain is independent of the orientation in which the abrasive grain lies on the underlayer. Four-fold, five-fold, six-fold symmetries etc. also lead to this independence.

The shape and size of the abrasive grain can be determined, for instance, with the aid of a microscope. The inventive abrasive grain may have a size over the entire size range which is also customary for conventional abrasive grains. Typically, abrasive grains with greater sizes lead to higher material removal from a surface being processed than smaller abrasive grains. For example, the abrasive grain may have a size in the range from 100 µm to 2000 µm. The diameter of the abrasive grain is understood here to mean the diameter of a circle enveloping the base face. This is the smallest diameter of a circle which surrounds the abrasive grain. To determine the diameter, with the aid of a microscope, an image of a base face of the abrasive grain can be produced. The diameter (i.e. the diameter of the enveloping circle) can then be determined from this image.

The ratio of the height of the abrasive grain and the diameter is preferably not more than 1, further preferably not more than 0.8 and more preferably not more than 0.6. The height of the abrasive grain is understood to mean the vertical distance between the two base faces. The smaller this ratio, the narrower the shell faces of the abrasive grain for a given diameter and the smaller the friction and the evolution of heat when the abrasive grain is disposed on an underlayer with an opposite shell face.

The above-described shape of the abrasive grain is an idealized shape. However, the invention also encompasses abrasive grains which differ from this idealized shape within the scope of manufacturing tolerances. Possible deviations from the idealized shape may have one or more of the following causes:

cavities or bubbles caused by enclosed air and/or other gases in a dispersion from which the abrasive grains are produced;

absent corners and/or edges which arise through incomplete filling of a die and/or during the removal of the precursor of the abrasive grain from the die;

collapsed side faces and/or edges which arise through shrinkage during the removal of a portion of the volatile components of the dispersion; especially collapsed faces which arise from the upper free surface of the dispersion which is not in contact with the die;

material that has flaked away, caused by a drying and/or sintering process;

broken corners and/or edges which arise through transport and/or during further processing of the abrasive grains as bulk material.

The deviations from the ideal case need not necessarily lead to disadvantageous properties of the abrasive grain. For example, broken corners and/or edges may also have the effect that further cutting edges arise compared to the ideal case, which can even have a positive effect on the abrasive action.

More particularly, the invention also encompasses abrasive grains whose shape corresponds only essentially to the idealized shape. For example, sections of the outline are regarded as essentially linear when they are at least partly or even entirely curved and have a radius of curvature of at least twice, preferably at least five times, more preferably at least ten times, the diameter of the abrasive grain. The same applies to shell segments, which may likewise have a slight curvature. A point on the outline is regarded essentially as a corner when the radius of curvature there is not more than 10%, preferably not more than 5%, more preferably not more than 2%, of the diameter of the abrasive grain. In addition, the two base faces are also understood to be essentially flat when they have concave or convex curvature and have radii of curvature which are at least twice, preferably at least five times, more preferably at least ten times, the diameter of the abrasive grain. The base faces may also each contain a plurality of essentially mutually parallel face sections which are in contact with one another at one or more edges and/or corners. "Essentially parallel" means that the angle between the face sections is less than 20°, preferably less than 10° and more preferably less than 5°. Curves, edges or corners in the base faces may, for example, as a result of production, arise from the upper free surface of the dispersion which is not in contact with a die. In addition, the base faces are also regarded as essentially parallel to one another when they are arranged at an angle to one another that is at most 10°, preferably at most 5°, more preferably at most 2°.

The abovementioned tolerances apply independently of one another. For example, it is conceivable that the base faces are flat and the shell segments have slight curvature. Conversely, it is also conceivable that the base faces have slight curvature, while the shell segments are straight. Preferably, however, the abrasive grain has an idealized shape as described above in relation to every inventive geometric property.

The abrasive grain may, for example, comprise or consist of a ceramic material, especially a polycrystalline ceramic material. Preferably, the abrasive grain comprises alumina, more preferably α-Al2O3.

Alternatively or additionally, the abrasive grain may also comprise at least one further metal oxide, for instance sodium oxide, magnesium oxide, iron oxide, silicon oxide, calcium oxide, zirconium oxide, yttrium oxide, zinc oxide, cobalt oxide, nickel oxide, hafnium oxide, chromium oxide, praseodymium oxide, samarium oxide, ytterbium oxide, neodymium oxide, lanthanum oxide, gadolinium oxide, cerium oxide, dysprosium oxide, erbium oxide, lutetium oxide, titanium oxide, manganese oxide or any desired combinations thereof.

Many of these metal oxides originate from impurities in the starting materials, for example in alumina. Given sufficiently low proportions in the abrasive grain, however, such impurities have no adverse effect on the production and use of the abrasive grain. Some of these impurities may even have a positive effect on the abrasive grain.

Fractions of zirconium oxide or yttrium oxide may originate, for example, from grinding balls which can be used in a grinding step in the production of the abrasive grains. Fractions of iron oxide may originate from a grinding vessel which is used in such a grinding step.

Likewise alternatively or additionally, the abrasive grain may comprise further hard substances, for example silicon carbide.

In addition, the abrasive grain may comprise at least one breakdown product of a dispersant described in detail hereinafter, which was used in the production of the abrasive grains. In addition, the abrasive grain may comprise at least one nucleating agent or breakdown product thereof which was used in the production of the abrasive grains. The nucleating agent may, for example, be magnesium oxide which has already been mentioned above.

Moreover, the abrasive grain may also comprise at least one of the further substances described in EP 615 816 A1.

The ingredients mentioned can be determined with the aid of chemical analysis methods known per se.

The abrasive grain may comprise or consist of a structure having one or more different phases. A first phase may consist of alumina, more preferably of $\alpha$-Al$_2$O$_3$. A second phase may consist of one or more of the abovementioned further metal oxides and/or further hard substances.

The proportion of alumina, especially of α-Al2O3, in the abrasive grain may, for example, be at least 25% by weight, preferably at least 50% by weight, further preferably at least 70% by weight, more preferably at least 95% by weight.

The abrasive grain may have a coating which covers only part of the surface, especially only one or more edges and/or only one of several flat areas of the surface. The coating may, for instance, be a ferromagnetic or paramagnetic coating. Such a partial coating of the surface with a ferromagnetic or paramagnetic material enables alignment of the abrasive grain in a given direction in a magnetic field applied during the scattering operation. Alternatively, it may also be a coating of a material having elevated thermal conductivity or a coating which enables increased adhesion of the abrasive grain on the abrasive underlayer.

A further aspect of the invention relates to a collective of abrasive grains. A collective of abrasive grains is understood here and hereinafter to mean a coherent collection of abrasive grains. For example, this may be a collection of abrasive grains which are present in a container and are stored and transported as such, for example in a sack.

Such a collection of abrasive grains can also be used to produce an abrasive article. A collective of abrasive grains is also regarded as the entirety of all the abrasive grains present in an abrasive article.

Preferably, the collective of abrasive grains contains at least 20% by weight, preferably at least 50% by weight and more preferably at least 90% by weight of inventive abrasive grains as described above. The other abrasive grains present in the collective may likewise have a defined shape, but one which differs from the inventive shape, or they may not have a defined shape since they are, for example, broken abrasive grains. These other abrasive grains present in the collective are also referred to as "support grains".

It is conceivable and likewise within the scope of the invention that the inventive abrasive grains present in the collective are different from one another. For example, the collective of abrasive grains may contain a first fraction of abrasive grains of a first embodiment of the invention, and a second fraction of abrasive grains of a second embodiment of the invention that are different from the first embodiment of the invention. More particularly, the abrasive grains of the first embodiment of the invention may differ in terms of size and shape from the abrasive grains of the second embodiment of the invention.

The collective of abrasive grains may consist exclusively of identical inventive abrasive grains; more particularly, the collective in that case has a size distribution in the form of points.

The collective of abrasive grains may essentially have a size distribution which corresponds to a size standard customary in the abrasives industry, for example the American National Standards Institute (ANSI), the Standards of the Federation of European Producers of Abrasives (FEPA) or the Japanese Industrial Standard (JIS). For example, the collective of the abrasive grains may essentially have a grain size of P12, P16, P20, P24, P30, P36, P40, P50, P60, P80, P100, P120, P150, P180, P220, P240, P280, P320, P360, P400, P500, P600, P800, P1000, P1200, P1500, P2000, P2500, P3000 or P5000 according to the FEPA standard. In this context, a size distribution "essentially" means that at least 90% by weight, preferably at least 95% by weight, further preferably at least 99% by weight and more preferably all of the abrasive grains in the collective of abrasive grains meet this standard.

As already described above, it is also conceivable that the collective contains at least two different fractions of inventive abrasive grains and/or at least one fraction of noninventive abrasive grains. Each of these fractions may itself have a size distribution corresponding in each case to one of the abovementioned size standards customary in the abrasives industry.

An inventive abrasive grain or an inventive collective of abrasive grains can be produced, for example, by the following process known from U.S. Pat. No. 5,201,916:

a. producing or providing a dispersion comprising α-alumina particles and/or particles that can be converted to α-alumina, and at least one volatile dispersion medium, preferably water;
b. introducing the dispersion into at least one depression of a die;
c. optionally squeegeeing an upper face of the die in order to remove at least a portion of the dispersion which stands above the upper face of the die;
d. removing a portion of the volatile components of the dispersion, so as to form at least one abrasive grain precursor;
e. removing the abrasive grain precursor from the die;
f. optionally calcining the abrasive grain precursor;
g. sintering the abrasive grain precursor in order to obtain at least one abrasive grain.

Before and/or during the production of the dispersion in step a), the raw materials, especially α-alumina particles and/or particles that can be converted to α-alumina, are ground. This can be effected, for example, with the aid of a ball mill, especially with the aid of a planetary ball mill.

The dispersion may comprise at least one dispersant. Such a dispersant facilitates the formation of the dispersion and increases the stability thereof by, for example, forming layers around the individual grains which prevent lump formation. The dispersant may, for example, be a polymer. In general, the dispersant breaks down during the sintering in step g) if not earlier.

The die may comprise or consist of silicone, for example. The depressions may have an open top face through which the dispersion can be introduced. The depressions in the die each have a surface whose shape is complementary to the shape of at least one portion of the surface of the desired abrasive grain. For this purpose, the surface of the depression may have a base face which is of the same shape as the base face of the abrasive grains to be produced and runs parallel to the top side of the die. A lateral wall extends from the base face, being formed by an array of parallel segments and being complementary to the shell face of the abrasive grains to be produced. More particularly, the lateral wall thus has at least one convex section.

The precursor that forms in step d) should preferably be of sufficient mechanical stability to be further processible as bulk material in the subsequent steps. The optional calcining in step f) is advantageous or even required especially when the dispersion comprises a plurality of different raw materials and a phase transformation is required.

Another aspect of the invention relates to an abrasive article containing a collective of abrasive grains as described above. More particularly, it is thus possible for at least 20% by weight, preferably at least 50% by weight, more preferably at least 90% by weight, of all the abrasive grains of the abrasive article to take the form of inventive abrasive grains as described above. The other abrasive grains may likewise have a defined shape, but one which differs from the inventive shape, or they may not have a defined shape.

The abrasive article may, for example, be a coated abrasive article, an abrasive article web, a bonded abrasive article or an abrasive brush.

A coated abrasive article comprises an underlayer, especially a flexible underlayer, for example paper, vulcanized fiber, a film, a textile material, a foam or multilayer combinations thereof. The abrasive grains can be secured with the underlayer with the aid of a base binder ("make coat"). The make coat and the abrasive grains may be covered with a top binder ("size coat"). Optionally, above the size coat mentioned, it is also possible for a second top binder ("supersize coat") to be present.

The make coat, size coat and supersize coat used may be any binders known per se, for example composed of synthetic resin, for instance a phenolic resin, an epoxide, a urea resin, a melamine resin or an unsaturated polyester resin. The size coat and/or supersize coat may additionally comprise further customary active ingredients and/or fillers.

The abrasive article may be in different product forms, for example as an abrasive disk or as an abrasive belt.

The invention also encompasses a process for producing an inventive abrasive article as described above. The process comprises a step in which a collective of abrasive grains is fixed on and/or in a substrate, especially by means of a binder. The substrate may, for instance, be an underlayer, especially a flexible underlayer, of a coated abrasive article, a web material for an abrasive web, a matrix for a bonded abrasive or bristle for an abrasive brush. In the case of a coated abrasive article, the make coat and/or the abrasive grains and/or the size coat and/or supersize coat can be applied by a method known per se. For example, the abrasive grains can be applied by electrostatic or mechanical means (i.e. by gravimetric means). Electrostatic scattering is preferred especially when the ratio of height and diameter of the abrasive grain is comparatively small.

This is because, in the case of mechanical scattering, such abrasive grains would be more likely to be aligned in such a way that their base faces lie parallel on the surface. The above-described advantages of the inventive shape of the abrasive grains would thus be reduced at least in part. In contrast, the greater said ratio is, the fewer abrasive grains are aligned such that their base faces lie parallel on the surface, and the more reliable mechanical scattering is.

In addition, the invention is also directed to a process for grinding a surface with an abrasive article as described above. The surface may especially be a painted surface. In the case of a painted surface, abrasive grains having sizes of 500 μm or less are particularly suitable.

BRIEF DESCRIPTION OF THE DRAWINGS

The invention is illustrated hereinafter with reference to several working examples and drawings. These show.

DETAILED DESCRIPTION

Figure 1A:
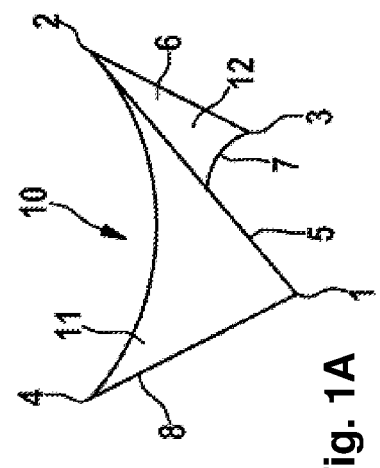
FIG. 1A: a perspective view of a first embodiment of an inventive abrasive grain.
Figure 1B:
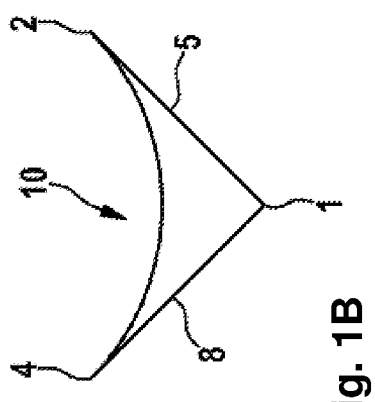
FIG. 1B: a front view of the abrasive grain from FIG. 1A.
Figure 1C:
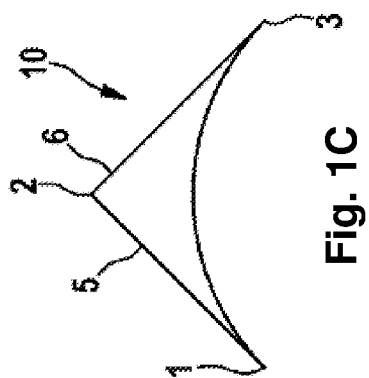
FIG. 1C: a side view of the abrasive grain from FIG. 1A.
Figure 1D:
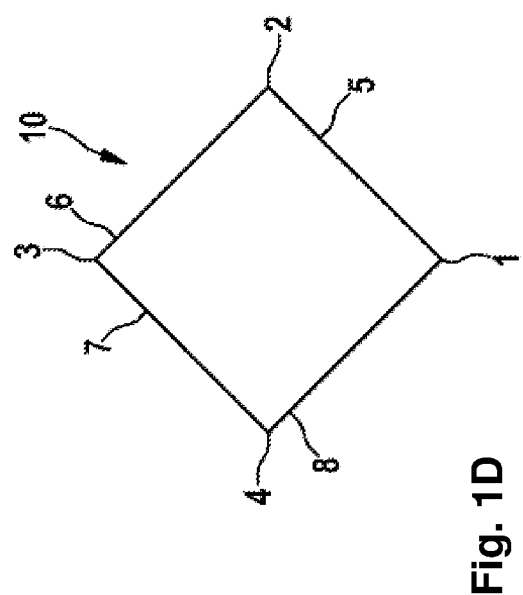
FIG. 1D: a top view of the abrasive grain from FIG. 1A.
Figure 1E:
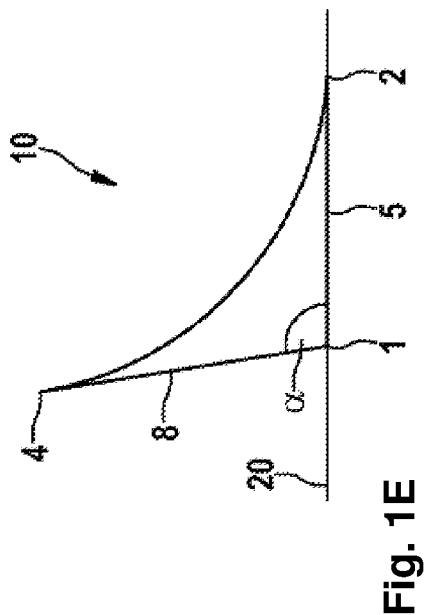
FIG. 1E: a side view of the abrasive grain from FIG. 1A aligned on an underlayer.

FIGS. 1A to 1E show an inventive abrasive grain 10 in a first embodiment. FIG. 1A shows a perspective view, FIG. 1B shows a front view, FIG. 1C shows a side view, and FIG. 1D shows a top view. FIG. 1E shows the abrasive grain 10 in a side view, the abrasive grain 10 being disposed on an underlayer 20. The abrasive grain 10 has a virtually square outline with four corners 1 to 4 and four edges 4 to 8 that join the corners 1 to 4. The edges 5 to 8 are straight, although curved edges are also conceivable. Proceeding from a flat square, however, two mutually opposite corners 2, 4 are shifted upward out of the plane, and the two other mutually opposite corners 1, 3 are shifted downward out of the plane. The abrasive grain 10 therefore has only two faces 11, 12. These two faces 11, 12 in the working example shown are identical, i.e. form merely the top side and bottom side of a single face. Alternatively, it is also conceivable that both faces have a different curvature profile and therefore enclose a volume between the two faces 11, 12.

As is apparent in FIG. 1E, the abrasive grain 10 lines up on an underlayer 20 such that three corners 1 to 3 lie on the underlayer 20, while the remaining corner 4 protrudes from the underlayer 20. The plane formed from the three corners 1, 3 and 4 is at an angle α from the underlayer 20. This angle α is simultaneously the angle between the two planes formed by the corners 1, 3 and 4 or 1, 2 and 3. In the embodiment shown, the angle α is obtuse.

Figure 2B:
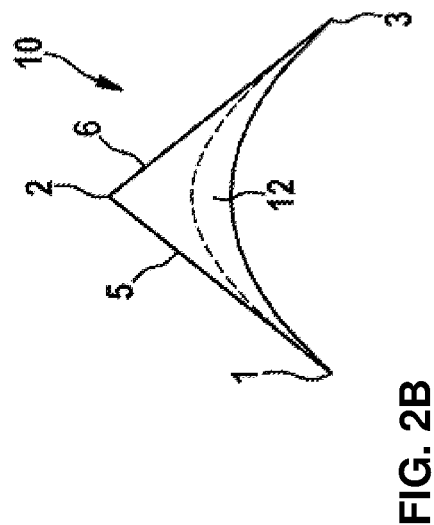
FIG. 2B: a side view of the abrasive grain from FIG. 2A.
Figure 2D:
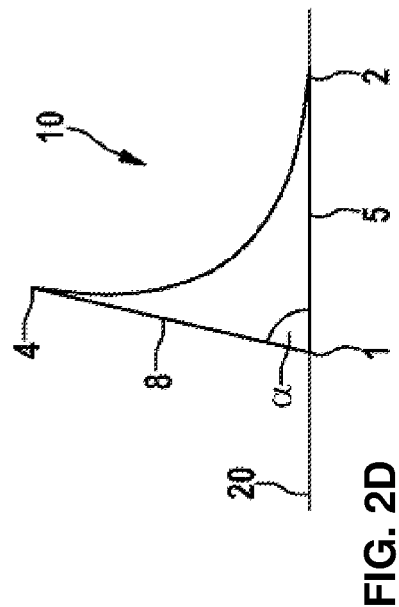
FIG. 2D: a side view of the abrasive grain from FIG. 2A aligned on an underlayer.
Figure 2A:
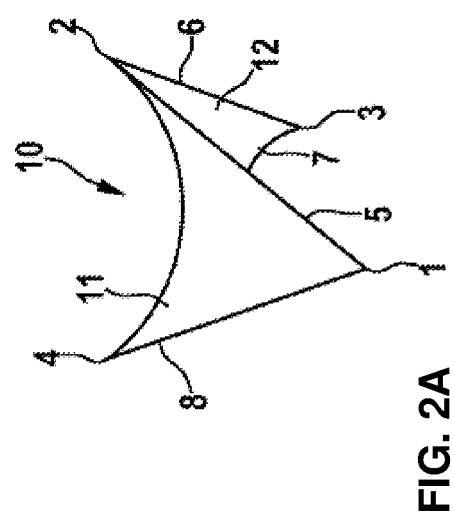
FIG. 2A: a perspective view of a modified abrasive grain from FIG. 1A.
Figure 2C:
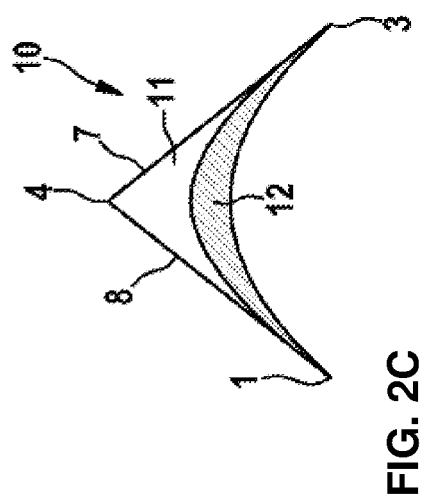
FIG. 2C: a section through the abrasive grain from FIG. 2A along a plane through two opposite corners.

FIGS. 2A to 2D show the abrasive grain 10 from FIG. 1A in slightly modified form. FIG. 2A shows a perspective view, FIG. 2B a side view, FIG. 2C a section through the abrasive grain 10 from FIG. 2A along a plane through two opposite corners 1, 3, and FIG. 2D another side view, with the abrasive grain 10 aligned on an underlayer 20. The respectively opposite corners 1, 3 and 2, 4 are respectively shifted further upward and downward out of the plane with respect to FIG. 1A. As shown in FIG. 2D, a smaller angle α is correspondingly formed between the underlayer 20 and the plane formed from the corners 1, and 3. The angle α is acute. According to the configuration of the angle α, the abrasion characteristics of the abrasive grain 10 can be significantly influenced. In the section in FIG. 2C, it is clearly apparent that the two faces 11, 12 of the abrasive grain 10 enclose a volume.

Figure 3C:
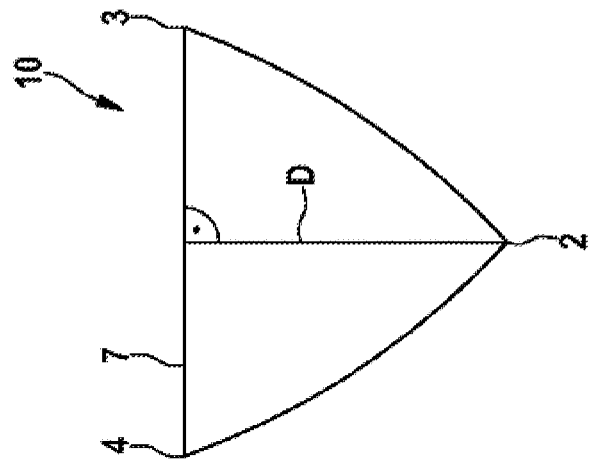
FIG. 3C: a front view of the abrasive grain from FIG. 3A.
Figure 3B:
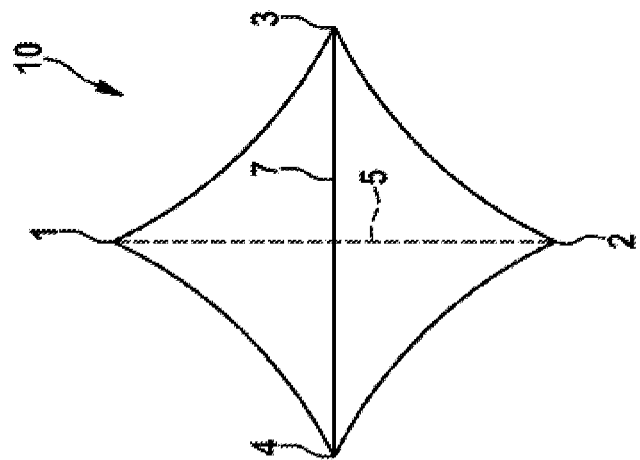
FIG. 3B: a top view of the abrasive grain from FIG. 3A.
Figure 3A:
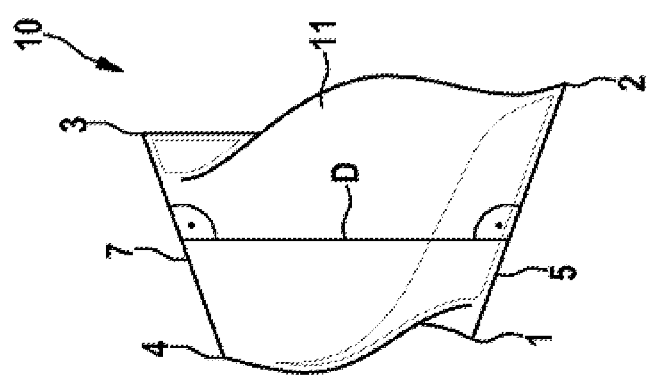
FIG. 3A: a perspective view of a further embodiment of an inventive abrasive grain.

FIGS. 3A to 3C show a further embodiment of an inventive abrasive grain 10. FIG. 3A shows a perspective view, FIG. 3B a top view and FIG. 3C a front view of the abrasive grain 10. This abrasive grain 10 has two mutually skewed edges 5, 7, the respective ends of which are bounded by a corner 1, 2 and 3, 4 respectively. The abrasive grain 10 has four corners 1 to 4. The two edges 5, 7 are arranged at an angle of 90° relative to one another. The abrasive grain 10 has a single face 11 which takes the form of a continuous curved face. For easier understanding of the shape, it is possible to imagine a cylindrical piece of tube which is closed off and flattened at either end, the two closures being arranged at right angles to one another and the abrasive grain 10 being formed by the cavity surrounded by the closed-off piece of tube. In FIGS. 3A and 3C, the common perpendicular is drawn in for schematic purposes, which simultaneously defines the distance D between the skewed edges 5, 7. The length of the edges 5, 7 is the same as the distance D. Typically, the ratio of the edge length to the distance D is between 0.5 and 2.0, preferably between 0.7 and 1.4, more preferably between 0.9 and 1.1. In the embodiment shown, the edges 5, 7 are arranged such that the common perpendicular in each case is in the middle of the edges 5, 7. Also conceivable, of course, are abrasive grains in which the common perpendicular has been shifted from the middle. There is also no need for the edges 5, 7, as shown in the working example, to run straight; curved edges are also entirely conceivable.

Figure 4:
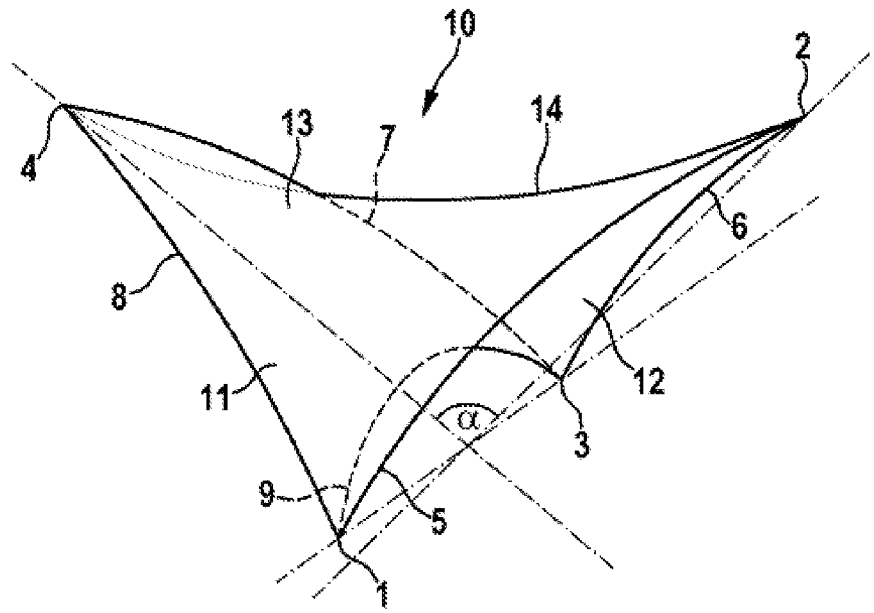
FIG. 4: a perspective view of a further embodiment of an inventive abrasive grain.
Figure 5:
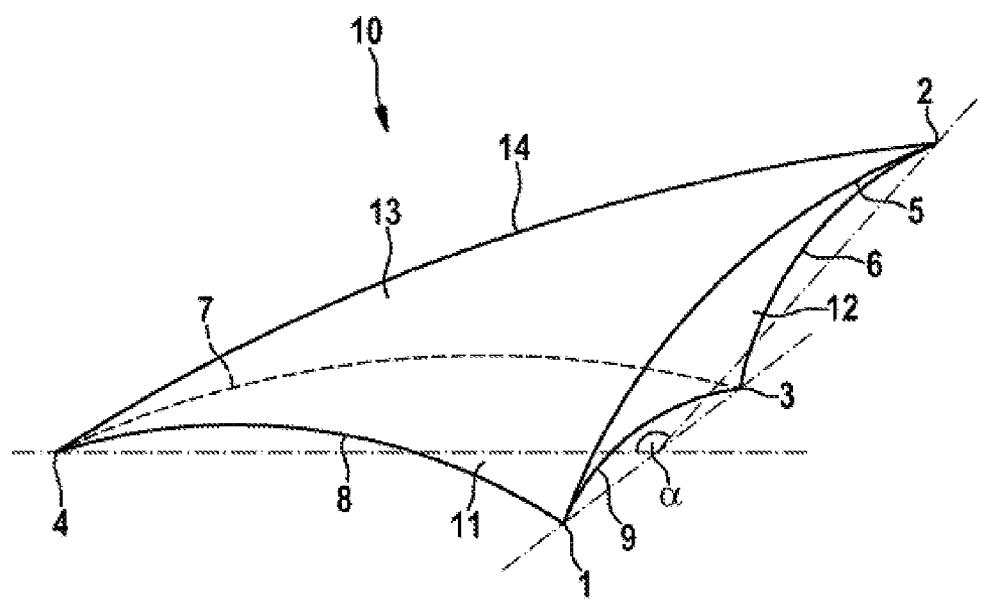
FIG. 5: a perspective view of a further embodiment of an inventive abrasive grain.

FIGS. 4 and 5 show, in perspective view, two further embodiments of an inventive abrasive grain 10. These abrasive grains 10 again have four corners 1 to 4. The corners 1 to 4 are each joined to one another via the edges 5 to 6, similarly to FIG. 1A. In addition, however, two mutually opposite corners 1, 3 are joined by a further edge 9. The edges 5 to 9 are all curved lines, but it is also conceivable that the edges are straight. Curved faces 11, 12 are formed between the corners 1, 2 and 3 or 1, 3 and 4, these being concave. Flat faces are also conceivable. A primary face 13 is formed between all four corners 1 to 4, this again being curved. A vertex line 14 of the primary face 13 is concave in the embodiment according to FIG. 4, whereas the vertex line 14 is convex in FIG. 5. However, the vertex line 14 does not itself form an edge of the abrasive grain. The two embodiments according to FIGS. 4 and 5 also differ by an angle α which is formed between the planes formed from the corners 1, 2 and 3 or 1, 3 and 4. In FIG. 4 this angle α is 90°; in FIG. 5 the angle α is 135°. It will be apparent that these angles α may each also have other values. The two abrasive grains 10 according to FIGS. 4 and 5 are also symmetric with respect to a plane at right angles to a straight line connecting the corners 1 and 3 or 2 and 4. Such a symmetry facilitates the production of corresponding dies. In addition, the abrasive grains 10 according to FIGS. 4 and 5 may lie in a first orientation on corners 1, 3 and 4 or on an abrasive underlayer, or in a second orientation on corners 1, 2 and 3. In both orientations, the corners 2 or 4 pointing away from the underlayer in each case are similar to one another because of the symmetry; the abrasive action is thus independent of which of the two orientations is present. Moreover, the abrasive grains 10 in FIGS. 4 and 5 are symmetric about an axis of symmetry which runs at the midpoint between the two corners 1 and 3 and intersects the edge 9.

The inventive abrasive grains can be produced, for example, by a process described hereinafter: first of all, a dispersion of 200 g of α-$Al_2O_3$, 0.4 g of MgO, 90 g of water as dispersion medium and 0.5 g of dispersant is produced. The MgO functions here as a nucleating agent. The dispersant used may, for example, be the Dolapix CE64 product obtainable from Zschimmer & Schwarz, 56108 Lahnstein, Germany. The dispersion thus obtained is ground in a planetary ball mill at 200 revolutions per minute for 30 minutes, for example a PM400 planetary ball mill obtainable from Retsch GmbH, 42781 Haan, Germany. Subsequently, the ground dispersion is introduced into a silicone die containing depressions in the shape of the desired abrasive grains. For some embodiments of the abrasive grain, it is possible to use an additional shaping element as described above, for example a further die, with which, in addition to the surface shaped in the die, it is possible to shape at least a portion of the rest of the surface of the abrasive grain. Thereafter, the volatile component, i.e. the water, is removed from the dispersion. This gives rise to an abrasive grain precursor which is removed from the die. In a final step, the precursor is sintered as bulk material at 1550° C. for 5 minutes. The dispersant is burnt out in the course of sintering.

An inventive abrasive article can be produced, for example, as follows: on an underlayer made from vulcanized fiber having a thickness of 0.8 mm, a phenol resin dispersion as make coat precursor is applied in an amount of 120 g/m². Subsequently, 600 g/m² of the inventive abrasive grains are applied by means of electrostatic scattering. Thereafter, the make coat precursor is cured to give a make coat. On top of the make coat and the abrasive grains, a phenol resin dispersion is applied in an amount of 800 g/m² as size coat precursor, which is likewise cured.

Figure 6:
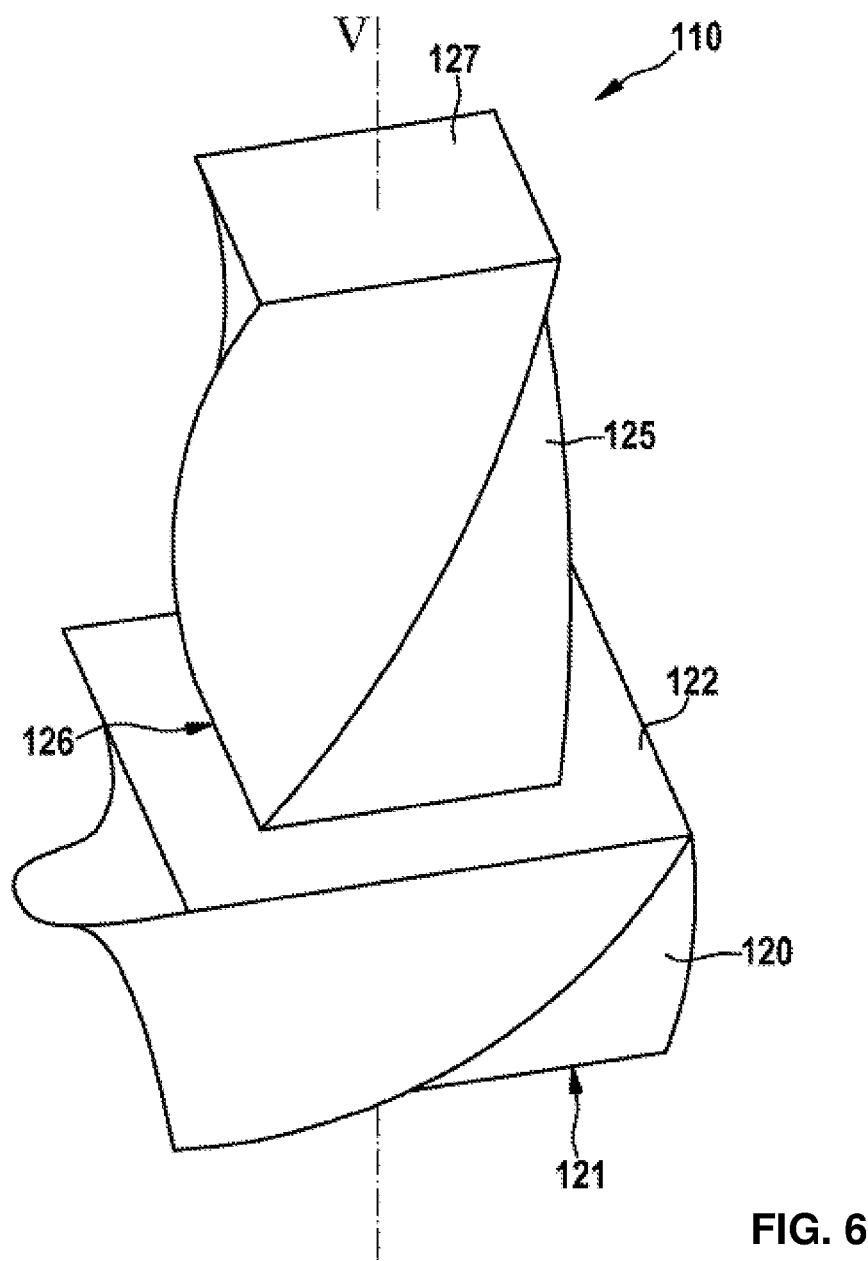
FIG. 6: a further embodiment of an inventive abrasive grain in a perspective view.

FIG. 6 shows, in perspective view, a first embodiment of an inventive abrasive grain 110. The abrasive grain 110 contains a base element 120 and a top element 125. The base element 120 contains a bottom side 121 and a parallel opposite top side 122, on which is disposed a bottom side 126 of the top element 125. Both the base element 120 and the top element 125 have the shape of a twisted cuboid, i.e. of a specific twisted straight prism. The base element 120 and the top element 125 are twisted with respect to the theoretical cuboids about a common twist axis V which runs at right angles to the bottom side 121 and to the top side 122 of the base element 120 and at right angles to the bottom side 126 and to a top side 127 of the top element 125.

The angle by which the cross sections of the base element 120 which run at right angles to the twist axis V have been rotated compared to the theoretical cuboid has a linear dependence on the distance of the sectional plane from the bottom side 121 of the base element 120. Likewise, the angle by which the cross sections of the top element 125 which run at right angles to the twist axis V have been rotated compared to the theoretical cuboid has a linear dependence on the distance of the sectional plane from the bottom side 126 of the top element 125. Both for the base element 120 and for the top element 125, the angle differential between the respective bottom side 121 or 126 and the respective top side 122 or 127 here is 90°. In a departure from the working example shown here, this angle for the base element 120 may also be about 45°, because corners of the underside 121 of the base element 120 then project beneath the top side 122 of the base element 120 as a result, which can assure particularly good anchoring in a make coat.

The effect of the twisting of the base element 120 is that the base element 120 can be anchored better in a make coat of an abrasive article not shown here. The result of the twisting of the top element 125 is that swarf formed in the course of grinding can be transported away from a surface being processed.

Figure 7:
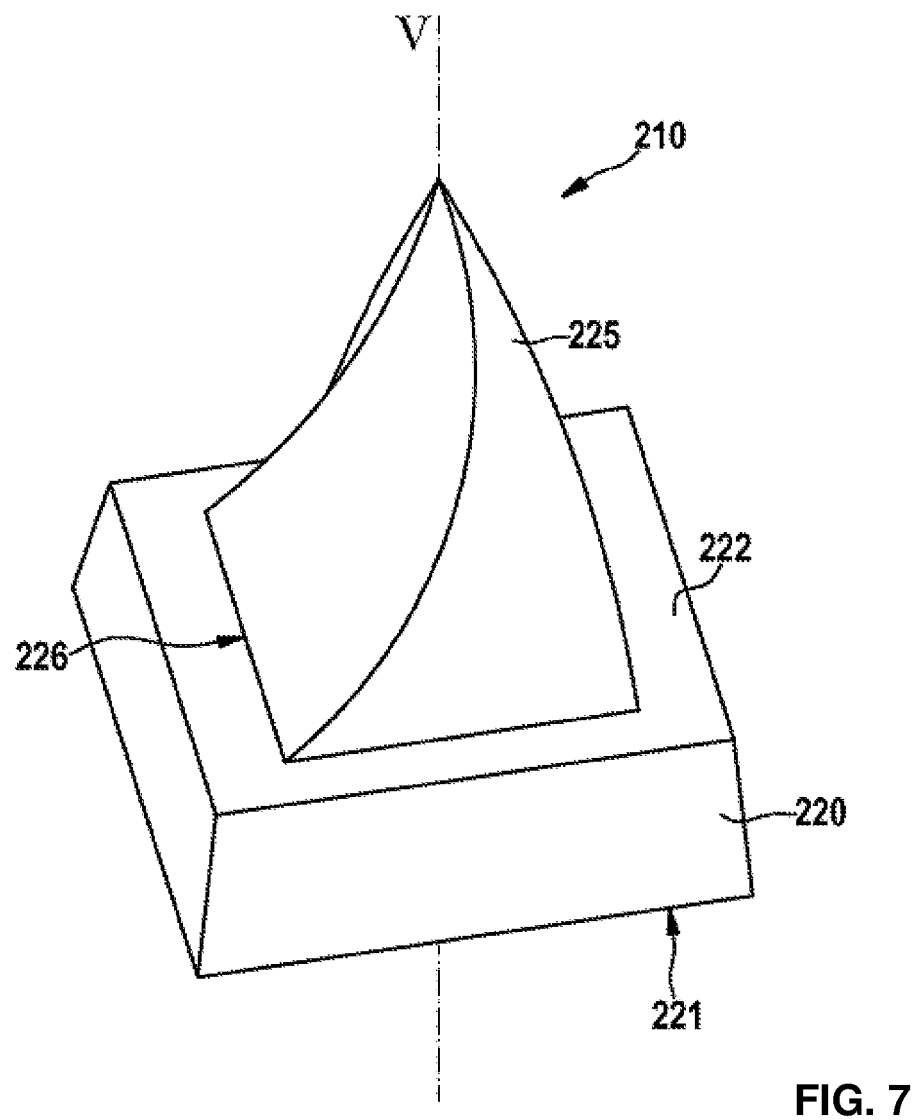
FIG. 7: a further embodiment of an inventive abrasive grain in a perspective view.

In the second embodiment shown in FIG. 7, the abrasive grain 210 contains an untwisted base element 220 in the form of an untwisted frustopyramid and a top element 225 in the form of a twisted pyramid.

Figure 8:
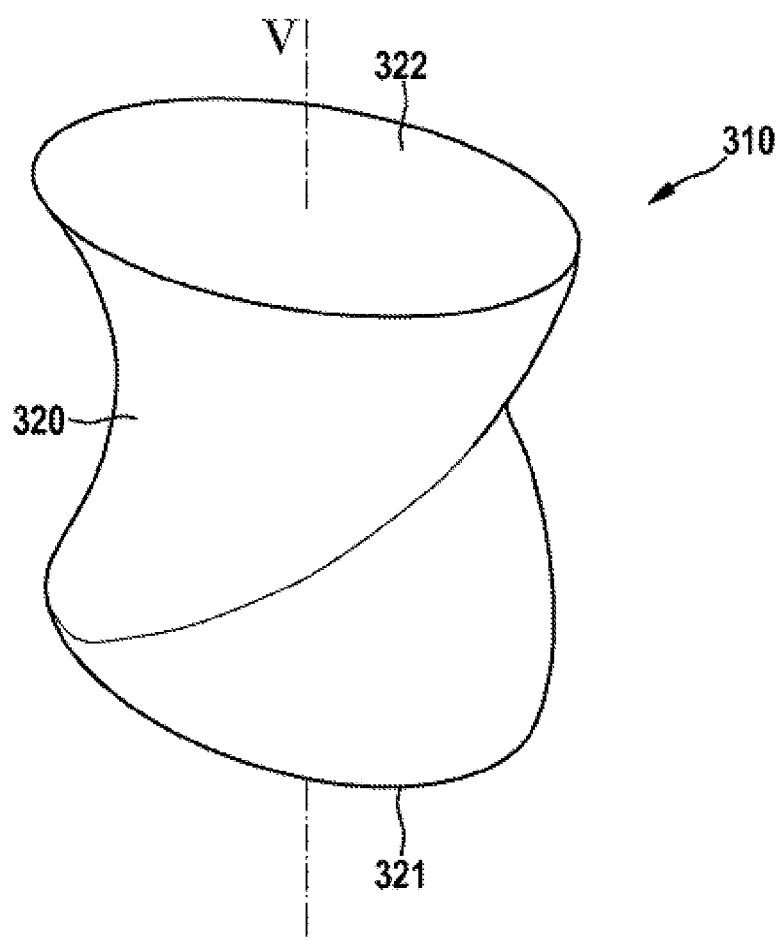
FIG. 8: a further embodiment of an inventive abrasive grain in a perspective view.

The abrasive grain 310 according to FIG. 8 consists of only a single twisted component 320; it is thus not composed of a base element and a top element like the abrasive grains 110 and 210. The component 320 has the shape of a twisted cylinder with an elliptical base face 321 and an elliptical top face 322.

Figure 9:
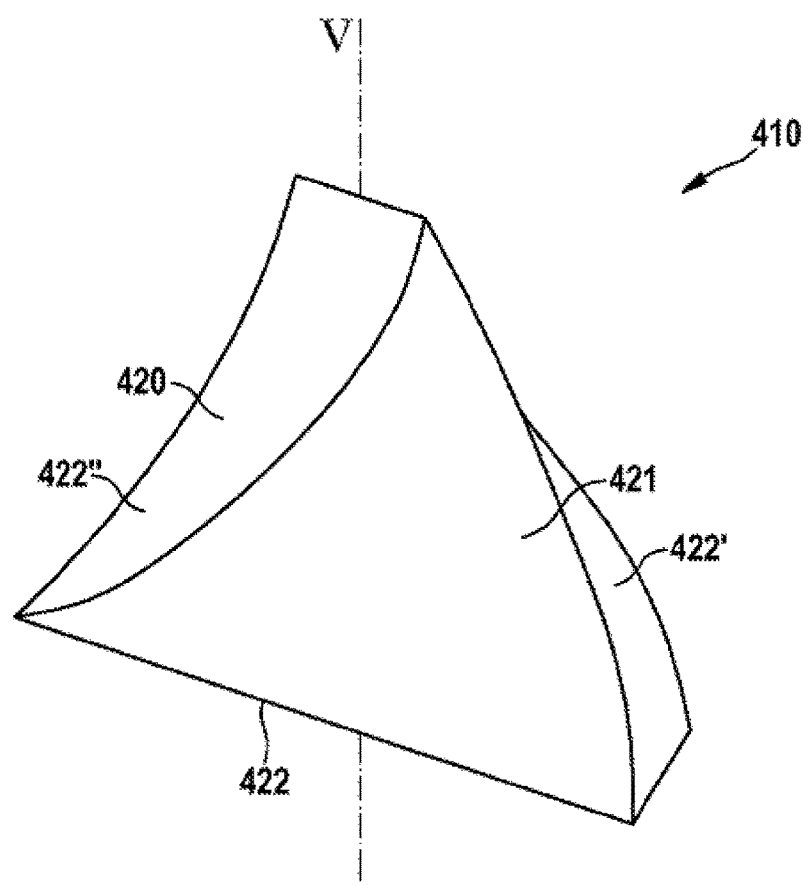
FIG. 9: a further embodiment of an inventive abrasive grain in a perspective view.

The abrasive grain 410 shown in FIG. 9 likewise consists only of a single twisted component 420 which has the shape of a twisted polyhedron. The theoretical polyhedron has the shape of a prism with two triangular end faces 421, only one of which can be seen here, and three rectangular lateral faces 422, 422' and 422". The component 420 is twisted with respect to the theoretical polyhedron about a twist axis V which runs at right angles to the center of the lateral face 422.

The inventive abrasive grains can be produced, for example, by a process described hereinafter: first of all, a dispersion of 200 g of α-Al$_2$O$_3$, 0.4 g of MgO, 90 g of water as dispersion medium and 0.5 g of dispersant is produced. The MgO functions here as a sintering aid, in order to suppress grain growth. The dispersant used may, for example, be the Dolapix CE64 product obtainable from Zschimmer & Schwarz, 56108 Lahnstein, Germany. The dispersion thus obtained is ground in a planetary ball mill at 200 revolutions per minute for 30 minutes, for example a PM400 planetary ball mill obtainable from Retsch GmbH, 42781 Haan, Germany. Subsequently, the ground dispersion is introduced into a silicone die containing depressions in the shape of the desired abrasive grains. Thereafter, the volatile component, i.e. the water, is removed from the dispersion. This gives rise to an abrasive grain precursor which is removed from the die. If the abrasive grain contains a base element as described above with a bottom side, this bottom side can form from the upper free surface of the dispersion which is not in contact with the die. In a final step, the precursor is sintered as bulk material at 1550° C. for 5 minutes. The dispersant is burnt out in the course of sintering.

Figure 10:
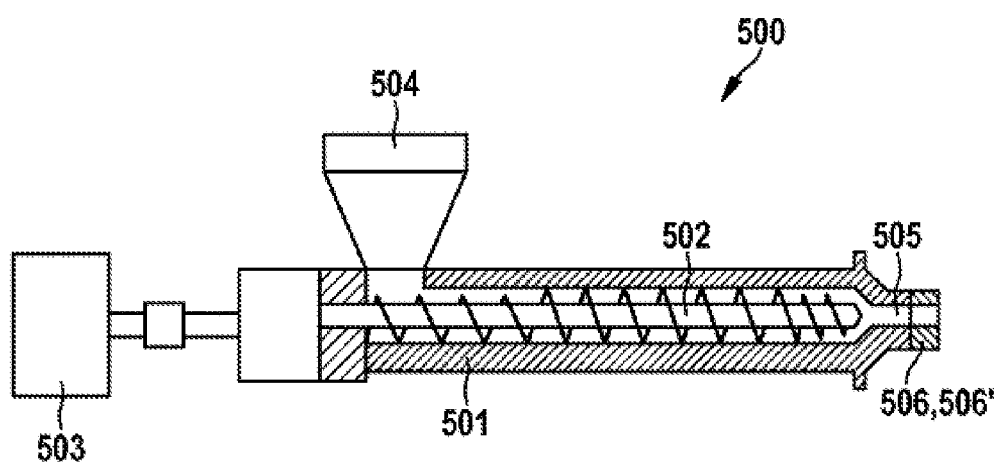
FIG. 10: a schematic lateral section view of an extruder for production of abrasive grains.

FIG. 10 shows, in a schematic lateral section view, an extruder 500 for production of inventive abrasive grains. The extruder 500 contains a hollow cylinder 501 with a screw 502 arranged therein. The screw 502 can be driven in a rotating manner with the aid of a motor 503. By means of an introduction funnel 504, a dispersion is introduced into the interior of the hollow cylinder 501. This dispersion contains α-alumina particles and/or particles that can be converted to α-alumina, and at least one volatile dispersion medium, preferably water, and preferably at least one organic additive, for example the plasticizer Zusoplast C21, available from Zschimmer & Schwarz, 56108 Lahnstein, Germany. With the aid of the screw 502, the dispersion is conveyed to a constricted exit end 505 and forced through an exit orifice of a nozzle 506, 506', so as to form an extrudate which is not shown here. The exit orifice has the shape of a twisted cylinder. With the aid of rotating blades which are likewise not shown here, the extrudate is severed to form individual abrasive grain precursors which can subsequently be calcined and then sintered.

Figure 11A:
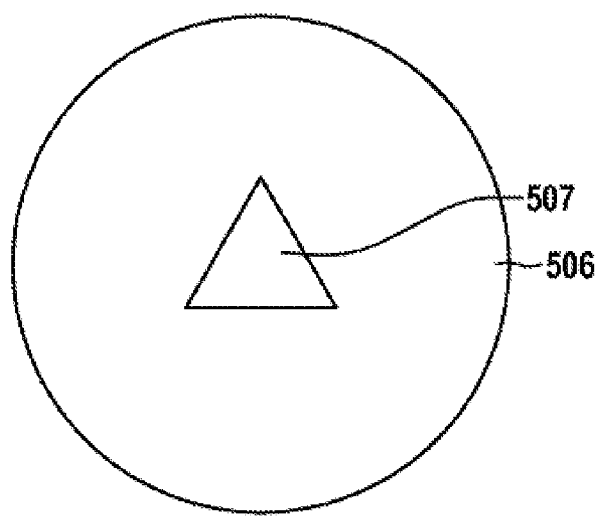
FIG. 11A: a top view of the extruder according to FIG. 10 having a first nozzle.
Figure 11B:
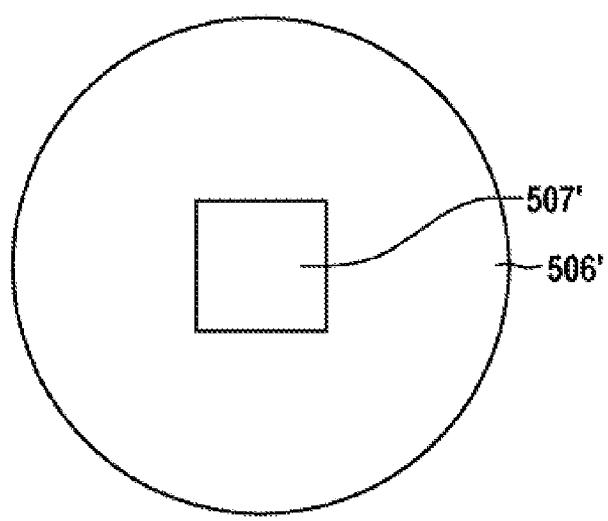
FIG. 11B: a top view of an extruder according to FIG. 10 having a second nozzle.
Figure 11C:
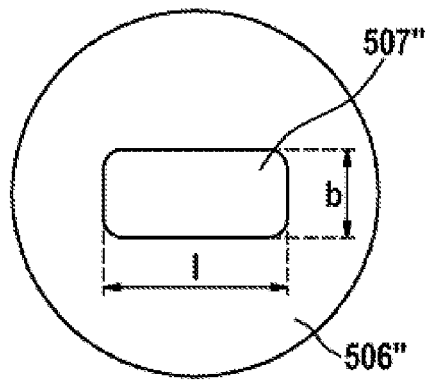
FIG. 11C: a top view of an extruder according to FIG. 10 having a third nozzle.
Figure 11D:
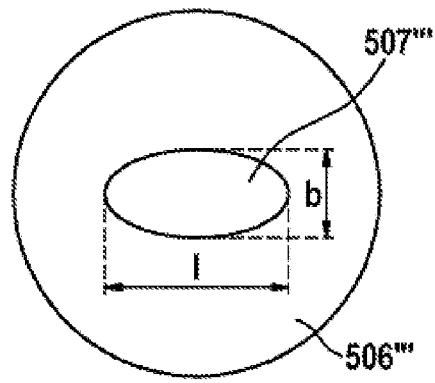
FIG. 11D: a top view of an extruder according to FIG. 10 having a fourth nozzle.
Figure 11E:
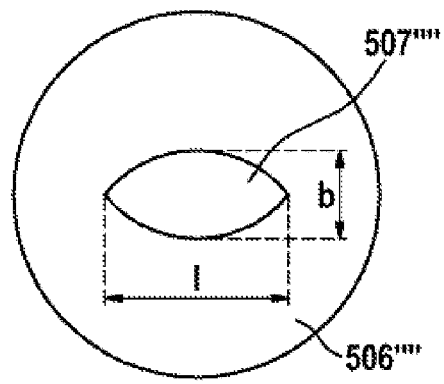
FIG. 11E: a top view of an extruder according to FIG. 10 having a fifth nozzle.

FIGS. 11A to 11E show top views of five nozzles 506, 506', 506", 506''', 506''''. These nozzles 506, 506', 506", 506''', 506'''' each have exit orifices 507, 507', 507", 507''' and 507'''' respectively. The exit orifice 507 has the shape of an equilateral triangle, the exit orifice 507' the shape of a square, the exit orifice 507" the shape of a rectangle with rounded corners, the exit orifice 507''' the shape of an ellipse, and the exit orifice 507'''' the shape of a lens. FIGS. 11C to 11E show the length l and the width b of the exit orifice.

Figure 12A:
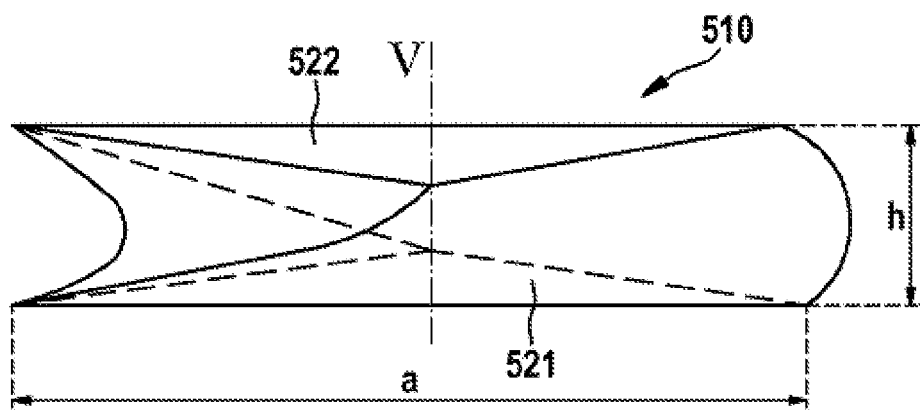
FIG. 12A: an abrasive grain produced with the first nozzle according to FIG. 11A.

The extrudate obtained with the nozzle 506 according to FIG. 11A has the shape of a twisted prism having a base face of an equilateral triangle with side length a. With the aid of the rotating blades, individual abrasive grain precursors are obtained, which, after calcining and sintering, give rise to abrasive grains 510, one of which is reproduced in FIG. 12A. This abrasive grain 510 has a base face 521 and a top face 522 and has a height h measured along the twist axis V, where the ratio of side length a to height h may be in the range from 1:3 to 8:1, preferably from 1:1 to 7:1 and more preferably from 4:1 to 6:1. In the abrasive grain 510 shown in FIG. 12A, the overall twist angle (i.e. the angle differential between the base face 521 and the top face 522) is 60°. Even more preferred than the abrasive grain 510 shown in FIG. 12A are abrasive grains in the shape of a twisted prism having base face and top face in the shape of equilateral triangles when the overall twist angle is in the range from 5° to 30° and is most preferably about 10°.

Figure 12B:
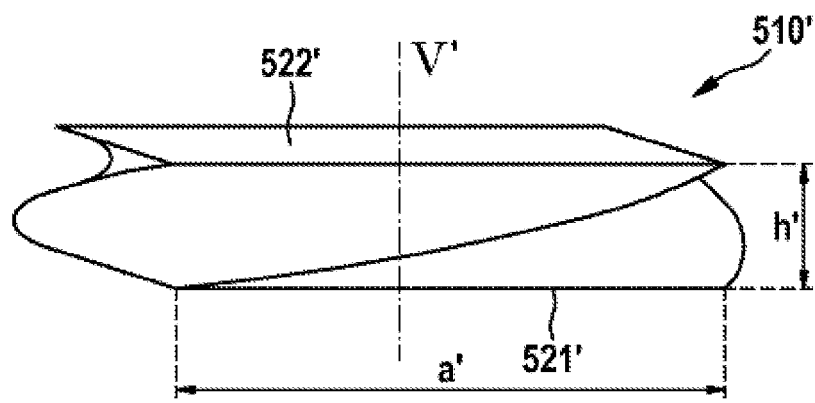
FIG. 12B: an abrasive grain produced with the second nozzle according to FIG. 12B.

An abrasive grain 510' which has been obtained with the nozzle 506' according to FIG. 11B and which has the shape of a twisted cuboid with side length a' is shown in FIG. 12B. This abrasive grain 510' has a height h' measured along a twist axis V', where the ratio of side length a' to height h' may be in the range from 1:3 to 8:1, preferably from 1:1 to 7:1 and more preferably from 4:1 to 6:1. In this abrasive grain 510', the overall twist angle between base face 521' and top face 522' is 90°, which is particularly preferred for abrasive grains in the shape of twisted cuboids having rectangular, especially square, base and top faces.

An inventive abrasive article can be produced, for example, as follows: on an underlayer made from vulcanized fiber having a thickness of 0.8 mm, a phenol resin dispersion as make coat precursor is applied in an amount of 120 g/m². Subsequently, 600 g/m² of the inventive abrasive grains are applied by means of electrostatic scattering. Thereafter, the make coat precursor is cured to give a make coat. On top of the make coat and the abrasive grains, a phenol resin dispersion is applied in an amount of 800 g/m² as size coat precursor, which is likewise cured.

Figure 13:
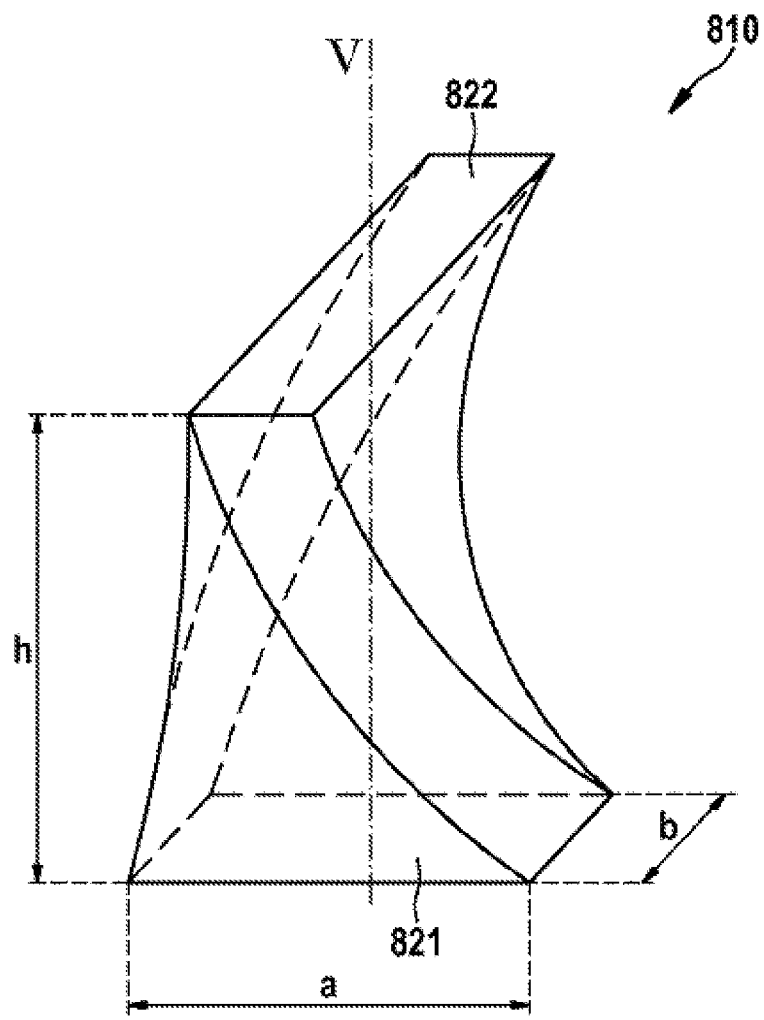
FIG. 13: an abrasive grain with the shape of a twisted cuboid.

The abrasive grain 810 shown in FIG. 13 has the shape of a twisted cuboid. The base face 821 and the top face 822 each have a length a and a width b, the ratio of which is preferably in the range from 10:2 to 10:3. In addition, the abrasive grain 810 has a height h measured along the twist axis V, which is preferably in a ratio to the length a of 4:1 to 6:1. The overall twist angle of this abrasive grain 810 is 90°.

Figure 14A:
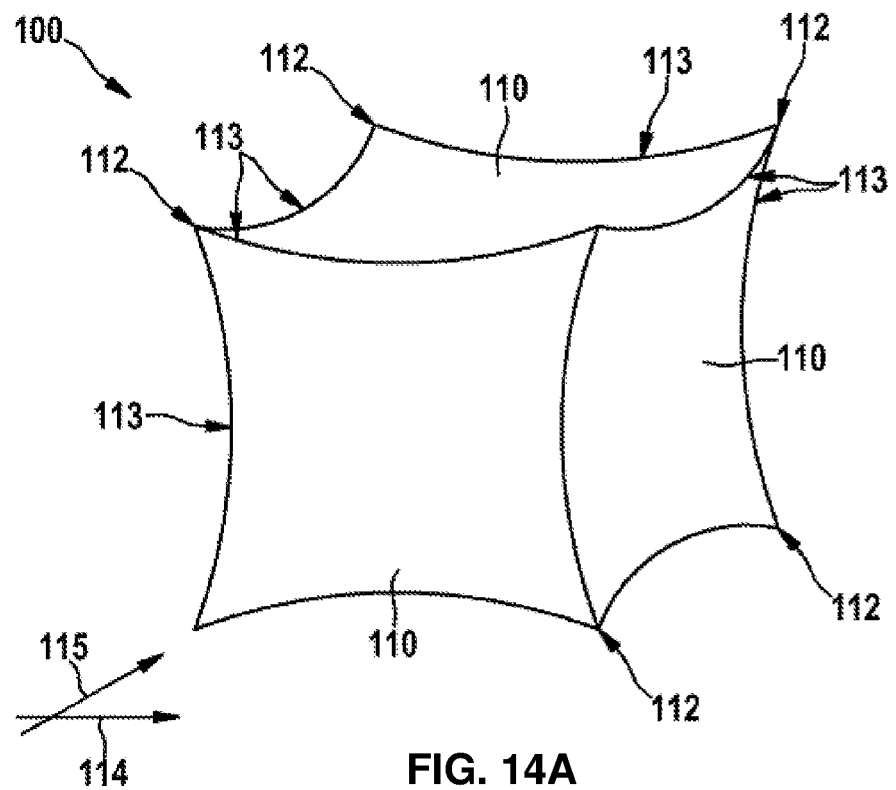
FIG. 14A: a further embodiment of an inventive abrasive grain in perspective view.

FIG. 14A shows a first embodiment of an inventive abrasive grain 100 in perspective view. The abrasive grain has a structure having six faces 110 having concave curvature 111.

Figure 14B:
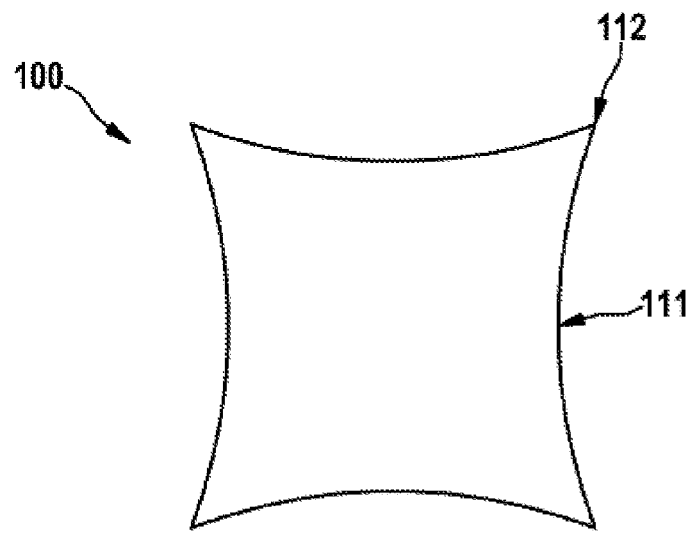
FIG. 14B: a schematic section diagram of the embodiment according to FIG. 14A of the inventive abrasive grain.

The concave curvature 111 becomes clear in FIG. 14B, which shows a schematic section diagram of the first embodiment of the inventive abrasive grain 100. The convex corners 112 of the structure correspond to the corners of an imaginary cube.

The faces 110 are curved in two spatial directions 114, 115.

The edges 113 likewise have concave curvature.

The edges 113 which run toward the corners 112 form, by virtue of the face 110 pulled inward, more acute angles at the corners 112 than the edges of a cube.

The base face of the cube has high symmetry, and so the face on which the abrasive grain 100 comes to rest when scattered is immaterial. This is particularly advantageous in the case of mechanical scattering, with which the abrasive grains, in contrast to electrostatic scattering, cannot be aligned with the aid of an electrical field.

Figure 15A:
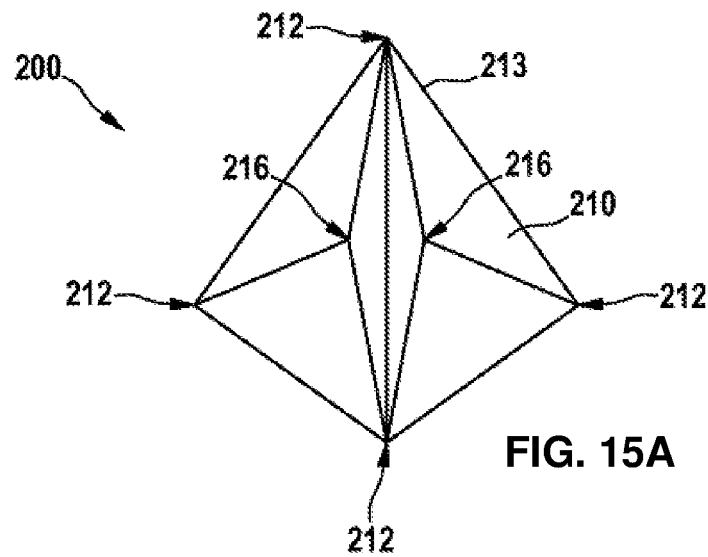
FIG. 15A: a further embodiment of an inventive abrasive grain in perspective view.

FIG. 15A shows a second embodiment of an inventive abrasive grain 200 in perspective view. The abrasive grain 200 has a structure with three reentrant corners 216, which becomes particularly clear in FIG. 15D, which shows a schematic top view of the second embodiment of the inventive abrasive grain 200.

The convex corners 212 of the structure correspond to the corners of an imaginary tetrahedron, i.e. of a Platonic solid.

The reentrant corner 216 is shifted inward compared to the tetrahedral face. There is therefore a tangential plane, i.e. a plane which includes the reentrant corner 216, on which a circle with the corner 216 as the center can be defined, the circumference of which is entirely within the solid.

The effect of the corners 216 pulled inward is that the faces 210 meet at the edges 213 at a more acute angle than in a tetrahedron. The abrasive grain 200 therefore has sharp edges and good cutting power.

Figure 15B:
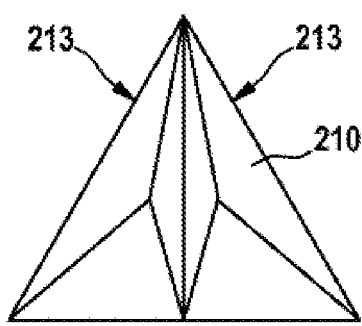
FIG. 15B: a schematic side view of the embodiment according to FIG. 15A of the inventive abrasive grain.
Figure 15C:
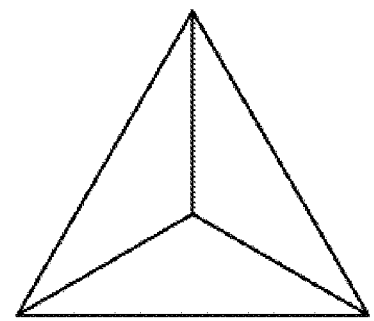
FIG. 15C: a further schematic side view of the embodiment according to FIG. 15A of the inventive abrasive grain.
Figure 15D:
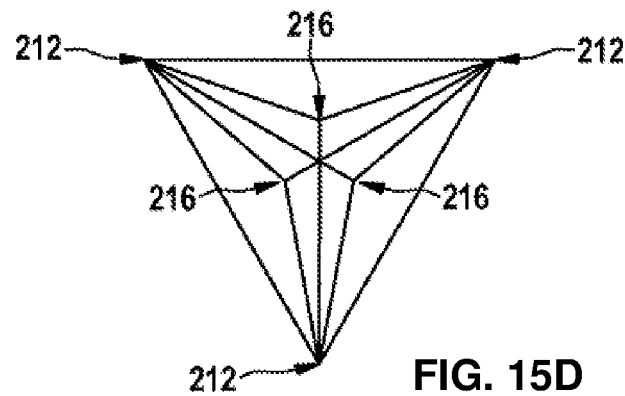
FIG. 15D: a schematic top view of the embodiment according to FIG. 15A of the inventive abrasive grain.

FIGS. 15B and 15C show schematic side views of the second embodiment of the inventive abrasive grain 200.

There is no reentrant corner on the base face of the abrasive grain, which is not shown explicitly. The base face therefore contains more material. When scattered, the abrasive grain 200 will come to rest preferentially on the heavier side, i.e. the base face. Ideally, the base face is flat. However, it is possible and covered by the invention that the base face, as a result of production, has slight concave curvature which can arise because of the above-described shrinkage during the removal of the volatile components.

Figure 16A:
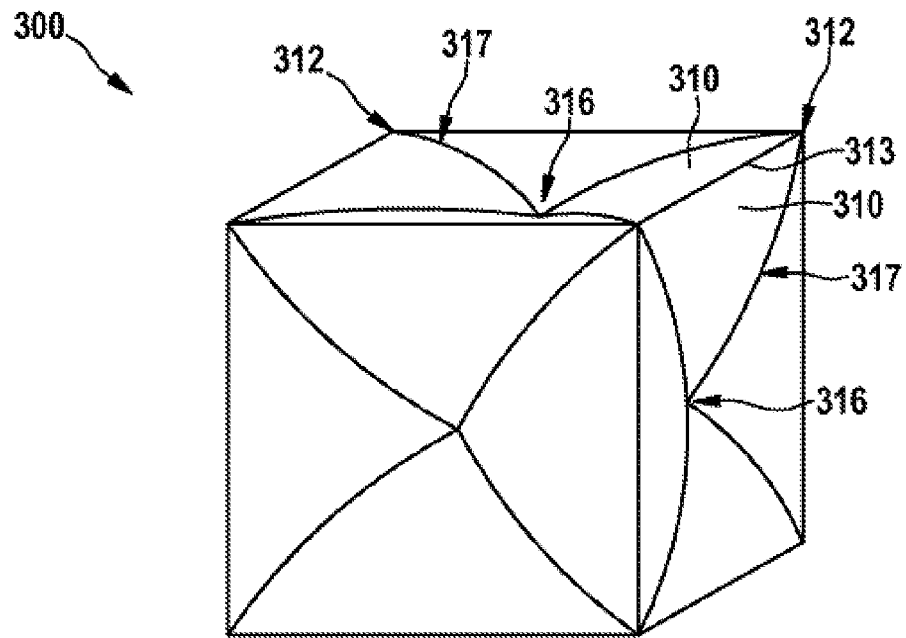
FIG. 16A: a further embodiment of an inventive abrasive grain.
Figure 16B:
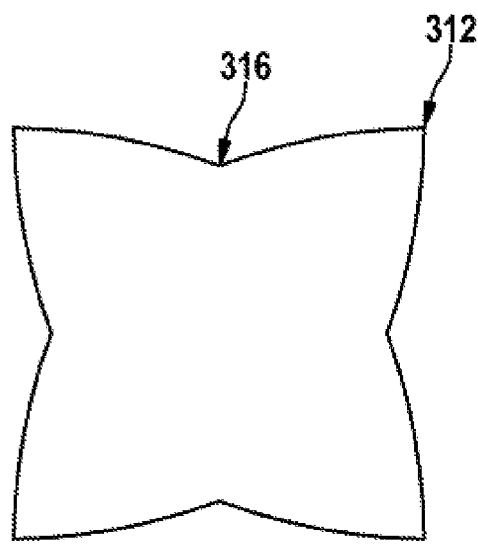
FIG. 16B: a schematic section diagram of the embodiment according to FIG. 16A.

FIG. 16A shows a third embodiment of an inventive abrasive grain 300 in perspective view. The abrasive grain 300 has a structure with reentrant corners 316, which becomes particularly clear in FIG. 16B, which shows a schematic section view of the third embodiment of the inventive abrasive grain 300.

The convex corners 312 of the structure correspond to the corners of an imaginary cube, i.e. of a Platonic solid.

The edges 317 that run toward the convex corners 312 are curved.

The faces 310 of the abrasive grain 300 that meet at the edges 317 form a more acute angle than in the case of a cube.

Figure 17:
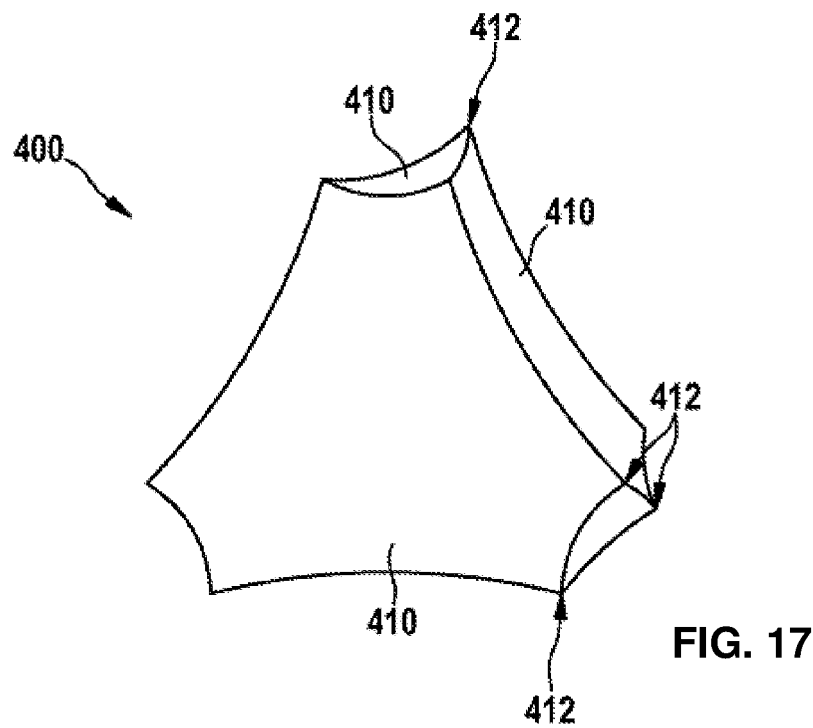
FIG. 17: a further embodiment of an inventive abrasive grain.

FIG. 17 shows a fourth embodiment of an inventive abrasive grain 400 in perspective view. The convex corners 412 correspond to the corners of an imaginary frustotetrahedron, i.e. of an Archimedean solid. The faces 410 have concave curvature.

Figure 18:
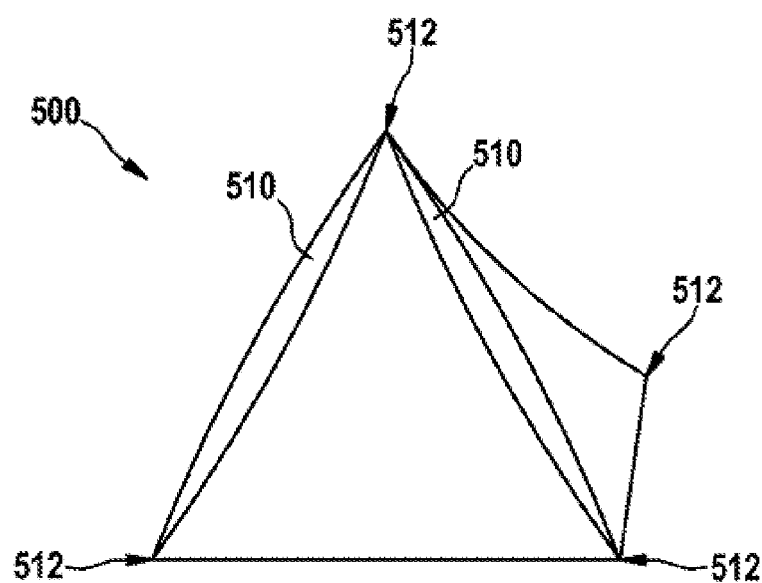
FIG. 18: a further embodiment of an inventive abrasive grain.

FIG. 18 shows a fifth embodiment of an inventive abrasive grain 500 in perspective view. The convex corners 512 correspond to the corners of an imaginary tetrahedron. Three tetrahedral edges are capped in such a way as to give rise to faces 510 with concave curvature.

Figure 19:
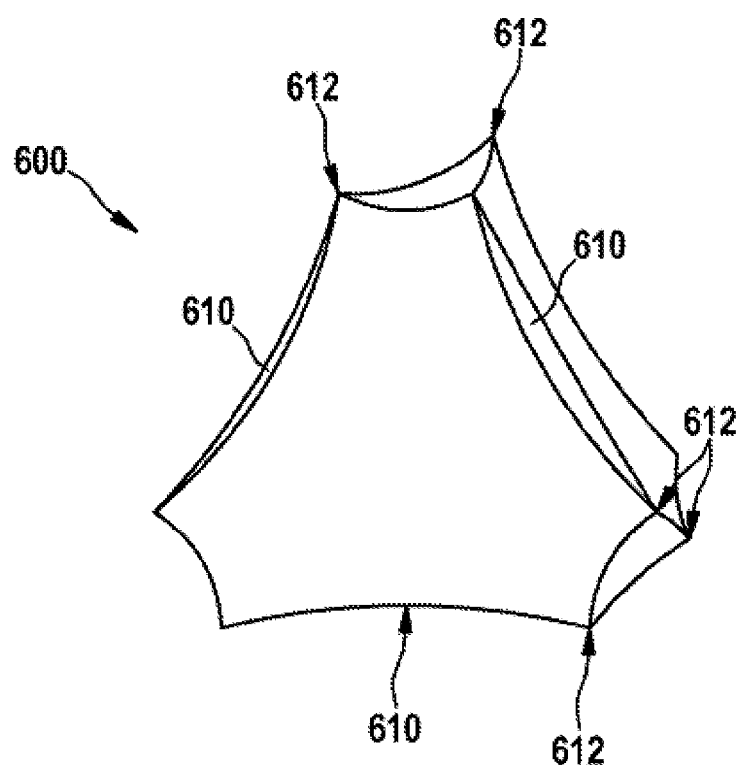
FIG. 19 a further embodiment of an inventive abrasive grain.

FIG. 19 shows a sixth embodiment of an inventive abrasive grain 600 in perspective view. The convex corners 612 correspond to the corners of an imaginary frustotetrahedron, i.e. of an Archimedean solid. The edges are capped in such a way that I give rise to faces 610 with concave curvature.

Figure 20A:
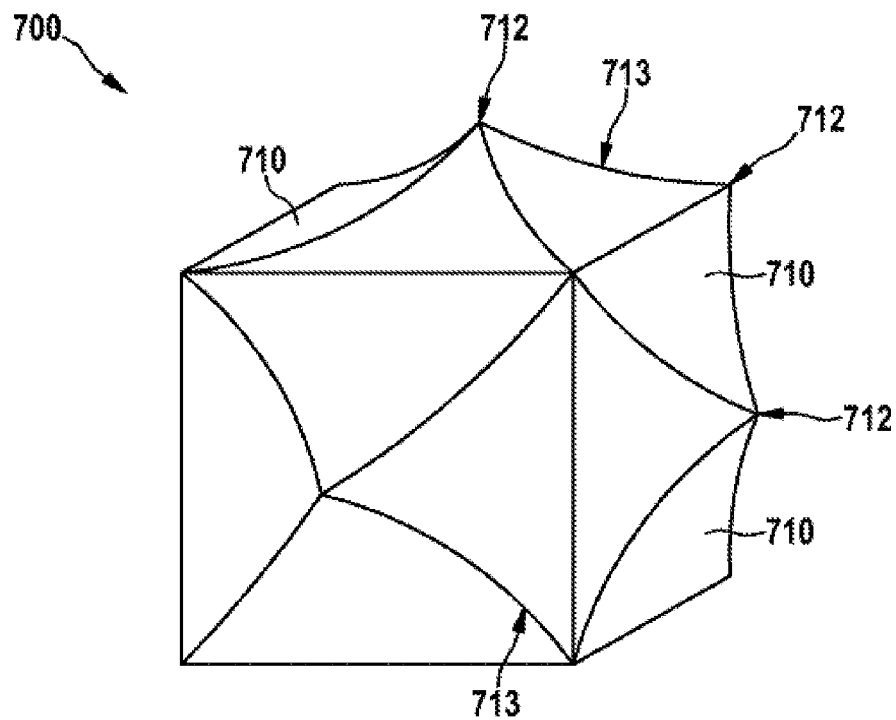
FIG. 20A: a further embodiment of an inventive abrasive grain in perspective view.

FIG. 20A shows a seventh embodiment of an inventive abrasive grain 700 in perspective view. The convex corners of the solid correspond to the corners of an imaginary tetrakis hexahedron, i.e. of a Catalan solid.

Figure 20B:
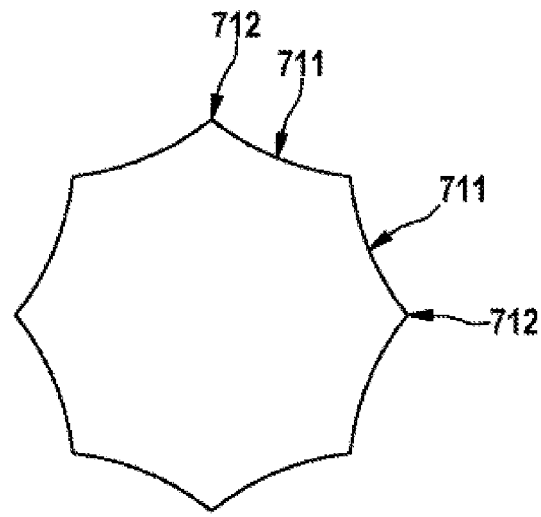
FIG. 20B: a schematic section diagram of the embodiment according to FIG. 20A of the inventive abrasive grain.

The concave curvature 711 of the faces 710 becomes clear in FIG. 20B, which shows a schematic section view of the seventh embodiment of the inventive abrasive grain 700.

The edges 713 likewise have concave curvature.

The edges 713 that run toward the corners 712, by virtue of the face 710 pulled inward, form more acute angles at the corners 712 than the edges of a tetrakis hexahedron.

Figure 21:
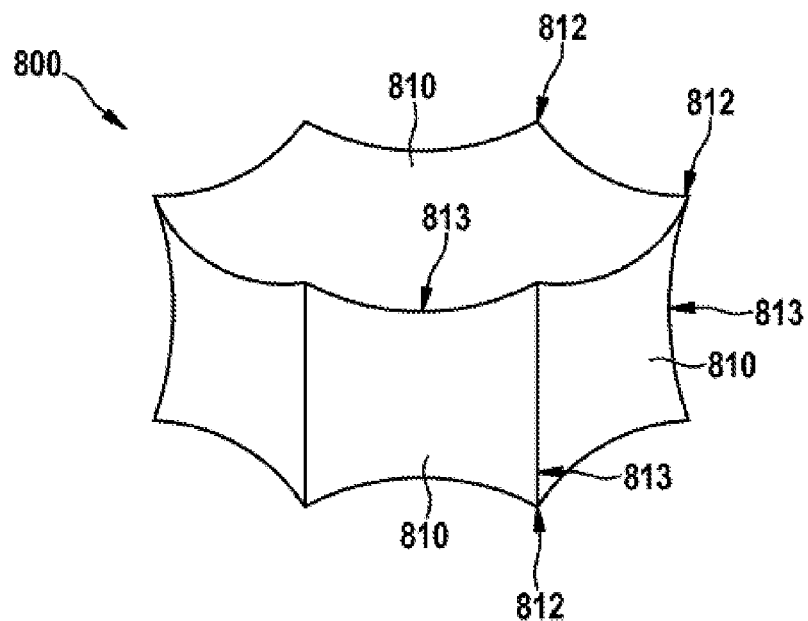
FIG. 21: a further embodiment of an inventive abrasive grain.

FIG. 21 shows an eighth embodiment of an inventive abrasive grain 800 in perspective view. The convex corners 812 correspond to the corners of an imaginary prism. The faces 810 have concave curvature, and so the faces 810 at the edges 813 form more acute angles than in a prism.

Figure 22:
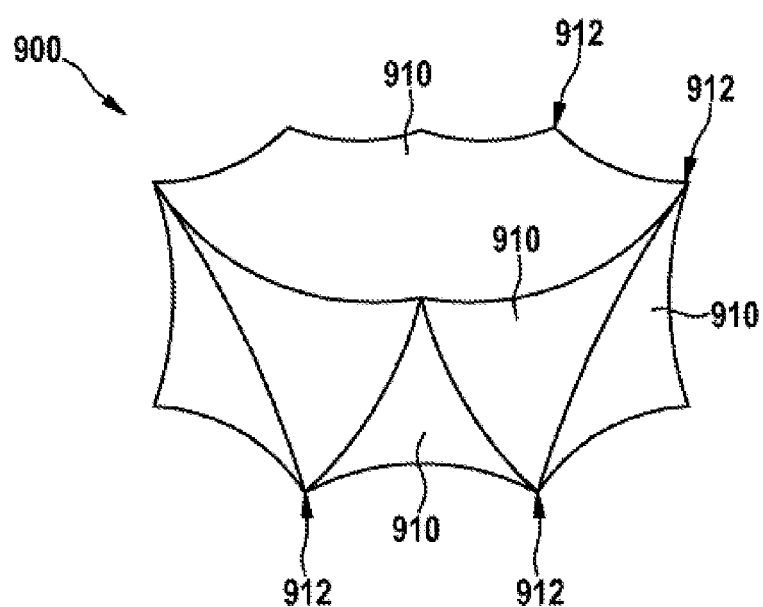
FIG. 22: a further embodiment of an inventive abrasive grain.

FIG. 22 shows a ninth embodiment of an inventive abrasive grain 900 in perspective view. The convex corners 912 correspond to the corners of an imaginary prism. The faces 910 have concave curvature, and so the faces 910 at the edges 913 form more acute angles than in an antiprism.

Figure 23:
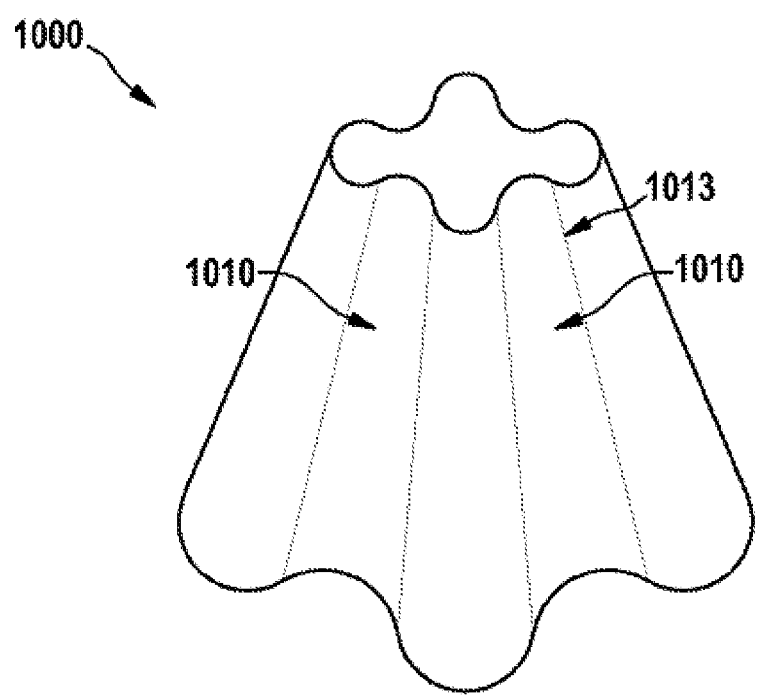
FIG. 23: a further embodiment of an inventive abrasive grain.

FIG. 23 shows a tenth embodiment of an inventive abrasive grain 1000 in perspective view. The abrasive grain 1000 has a structure with faces 1010 having concave curvature. At the edge of the curved faces, sharp edges 1013 are formed.

The inventive abrasive grains can be produced, for example, by a process described hereinafter: first of all, a dispersion of 200 g of α-$Al_2O_3$, 0.4 g of MgO, 90 g of water as dispersion medium and 0.5 g of dispersant is produced. The MgO functions here as a nucleating agent. The dispersant used may, for example, be the Dolapix CE64 product obtainable from Zschimmer & Schwarz, 56108 Lahnstein, Germany. The dispersion thus obtained is ground in a planetary ball mill at 200 revolutions per minute for 30 minutes, for example a PM400 planetary ball mill obtainable from Retsch GmbH, 42781 Haan, Germany. Subsequently, the ground dispersion is introduced into a silicone die containing depressions in the shape of the desired abrasive grains. For some embodiments of the abrasive grain, it is possible to use an additional shaping element as described above, for example a further die, with which, in addition to the surface shaped in the die, it is possible to shape at least a portion of the rest of the surface of the abrasive grain. Thereafter, the volatile component, i.e. the water, is removed from the dispersion. This gives rise to an abrasive grain precursor which is removed from the die. In a final step, the precursor is sintered as bulk material at 1550° C. for 5 minutes. The dispersant is burnt out in the course of sintering.

An inventive abrasive article can be produced, for example, as follows: on an underlayer made from vulcanized fiber having a thickness of 0.8 mm, a phenol resin dispersion as make coat precursor is applied in an amount of 120 g/m². Subsequently, 600 g/m² of the inventive abrasive grains are applied by means of electrostatic scattering. Thereafter, the make coat precursor is cured to give a make coat. On top of the make coat and the abrasive grains, a phenol resin dispersion is applied in an amount of 800 g/m² as size coat precursor, which is likewise cured.

Figure 24:
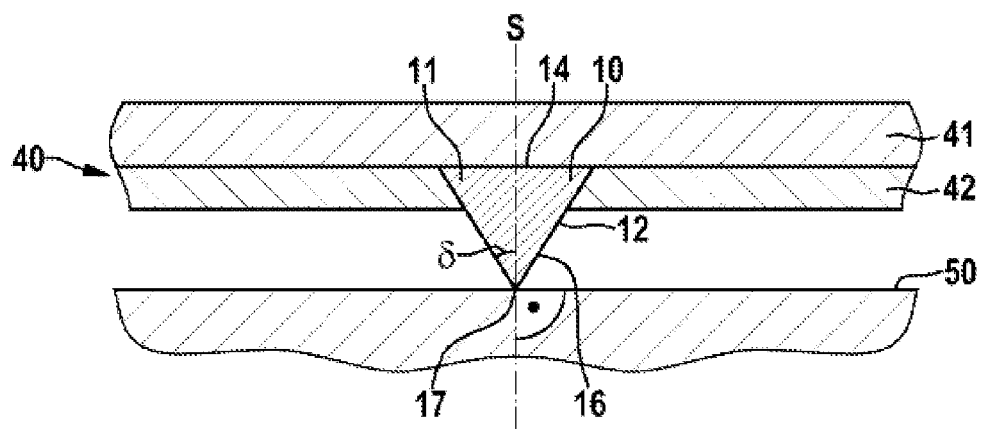
FIG. 24: a side view of a known abrasive grain in the processing of a surface.

FIG. 24 shows, in schematic form, the processing of a surface 50 with an abrasive article 40 having a known abrasive grain 10. For simplification of the diagram, only a single abrasive grain 10 is shown here, even though the abrasive article 40 of course does in fact contain a multitude of such abrasive grains 10. The abrasive grain 10 has been fixed on a substrate 41 with the aid of a binder 42. It has the shape of a straight cylinder having a base face 11 in the shape of an equilateral triangle. A flat section of the abrasive grain 10 which is in contact with a linear section 14 of the outline 12 lies against the underlayer 41, such that a tip 17 of the abrasive grain 10 is directed toward the surface 50. Between a cutting face 16 and a perpendicular S to the surface 50, an angle of engagement δ of +30° is formed. This is given a positive sign here, since the perpendicular S runs within the abrasive grain 10. Such an angle of engagement leads only to a comparatively minor cutting effect.

Figure 25A:
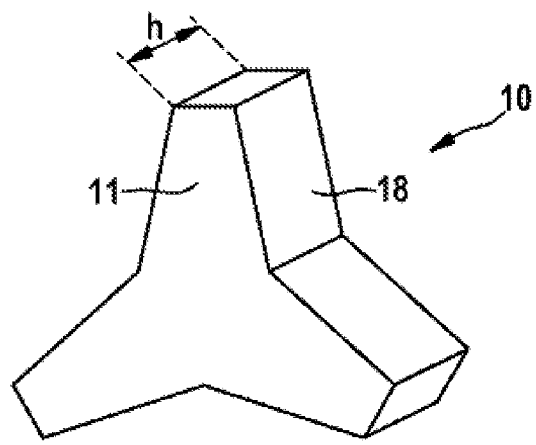
FIG. 25A: a first view of a further embodiment of an inventive abrasive grain.
Figure 25B:
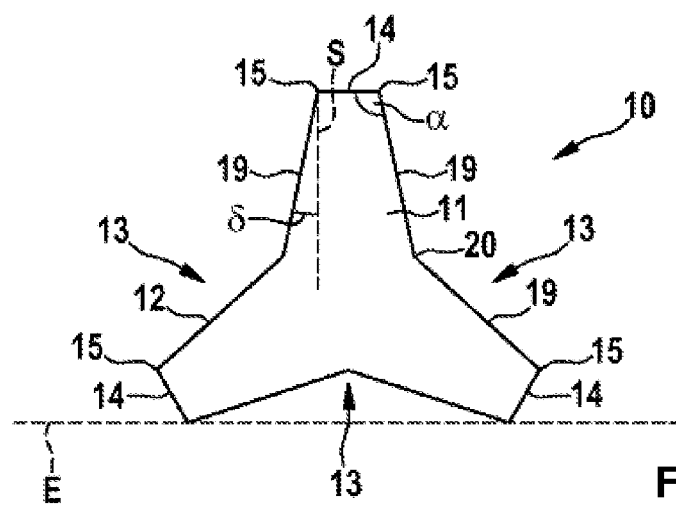
FIG. 25B: a second view of the abrasive grain of FIG. 25A.

FIGS. 25A and 25B show a first inventive abrasive grain 10. According to the perspective view in FIG. 25A, the abrasive grain 10 has the shape of a cylinder having two opposite base faces 11, only one of which can be seen here. A shell face 18 extends between the two base faces 11. The cylinder has a height h.

FIG. 25B shows a top view of one of the base faces 11. The abrasive grain 10 has a diameter corresponding to the diameter of a circle enveloping the base face 11 which is not shown here. The outline 12 has three concave section 13. The concave sections 13 are each formed by two linear component sections 19 which converge at a reflex corner 20. All component section 19 have the same length, and all reflex corners 20 have the same angle. The concave section 13 end at corners 15. Since the lines connecting two adjacent corners 15 run outside the base face 11, the section 13 that run in between are referred to as concave in the context of the invention. In addition, straight sections 14 extend between adjacent corners 15, which likewise have the same length as one another. The internal angle α at each corners 15 may, for example, be 105° (this does not correspond to the angle shown in the merely schematic drawing).

FIG. 25B also shows an imaginary support plane E of the abrasive grain 10. The linear section 14 shown at the top of FIG. 25B runs parallel to this support plane E, i.e. at an angle of 0° to the support plane E. If the abrasive grain 10 lies on an abrasive underlayer 41 such that the support plane E corresponds to the underlayer 41, the abrasive grain 10 is stable to tipping over. In this orientation, the linear section 14 shown at the top runs parallel a surface 50 being processed, and the part-sections 19 of the concave sections 13 form cutting faces.

For the abrasive grain 10 shown in FIGS. 25A and 25B, an angle of engagement of δ=α−90°=15° is found. In the working example shown here, this angle of engagement δ corresponds to the angle formed between the part-section 19 and a perpendicular S which runs at right angles to the support plane E. The angle of engagement δ of this inventive abrasive grain 10 is smaller than the angle of engagement of 30° in the conventional abrasive grain 10 shown in FIG. 24. This results in increased grinding action.

The base face 11 of the abrasive grain 10 shown in FIGS. 25A and 25B has three-fold symmetry. The base face is thus invariable under a rotation by 120° in the plane of the base face 11. The above-described increase in the cutting effect is therefore independent of this orientation.

Figure 26:
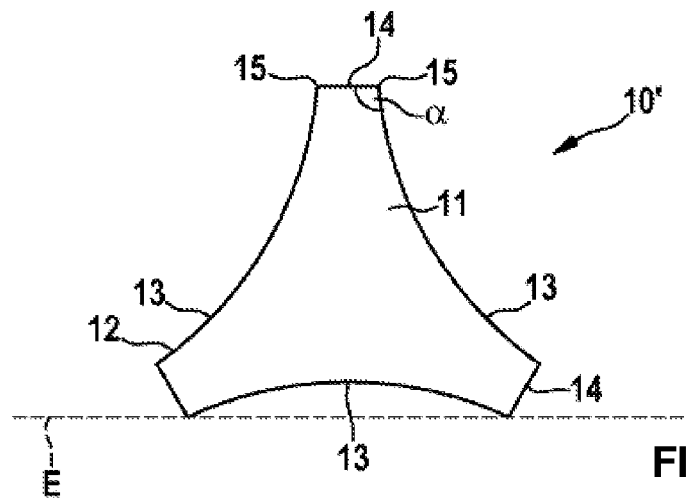
FIG. 26: a side view of a further embodiment of an inventive abrasive grain.

FIG. 26 shows a top view of a base face 11 of a further inventive abrasive grain 10'. The outline 12 thereof likewise contains six corners 15 and three linear sections 14. In contrast to the working example according to FIGS. 25B and 25B, the outline 12 here, however, has three sections 13 having strictly concave curvature. In addition, the internal angle α at the corners 15 here is 90°. The consequence of this is an angle of engagement of 0°, which leads to another improvement in cutting action. In addition, there is only a comparatively slight change in the cross section of the abrasive grain 10' when the abrasive grain 10' is worn away toward the center of the abrasive grain 10' in the direction of a linear section 14.

Figure 27:
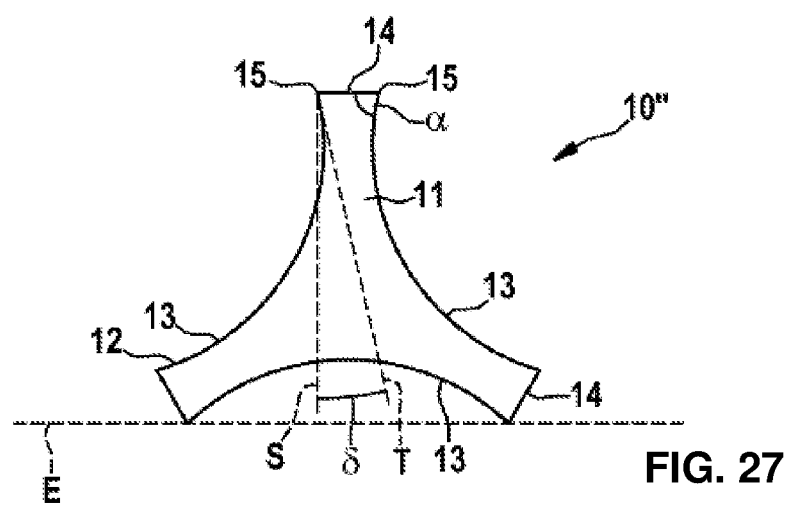
FIG. 27: a side view of a further embodiment of an inventive abrasive grain.

In the third working example of an inventive abrasive grain 10" shown in FIG. 27, the internal angle α is actually less than 90°, which leads to a negative angle of engagement δ, since the above-described perpendicular S here runs outside the abrasive grain.

Figure 28:
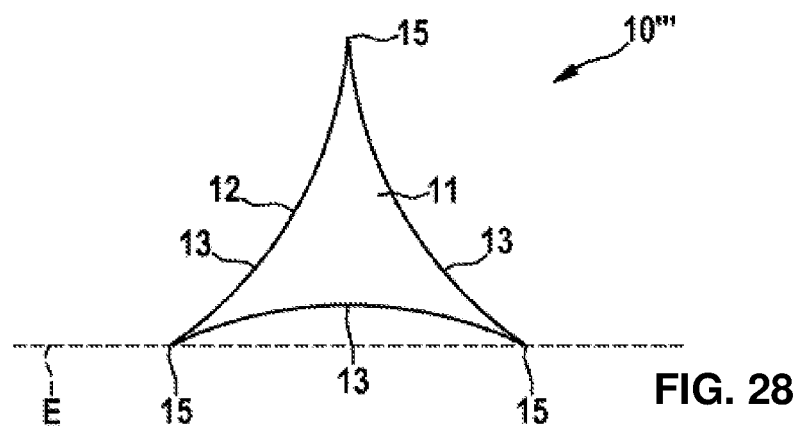
FIG. 28: a side view of a further embodiment of an inventive abrasive grain.

Finally, FIG. 28 shows a fourth working example of an inventive abrasive grain 10''', the outline 12 of which contains only concave sections 13 and corners, but no linear sections.

The inventive abrasive grains can be produced, for example, by a process described hereinafter: first of all, a dispersion of 200 g of α-Al$_2$O$_3$, 0.4 g of MgO, 90 g of water as dispersion medium and 0.5 g of dispersant is produced. The MgO functions here as a nucleating agent. The dispersant used may, for example, be the Dolapix CE64 product obtainable from Zschimmer & Schwarz, 56108 Lahnstein, Germany. The dispersion thus obtained is ground in a planetary ball mill at 200 revolutions per minute for 30 minutes, for example a PM400 planetary ball mill obtainable from Retsch GmbH, 42781 Haan, Germany. Subsequently, the ground dispersion is introduced into a silicone die as is described in more detail below, containing depressions in the shape of the desired abrasive grains. Thereafter, the volatile component, i.e. the water, is removed from the dispersion. This gives rise to an abrasive grain precursor which is removed from the die. In a final step, the precursor is sintered as bulk material at 1550° C. for minutes. The dispersant is burnt out in the course of sintering.

Figure 29A:
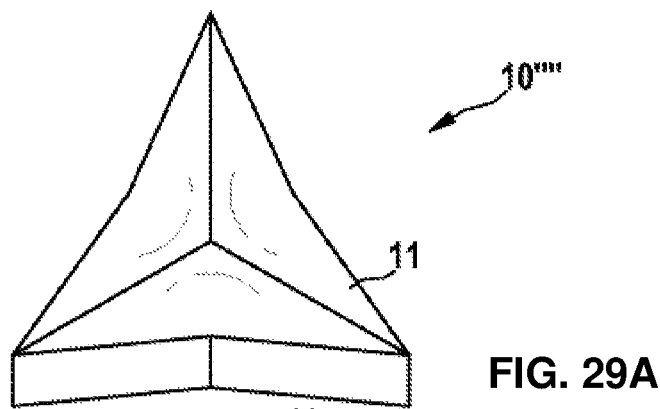
FIG. 29A: a first view of a further embodiment of an inventive abrasive grain.
Figure 29B:
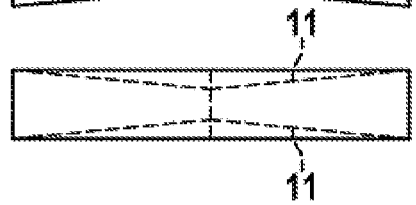
FIG. 29B: a second view of the abrasive grain of FIG. 29A.
Figure 30A:
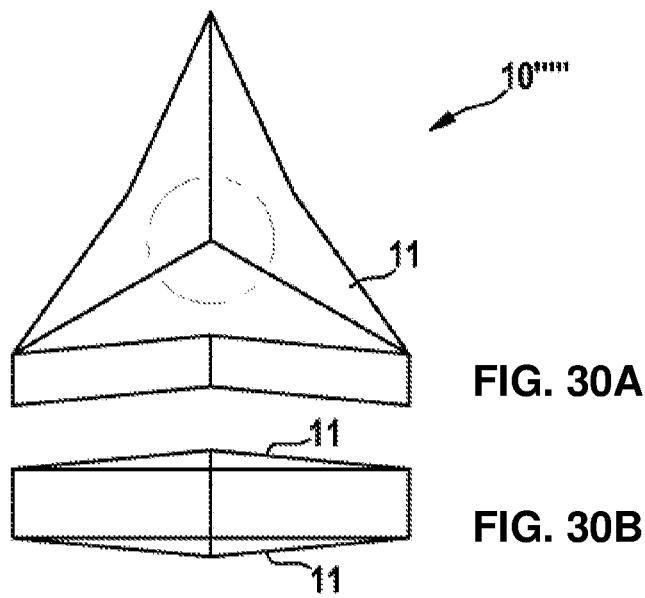
FIG. 30A: a first view of a further embodiment of an inventive abrasive grain.
Figure 30B:
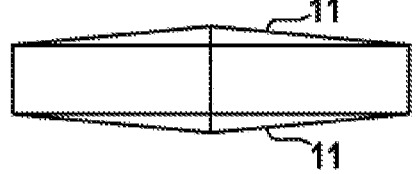
FIG. 30B: a second view of the abasive grain of FIG. 30A.

FIGS. 29A and 29B show two views of a fifth embodiment. This abrasive grain 10'''' differs from the idealized cylinder shape since the two base faces 11 have slight concave curvature. The abrasive grain 10''''' shown in FIGS. 30A and 30B contains two base faces 11 having slight convex curvature. Deviations of this kind can arise, for example, by virtue of the production tolerances described in detail above.

Figure 31:
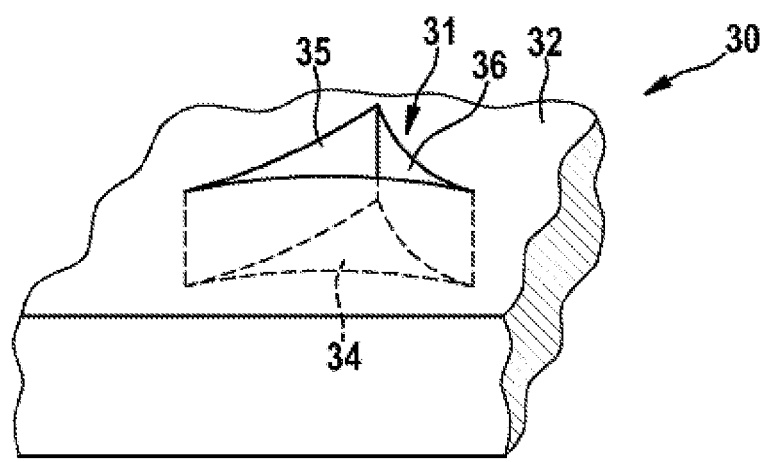
FIG. 31: a die for production of an abrasive grain of the inventive embodiment according to FIG. 28.

FIG. 31 shows, in schematic form, a part of a die 30 with which an abrasive grain 10''' according to FIG. 28 can be produced. The die 30 may consist, for example, of silicone. It contains a top side 32 and a multitude of identical depressions 31, only one single example of which is shown here for simplification of the illustration. The depression 31 has an open top face 35 through which a dispersion as described above can be introduced. The surface of the depression 31 contains a base face 34 which is identical to the shape of the base face 11 of the abrasive grain 10''' and runs parallel to the top side 32 of the die 30. A lateral wall 36 which consists of a plurality of sections and is complementary to the shell face of the abrasive grain 10''' extends from the base face 34.

An inventive abrasive article can be produced, for example, as follows: on an underlayer made from vulcanized fiber having a thickness of 0.8 mm, a phenol resin dispersion as make coat precursor is applied in an amount of 120 g/m$^2$. Subsequently, 600 g/m$^2$ of the inventive abrasive grains are applied by means of electrostatic scattering. Thereafter, the make coat precursor is cured to give a make coat. On top of the make coat and the abrasive grains, a phenol resin dispersion is applied in an amount of 800 g/m$^2$ as size coat precursor, which is likewise cured.

Concept 1. An abrasive grain (10) having not more than three faces (11, 12, 13), characterized in that the abrasive grain (10) contains at least one edge (5, 6, 7, 8, 9) having a corner (1, 2, 3, 4) at at least one end.

Concept 2. The abrasive grain (10) as described in any of the preceding concepts, characterized in that the abrasive grain (10) has at least four corners (1, 2, 3, 4), especially exactly four corners (1, 2, 3, 4).

Concept 3. The abrasive grain (10) as described in concept 2, characterized in that the abrasive grain (10) has at least two edges ( ) that are not in contact with one another, the two edges ( ) each being bounded by two corners ( ) and a first straight connecting line formed between the corners ( ) that bound a first edge( ) being arranged at an angle of 90°±50°, preferably 90°±30°, more preferably 90°±10°, with respect to a second straight connecting line formed between the corners ( ) that bound a second edge ( ).

Concept 4. The abrasive grain (10) as described in concept 2 or 3, characterized in that two planes that are formed between three corners (1, 2, 3, 4) each of the abrasive grain (10) form an angle between 70° and 140°, preferably between 80° and 130°, more preferably between 90° and 120°.

Concept 5. The abrasive grain (10) as described in any of concepts 2 to 4, characterized in that the abrasive grain (10) has at least one feature of symmetry, especially at least one plane of symmetry and/or at least one axis of symmetry.

Concept 6. The abrasive grain (10) as described in any of the preceding concepts, characterized in that the abrasive grain (10) has exactly two faces (11, 12), the two faces (11, 12) of the abrasive grain being curved faces.

Concept 7. The abrasive grain (10) as described in any of concepts 1 to 5, characterized in that the abrasive grain (10) has exactly three faces (11, 12, 13), at least two and especially all three faces (11, 12, 13) of the abrasive grain (10) being curved faces.

Concept 8. The abrasive grain (10) as described in any of the preceding concepts, characterized in that it comprises or consists of a ceramic material, especially a polycrystalline ceramic material, preferably alumina, more preferably α-Al$_2$O$_3$.

Concept 9. A collective of abrasive grains (10), characterized in that it comprises at least 20% by weight, preferably at least 50% by weight, more preferably at least 90% by weight, of abrasive grains (10) as described in any of the preceding concepts.

Concept 10. A process for producing at least one abrasive grain (10) or a collective of abrasive grains (10) as described in any of the preceding concepts, characterized by the following steps: (a) producing or providing a dispersion comprising α-alumina particles and/or particles that can be converted to α-alumina, and at least one volatile dispersion medium, preferably water; (b) introducing the dispersion into at least one depression of a die; (c) optionally squeegeeing an upper face of the die in order to remove at least a portion of the dispersion which stands above the upper face of the die; (d) removing a portion of the volatile components of the dispersion, so as to form at least one abrasive grain precursor; (e) removing the abrasive grain precursor from the die; (f) optionally calcining the abrasive grain precursor; and (g) sintering the abrasive grain precursor in order to obtain at least one abrasive grain (10).

Concept 11. A casting mold for producing at least one abrasive grain (10) as described in any of concepts 1 to 8, wherein the casting mold comprises at least one die having at least one depression, preferably a multitude of depressions, having a particular surface, the surface being complementary to the shape of at least part of the surface of the abrasive grain (10).

Concept 12. An abrasive article comprising a collective of abrasive grains (10) as described in concept 9.

Concept 13. A process for producing an abrasive article as described in concept 12, comprising a step in which a collective of abrasive grains (10) as described in concept 9 is fixed on and/or in a substrate (20), especially by means of a binder.

Concept 14. A process for grinding a surface, especially a painted surface, with an abrasive article as described in concept 12.

Concept 15. An abrasive grain (110; 210; 510; 510'; 810) comprising or consisting of at least one component (120, 125; 220, 225; 510; 510'; 810) having at least essentially the shape of a twisted geometric elementary body.

Concept 16. The abrasive grain (110; 210; 510; 510'; 810) as described in concept 15, characterized in that at least one geometric elementary body is a polyhedron, especially a prism, an antiprism, a pyramid or a frustopyramid.

Concept 17. The abrasive grain (210) as described in either of concepts 15 and 16, characterized in that at least one geometric elementary body is a cone, especially a pyramid.

Concept 18. The abrasive grain (210) as described in either of concepts 15 and 16, characterized in that at least one geometric elementary body is a frustocone, especially a frustopyramid.

Concept 19. The abrasive grain (110; 310; 510; 510'; 810) as described in either of concepts 15 and 16, characterized in that at least one geometric elementary body is a cylinder, especially a prism.

Concept 20. The abrasive grain (110; 210) as described in any of the preceding concepts, characterized in that the abrasive grain (110; 210) has a base element (120; 220) having a bottom side (121; 221) and an opposite top side (122, 222), and also at least one top element (125; 225) having a bottom side (126; 226) disposed upon the top side (122; 222) of the base element (120; 220), the base element (120; 220) and/or at least one top element (125; 225) constituting one of the components (120, 125; 220, 225).

Concept 21. The abrasive grain (110; 210; 510; 510'; 810) as described in any of the preceding concepts, characterized in that it comprises or consists of a ceramic material, especially a polycrystalline ceramic material, preferably alumina, more preferably α-Al$_2$O$_3$.

Concept 22. A collective of abrasive grains (110; 210; 510; 510'; 810), characterized in that it comprises at least 20% by weight, preferably at least 50% by weight, more preferably at least 90% by weight, of abrasive grains (110; 210) as described in any of the preceding concepts.

Concept 23. A process for producing at least one abrasive grain (110; 210; 510; 510'; 810) or a collective of abrasive grains (110; 210; 510; 510'; 810) as described in any of the preceding concepts, characterized by the following steps: (a) producing or providing a dispersion comprising α-alumina particles and/or particles that can be converted to α-alumina, and at least one volatile dispersion medium, preferably water; (b) introducing the dispersion into at least one depression (31) of a die; (c) optionally squeegeeing an upper face of the die in order to remove at least a portion of the dispersion which stands above the upper face of the die; (d) removing a portion of the volatile components of the dispersion, so as to form at least one abrasive grain precursor; (e) removing the abrasive grain precursor from the die; (f) optionally calcining the abrasive grain precursor; and (g) sintering the abrasive grain precursor in order to obtain at least one abrasive grain (110; 210; 510; 510'; 810).

Concept 24. A process for producing at least one abrasive grain (510; 510'; 810) or a collective of abrasive grains (510; 510'; 810), especially at least one abrasive grain (510; 510'; 810) or a collective of abrasive grains (510; 510'; 810) as described in any of concepts 15 to 21, characterized by the following steps: (a) producing or providing a dispersion comprising α-alumina particles and/or particles that can be converted to α-alumina, and at least one volatile dispersion medium, preferably water, and optionally at least one organic additive; (b) extruding the dispersion through an exit orifice (507; 507'; 507"; 507'''; 507"") of a nozzle (506; 506'; 506"; 506'''; 506""), the exit orifice having at least essentially the shape of a twisted cylinder, such that an extrudate is obtained; (c) severing the extrudate to obtain abrasive grain precursors; (d) optionally calcining the abrasive grain precursors; and (e) sintering the abrasive grain precursors in order to obtain at least one abrasive grain (510; 510'; 810).

Concept 25. A process for producing at least one abrasive grain or a collective of abrasive grains, especially at least one abrasive grain or a collective of abrasive grains as described in any of concepts 15 to 21, characterized by the following steps: (a) producing or providing a dispersion comprising α-alumina particles and/or particles that can be converted to α-alumina, and at least one volatile dispersion medium, preferably water, and optionally at least one organic additive; (b) producing a film from the dispersion; (c) severing the film produced in step b) to form film sections; (d) shaping the film sections produced in step c) to obtain abrasive grain precursors; (e) optionally calcining the abrasive grain precursors; and (f) sintering the abrasive grain precursors in order to obtain at least one abrasive grain.

Concept 26. A casting mold for producing at least one abrasive grain (110; 210; 510; 510'; 810) as described in any of concepts 15 to 20, wherein the casting mold comprises at least one die having at least one depression, preferably a multitude of depressions, having a particular surface, the surface being complementary to the shape of at least part of the surface of the abrasive grain (110; 210; 510; 510'; 810).

Concept 27. An abrasive article comprising a collective of abrasive grains (110; 210; 510; 510'; 810) as described in concept 22.

Concept 28. A process for producing an abrasive article as described in concept 12, comprising a step in which a collective of abrasive grains (110; 210; 510; 510'; 810) as described in concept 22 is fixed on and/or in a substrate, especially by means of a binder.

Concept 29. A process for grinding a surface, especially a painted surface, with an abrasive article as described in concept 12.

Concept 30. An abrasive grain (100; 400; 500; 600; 700; 800; 900; 1000) having at least six faces (110; 410; 510; 610; 710; 810; 910; 1010), characterized in that at least one of the faces (110; 410; 510; 610; 710; 810; 910; 1010) has concave curvature (111; 711).

Concept 31. The abrasive grain (100; 400; 500; 600; 700; 800; 900) as described in concept 30, characterized in that at least one dished face (110) is curved in at least two directions (114, 115).

Concept 32. An abrasive grain (200, 300), especially as described in concept 30 or 31, characterized in that the abrasive grain (200; 300) has a structure with at least one reentrant corner (216; 316).

Concept 33. The abrasive grain (100; 300; 400; 500; 600; 700; 800; 900) as described in concept 30, 31 or 32, characterized in that the abrasive grain (100; 300; 400; 500; 600; 700; 800; 900) has at least one curved edge (113; 313; 713; 813), especially a concave curved edge (113; 713; 813).

Concept 34. The abrasive grain as described in any of the preceding concepts, characterized in that the abrasive grain (100; 200; 300; 400; 500; 600; 700; 800; 900) has a structure with corners (112; 312; 412; 512; 612; 712; 812; 912) and at least some of the corners, especially all the convex corners (112; 312; 412; 512; 612; 712; 812; 912), correspond to the corners of an imaginary polyhedron, especially a Platonic solid, an Archimedean solid, a Catalan solid, a prism, an antiprism, or a Platonic solid, Archimedean solid, Catalan solid, prism or antiprism with linear distortion.

Concept 35. The abrasive grain (100; 200; 300; 400; 500; 600; 700; 800; 900; 1000) as described in any of the preceding concepts, characterized in that it comprises or consists of a ceramic material, especially a polycrystalline ceramic material, preferably alumina, more preferably α-Al₂O₃.

Concept 36. A collective of abrasive grains (100; 200; 300; 400; 500; 600; 700; 800; 900; 1000), characterized in that it comprises at least 20% by weight, preferably at least 50% by weight, more preferably at least 90% by weight, of abrasive grains (100; 200; 300; 400; 500; 600; 700; 800; 900; 1000) as described in any of the preceding concepts.

Concept 37. A process for producing at least one abrasive grain (100; 200; 300; 400; 500; 600; 700; 800; 900; 1000) or a collective of abrasive grains (100; 200; 300; 400; 500; 600; 700; 800; 900; 1000) as described in any of the preceding concepts, characterized by the following steps: (a.) producing or providing a dispersion comprising α-alumina particles and/or particles that can be converted to α-alumina, and at least one volatile dispersion medium, preferably water; (b.) introducing the dispersion into at least one depression of a die; (c.) optionally squeegeeing an upper face of the die in order to remove at least a portion of the dispersion which stands above the upper face of the die; (d.) removing a portion of the volatile components of the dispersion, so as to form at least one abrasive grain precursor; (e.) removing the abrasive grain precursor from the die; (f.) optionally calcining the abrasive grain precursor; and (g.) sintering the abrasive grain precursor in order to obtain at least one abrasive grain (100; 200; 300; 400; 500; 600; 700; 800; 900; 1000).

Concept 38. A casting mold for producing at least one abrasive grain (100; 200; 300; 400; 500; 600; 700; 800; 900; 1000) as described in any of concepts 30 to 35, wherein the casting mold comprises at least one die having at least one depression, preferably a multitude of depressions, having a particular surface, the surface being complementary to the shape of at least part of the surface of the abrasive grain (100; 200; 300; 400; 500; 600; 700; 800; 900; 1000).

Concept 39. The casting mold as described in concept 38, characterized in that the casting mold has at least one further shaping element, especially a further die or a ram element, with which, in addition to the face shaped in the die, at least some of the rest of the surface of the abrasive grain (100; 200; 300; 400; 500; 600; 700; 800; 900; 1000) can be shaped.

Concept 40. An abrasive article comprising a collective of abrasive grains (100; 200; 300; 400; 500; 600; 700; 800; 900; 1000) as described in concept 36.

Concept 41. A process for producing an abrasive article as described in concept 40, comprising a step in which a collective of abrasive grains (100; 200; 300; 400; 500; 600; 700; 800; 900; 1000) as described in concept 36 is fixed on and/or in a substrate, especially by means of a binder.

Concept 42. A process for grinding a surface, especially a painted surface, with an abrasive article as described in concept 40.

Concept 43. An abrasive grain (10; 10'; 10''; 10'''; 10''''; 10''''') in the shape especially of a straight cylinder having two opposite base faces (11), characterized in that the base faces (11) have an outline (12) including at least one concave section (13).

Concept 44. The abrasive grain (10; 10'; 10''; 10'''; 10''''; 10''''') as described in concept 43, characterized in that the outline (12) has at least one corner (15).

Concept 45. The abrasive grain (10; 10'; 10''; 10'''; 10''''; 10''''') as described in concept 44, characterized in that the outline (12) at the edge (15) defines an inner angle (α) of the base face (11) within the range from 65° to 120°, preferably from 65° to 115°, further preferably from 75° to 105°, more preferably from 85° to 95° and most preferably 90°.

Concept 46. The abrasive grain (10; 10'; 10''; 10'''; 10''''; 10''''') as described in any of the preceding concepts, characterized in that the outline (12) has at least one linear section (14).

Concept 47. The abrasive grain (10; 10'; 10''; 10'''; 10''''; 10''''') as described in concept 46, characterized in that at least one linear section (14) runs at an angle with respect to a support plane (E) of the abrasive grain (10; 10'; 10''; 10'''; 10''''; 10''''') of at most 20°, preferably at most 10°, more preferably at most 5°.

Concept 48. The abrasive grain (10; 10'; 10''; 10'''; 10''''; 10''''') as described in any of the preceding concepts, characterized in that a tangent (T) to at least one point on the outline (12) runs at an angle to a perpendicular (S) that runs at right angles to the support plane (E) of the abrasive grain (10; 10'; 10''; 10'''; 10''''; 10'''''), this angle being in the range from −30° to +30°, preferably from −2520 to +25°, further preferably from −15° to +15°, more preferably from −5° to +5° and most preferably 0°.

Concept 49. The abrasive grain (10; 10'; 10''; 10'''; 10''''; 10''''') as described in any of the preceding concepts, characterized in that the outline (12) has at least three, preferably exactly three, concave sections (13) whose respective ends are corners (15) of the outline (12), and in that the outline (12) has a linear section (14) between any two concave sections (13).

Concept 50. The abrasive grain (10; 10'; 10''; 10'''; 10''''; 10''''') as described in any of the preceding concepts, characterized in that the ratio of the height (h) of the abrasive grain (10; 10'; 10''; 10'''; 10''''; 10''''') and the diameter of a circle enveloping the base faces (11) is not more than 1, preferably not more than 0.8, more preferably not more than 0.6.

Concept 51. The abrasive grain (10; 10'; 10''; 10'''; 10''''; 10''''') as described in any of the preceding concepts, characterized in that it comprises or consists of a ceramic material, especially a polycrystalline ceramic material, preferably alumina, more preferably α-Al₂O₃.

Concept 52. A collective of abrasive grains (10; 10'; 10''; 10'''; 10''''; 10'''''), characterized in that it comprises at least 20% by weight, preferably at least 50% by weight, more preferably at least 90% by weight, of abrasive grains (10; 10'; 10''; 10'''; 10''''; 10''''') as described in any of the preceding concepts.

Concept 53. A process for producing at least one abrasive grain (10; 10'; 10''; 10'''; 10''''; 10''''') or a collective of abrasive grains (10; 10'; 10''; 10'''; 10''''; 10''''') as described in any of the preceding concepts, characterized by the following steps: (a.) producing or providing a dispersion comprising α-alumina particles and/or particles that can be converted to α-alumina, and at least one volatile dispersion medium, preferably water; (b.) introducing the dispersion into at least one depression (31) of a die (30); (c.) optionally squeegeeing an upper face (32) of the die (30) in order to remove at least a portion of the dispersion which stands above the upper face (32) of the die (30); (d.) removing a portion of the volatile components of the dispersion, so as to form at least one abrasive grain precursor; (e.) removing the abrasive grain precursor from the die (30); (f.) optionally calcining the abrasive grain precursor; and (g.) sintering the abrasive grain precursor in order to obtain at least one abrasive grain (10; 10'; 10''; 10'''; 10''''; 10''''').

Concept 54. A casting mold (30) for producing at least one abrasive grain (10; 10'; 10''; 10'''; 10''''; 10''''') as described in any of concepts 43 to 51, wherein the casting mold (30)

comprises at least one depression (31), preferably a multitude of depressions (31), having a particular surface, the surface being complementary to the shape of at least part of the surface of the abrasive grain (10; 10'; 10"; 10'''; 10""; 10''''').

Concept 55. An abrasive article (40) comprising a collective of abrasive grains (10; 10'; 10"; 10'''; 10""; 10''''') as described in concept 52.

Concept 56. A process for producing an abrasive article (40) as described in concept 55, comprising a step in which a collective of abrasive grains (10; 10'; 10"; 10'''; 10""; 10''''') as described in concept 52 is fixed on and/or in a substrate, especially by means of a binder (42).

Concept 57. A process for grinding a surface, especially a painted surface, with an abrasive article (40) as described in concept 55.

The invention claimed is:

1. An abrasive grain comprising:
   not more than three faces;
   at least one corner; and
   at least one edge having a corner of the at least one corner located at least one end of the at least one edge, wherein:
   a first group of three corners of the at least one corner defines a first plane,
   a second group of three corners of the at least one corner defines a second plane, and
   the first plane and the second plane form an angle between 70° and 140°.

2. The abrasive grain as claimed in claim 1, wherein:
   the at least one edge includes at least two edges that are not in contact with one another, the at least two edges including a first edge and a second edge,
   the at least two edges are each bounded by two corners of the at least one corner, and
   a first straight connecting line formed between the corners that bound the first edge is arranged at an angle of 90°±50° with respect to a second straight connecting line formed between the corners that bound the second edge.

3. The abrasive grain as claimed in claim 1, further comprising:
   at least one feature of symmetry, at least one plane of symmetry, and/or at least one axis of symmetry.

4. An abrasive grain comprising:
   exactly two faces;
   at least one corner; and
   at least one edge having a corner of the at least one corner located at least one end of the at least one edge,
   wherein the two faces are curved faces.

5. The abrasive grain as claimed in claim 1, wherein:
   the not more than three faces includes exactly three faces, and
   at least two of the three faces are curved faces.

6. The abrasive grain as claimed in claim 1, wherein the abrasive grain is comprised of a ceramic material.

7. The abrasive grain as claimed in claim 1, wherein the at least one corner is defined at a point of the abrasive grain over which an imaginary cone can theoretically be placed such that a portion of the abrasive grain is within the imaginary cone and the point forms a tip of the imaginary cone.

8. The abrasive grain as claimed in claim 7, wherein an opening angle of the imaginary cone is less than 150°.

9. The abrasive grain as claimed in claim 7, wherein an opening angle of the imaginary cone is less than 120°.

10. The abrasive grain as claimed in claim 7, wherein an opening angle of the imaginary cone is less than 90°.

* * * * *